(12) United States Patent
Richardson et al.

(10) Patent No.: US 10,699,131 B2
(45) Date of Patent: Jun. 30, 2020

(54) USER-UPGRADEABLE LOAD CONTROL NETWORK

(71) Applicant: Deako, Inc., Seattle, WA (US)

(72) Inventors: Derek Richardson, Seattle, WA (US); Patrick Prendergast, Clinton, WA (US); Chris Keeser, Everett, WA (US); Allen Stedman, Bellevue, WA (US)

(73) Assignee: Deako, Inc., Seattle, WA (US)

( * ) Notice: Subject to any disclaimer, the term of this patent is extended or adjusted under 35 U.S.C. 154(b) by 0 days.

(21) Appl. No.: 16/114,047

(22) Filed: Aug. 27, 2018

(65) Prior Publication Data

US 2019/0156127 A1  May 23, 2019

Related U.S. Application Data

(63) Continuation of application No. 15/756,510, and a continuation of application No. 15/253,815, filed on
(Continued)

(51) Int. Cl.
*G06F 3/01* (2006.01)
*H01H 47/00* (2006.01)
(Continued)

(52) U.S. Cl.
CPC ......... *G06K 9/00771* (2013.01); *G06F 3/017* (2013.01); *G06K 9/00013* (2013.01);
(Continued)

(58) Field of Classification Search
CPC .......... G06K 9/00771; G06K 9/00013; G06K 9/00342; G06K 9/00225; G06F 3/017; H05B 37/0227; H05B 37/0272; H01R 13/447; H01R 24/62; H01R 13/2407; H01R 12/724; H01R 13/6275; H01R 2107/00;
(Continued)

(56) References Cited

U.S. PATENT DOCUMENTS 8,878,058 B2 * 11/2014 Wurms .................... H02G 3/08
174/482
9,437,978 B2 * 9/2016 Green .................. H01R 13/652
(Continued)

*Primary Examiner* — Dinh T Le
(74) *Attorney, Agent, or Firm* — Suiter Swantz pc llo

(57) ABSTRACT

A method for installing a user-upgradeable load control network includes mounting backplates to electrical junction boxes throughout a building, where at least some backplates include a cavity to interchangeably accept device control assemblies, electrical contacts, and a translatable cover to shield the electrical contacts from the cavity when translated to a closed position and to expose the electrical contacts to inserted device control assemblies. The method may further include connecting the electrical contacts to electrical loads throughout the building. The method may further include installing device control assemblies into the backplates by inserting the one or more device control assemblies and translating the respective covers to the open positions. Further, an installed device control assembly is upgradeable by translating the cover to the closed position, removing the installed device control assembly, inserting device control assembly, and translating the cover to the open position.

20 Claims, 55 Drawing Sheets

Related U.S. Application Data

Aug. 31, 2016, now Pat. No. 10,153,113, and a continuation of application No. 15/253,811, filed on Aug. 31, 2016, now Pat. No. 10,078,786, and a continuation-in-part of application No. 15/253,811, filed on Aug. 31, 2016, now Pat. No. 10,078,786, which is a continuation of application No. 15/253,811, filed on Aug. 31, 2016, now Pat. No. 10,078,786, application No. 16/114,047, which is a continuation-in-part of application No. 15/145,624, filed on May 3, 2016, now Pat. No. 10,069,235, application No. 16/114,047, which is a continuation of application No. 15/074,915, filed on Mar. 18, 2016, now Pat. No. 10,063,002, said application No. 15/253,811 is a continuation of application No. 15/074,915, filed on Mar. 18, 2016, now Pat. No. 10,063,002, which is a continuation-in-part of application No. 15/074,915, filed on Mar. 18, 2016, now Pat. No. 10,063,002, which is a continuation of application No. 15/074,915, filed on Mar. 18, 2016, now Pat. No. 10,063,002, which is a continuation-in-part of application No. 15/074,915, filed on Mar. 18, 2016, now Pat. No. 10,063,002, said application No. PCT/US2016/049797 is a continuation of application No. 15/253,815, filed on Aug. 31, 2016, now Pat. No. 10,153,113, which is a continuation of application No. 15/074,915, filed on Mar. 18, 2016, now Pat. No. 10,063,002, said application No. 15/253,819 is a continuation of application No. 15/145,624, filed on May 3, 2016, now Pat. No. 10,069,235, said application No. 15/756,510 is a continuation of application No. 15/145,624, filed on May 3, 2016, now Pat. No. 10,069,235, which is a continuation-in-part of application No. 15/145,624, filed on May 3, 2016, now Pat. No. 10,069,235, which is a continuation-in-part of application No. 15/145,624, filed on May 3, 2016, now Pat. No. 10,069,235, and a continuation of application No. PCT/US2016/049797, filed on Aug. 31, 2016, which is a continuation of application No. 15/253,811, filed on Aug. 31, 2016, now Pat. No. 10,078,786, said application No. 15/756,510 is a continuation of application No. 15/253,819, said application No. PCT/US2016/049797 is a continuation of application No. 15/145,624, filed on May 3, 2016, now Pat. No. 10,069,235, which is a continuation-in-part of application No. 15/074,915, filed on Mar. 18, 2016, now Pat. No. 10,063,002.

(60) Provisional application No. 62/212,388, filed on Aug. 31, 2015.

(51) Int. Cl.

| | | |
|---|---|---|
| *G06K 9/00* | (2006.01) | |
| *H01R 13/447* | (2006.01) | |
| *H05B 47/19* | (2020.01) | |
| *H05B 47/105* | (2020.01) | |
| G05B 19/048 | (2006.01) | |
| H01R 12/72 | (2011.01) | |
| H01R 13/24 | (2006.01) | |
| H01R 13/627 | (2006.01) | |
| H01R 24/62 | (2011.01) | |
| H01R 107/00 | (2006.01) | |
| H02G 3/08 | (2006.01) | |
| H02G 3/12 | (2006.01) | |
| H02G 3/16 | (2006.01) | |

(52) U.S. Cl.
CPC ..... *G06K 9/00228* (2013.01); *G06K 9/00342* (2013.01); *H01R 13/447* (2013.01); *H05B 47/105* (2020.01); *H05B 47/19* (2020.01); G05B 19/048 (2013.01); G05B 2219/25011 (2013.01); H01R 12/724 (2013.01); H01R 13/2407 (2013.01); H01R 13/6275 (2013.01); H01R 24/62 (2013.01); H01R 2107/00 (2013.01); H02G 3/081 (2013.01); H02G 3/12 (2013.01); H02G 3/16 (2013.01)

(58) Field of Classification Search
CPC . H02G 3/12; H02G 3/16; H02G 3/081; G05B 2219/25011; G05B 19/048
See application file for complete search history.

(56) References Cited

U.S. PATENT DOCUMENTS 9,583,924 B2 * 2/2017 Thornton ............... H01R 13/52
9,653,897 B2 * 5/2017 Hemingway .......... H02G 3/081

* cited by examiner

| Device Control Assembly | Location | Paired Devices |
|---|---|---|
| DC1 | Bedroom 2 | EC1 |
| DC2 | Hallway 2 | EC2, EC3 |
| DC3 | Hallway 2 | EC2, EC3 |
| DC4 | Laundry | EC9 |
| DC5 | Hallway 1 | EC5, EC6, EC12 |
| DC6 | Hallway 1 | EC5, EC6, EC12 |
| DC7 | Bedroom 1 | EC4, ML1, S1, S2, S3, S5, S6, S7, S8, S9 |
| DC8 | Kitchen | EC7, EC8, S8 |
| DC9 | Living Room | ML2, ML3, EC12, EC13, EC14, S8 |
| DC10 | Bathroom | EC10 |
| DC11 | Entry | EC11 |

FIG. 7D

| Device | Physical Pairing | Addressable Pairing |
|---|---|---|
| EC1 | DC1 | |
| EC2 | DC2 | DC3 |
| EC3 | DC3 | DC2 |
| EC4 | DC7 | |
| EC5 | DC5, DC6 | |
| EC6 | DC5, DC6 | |
| EC7 | DC8 | |
| EC8 | DC8 | |
| EC9 | DC4 | |
| EC10 | DC10 | |
| EC11 | DC11 | |
| EC12 | DC9 | DC5, DC6 |
| EC13 | DC9 | |
| EC14 | DC9 | |

FIG. 7E

| Light State | | | Device Actuated | Next State | | |
|---|---|---|---|---|---|---|
| EC5 | EC6 | EC12 | | EC5 | EC6 | EC12 |
| On | On | On | DC5, DC6 | Off | Off | Off |
| On | On | On | DC9 | On | On | Off |
| On | On | Off | DC5, DC6 | Off | Off | Off |
| On | On | Off | DC9 | On | On | On |
| Off | Off | On | DC5, DC6 | On | Off | On |
| Off | Off | Off | DC9 | On | On | Off |
| Off | Off | Off | DC5, DC6 | Off | Off | On |
| Off | Off | Off | DC9 | Off | Off | On |

FIG. 7F

Touch User Interface Interaction Table

| First Input | Display Mode | Next Input | Display Indication |
|---|---|---|---|
| Single-Tap | Dimmer | Dim level based on finger location (top = 100%, bottom = 0%) | Dimmer bar lights up with brightness relative to the dim level |
| Double-Tap | Keypad | Scene selection | Scenes |
| Tap and Hold | Notifications | View Notifications | Status of paired devices |
| Double-Tap and Hold | Color Selection | Color Selection, location of finger sets color (see image) | R, G, B icons (e.g. shapes 904-908) |

FIG. 9H

Simplified Occupancy Sensor States

| DC # | DC11 | DC9 | DC8 | DC6 | DC5 | DC7 | Notes |
|---|---|---|---|---|---|---|---|
| Room | Entryway | LR | Kitchen | HW1 | HW1 | BR1 | |
| P1 | Occupied | Vacant | Vacant | Vacant | Vacant | Vacant | Person enters house |
| P2 | Occupied | Occupied | Vacant | Occupied | Vacant | Vacant | Person walks towards Living Room |
| P3 | Vacant | Activity | Occupied | Vacant | Vacant | Vacant | Person walks towards Kitchen, through Living Room |
| P4 | Vacant | Vacant | Occupied | Vacant | Vacant | Vacant | Person drops off keys/wallet in Kitchen, walks towards Hallway 1 |
| P5 | Vacant | Vacant | Activity | Occupied | Occupied | Vacant | Person walks towards Bedroom 1 through Hallway 1 |
| P6 | Vacant | Vacant | Vacant | Vacant | Activity | Occupied | Person enters Bedroom 1, drops off bags, exits to Hallway 1 |
| P7 | Vacant | Vacant | Vacant | Occupied | Occupied | Vacant | Person walks through Hallway 1, towards Kitchen |
| P8 | Vacant | Vacant | Occupied | Vacant | Vacant | Vacant | Person grabs items from the refrigerator |
| P9 | Vacant | Vacant | Activity | Occupied | Occupied | Vacant | Person exits Kitchen, walks through Hallway 1, towards Living Room |
| P10 | Activity | Occupied | Vacant | Vacant | Vacant | Vacant | Person enters living room, walks towards Couch and turns on TV |
| P11 | Activity | Activity | Vacant | Vacant | Vacant | Vacant | Person on the Couch watching TV |

FIG. 16B

Prediction Look-Up Table

| Room | Velocity (mpm) | Direction of Motion | Occurrences ||||| Probabilities ||||
|---|---|---|---|---|---|---|---|---|---|---|
| | | | Total Occurrences | BR2 | Laundry | HW1 | Garage | BR2 | Laundry | HW1 | Garage |
| HW2 | 100 | E | 60 | 6 | 9 | 45 | 0 | 10% | 15% | 75% | 0% |
| HW2 | 100 | W | 90 | 9 | 9 | 0 | 72 | 10% | 10% | 0% | 80% |
| HW2 | 50 | E | 70 | 21 | 14 | 35 | 0 | 30% | 20% | 50% | 0% |
| HW2 | 50 | W | 60 | 18 | 30 | 0 | 12 | 30% | 50% | 0% | 20% |

FIG. 17B

| | DC2 | DC3 | DC1 | DC4 | DC6 | DC5 |
|---|---|---|---|---|---|---|
| P1 | N-FL | N-FR | Vacant | Vacant | Vacant | Vacant |
| P2 | M-FR | M-FR | Vacant | Vacant | Vacant | Vacant |
| Predicted Next State | X-FR | X-FL | Vacant | Vacant | N-FR | N-FR |

State Transitions

FIG. 17C

Updated Look-Up Table

| Room | Velocity (mpm) | Direction | Total Occurrences | Occurrences | | | | Probabilities | | | |
|---|---|---|---|---|---|---|---|---|---|---|---|
| | | | | BR2 | Laundry | HW1 | Garage | BR2 | Laundry | HW1 | Garage |
| HW2 | 100 | E | 61 | 7 | 9 | 45 | 0 | 11% | 15% | 74% | 0% |
| HW2 | 100 | W | 90 | 9 | 9 | 0 | 72 | 10% | 10% | 0% | 80% |
| HW2 | 50 | E | 70 | 21 | 14 | 35 | 0 | 30% | 20% | 50% | 0% |
| HW2 | 50 | W | 60 | 18 | 30 | 0 | 12 | 30% | 50% | 0% | 20% |

FIG. 17D

Light Response to Occupancy

| # | Time | ENTRYWAY 1614 DC11 | ENTRYWAY 1614 LUC | LIVING 1612 DC9 | LIVING 1612 LUC | KITCHEN 1610 DC8 | KITCHEN 1610 LUC | HW1 1606 DC6 | HW1 1606 LUC | HW1 1606 DC5 | HW1 1606 LUC | BR1 1608 DC7 | BR1 1608 LUC | Notes |
|---|---|---|---|---|---|---|---|---|---|---|---|---|---|---|
| P1 | 1:00 | Occupied | On | Vacant | Off | Vacant | Off | Vacant | Off | Vacant | Off | Vacant | Off | Person enters house |
| P2 | 1:00 | Occupied | On | Occupied | On | Vacant | Off | Occupied | On | Vacant | Off | Vacant | Off | Person walks towards Living Room |
| P3 | 1:01 | Vacant | Start Timer | Activity | On | Occupied | On | Vacant | Start Timer | Vacant | Start Timer | Vacant | Off | Person walks towards Kitchen, through Living Room |
| P4 | 1:03 | Vacant | Timer | Vacant | Start Timer | Occupied | On | Vacant | Timer | Vacant | Timer | Vacant | Off | Person drops off keys/wallet in Kitchen, walks towards Hallway 1 |
| P5 | 1:05 | Vacant | Off | Vacant | Timer | Activity | On | Occupied | On | Occupied | On | Vacant | Off | Person walks towards Bedroom 1 through Hallway 1 |
| P6 | 1:08 | Vacant | Off | Vacant | Off | Vacant | Start Timer | Vacant | Start Timer | Activity | Start Timer | Occupied | On | Person enters Bedroom 1, drops off bags, exits to Hallway 1 |

FIG. 18B-1

| # | Time | ENTRYWAY 1614 DC11 | LUC | LIVING 1612 DC9 | LUC | KITCHEN 1610 DC8 | LUC | HW1 1606 DC6 | LUC | HW1 1606 DC5 | LUC | BR1 1608 DC7 | LUC | NOTES |
|---|------|------|-----|------|-----|------|-----|------|-----|------|-----|------|-----|-------|
| P7 | 1:08 | Vacant | Off | Vacant | Off | Vacant | Timer | Occupied | On | Occupied | On | Vacant | Start Timer | Person walks through Hallway 1, towards Kitchen |
| P8 | 1:09 | Vacant | Off | Vacant | Off | Occupied | On | Vacant | Start Timer | Vacant | Start Timer | Vacant | Timer | Person grabs items from the refrigerator |
| P9 | 1:10 | Vacant | Off | Vacant | Off | Activity | On | Occupied | On | Occupied | On | Vacant | Timer | Person exits Kitchen, walks through Hallway 1 towards Living Room |
| P10 | 1:10 | Activity | Off | Occupied | On | Vacant | Start Timer | Occupied | On | Vacant | On | Vacant | Timer | Person enters Living Room, walks towards Couch and turns on the TV |
| P11 | 1:55 | Activity | Off | Activity | On | Vacant | Off | Vacant | Off | Vacant | Off | Vacant | Off | Person laying on the Couch watching TV, 45 minutes later |

Light Response to Occupancy with Prediction

| # | Time | Entryway 1614 AIROS | Entryway 1614 LUC | Living 1612 AIROS | Living 1612 LUC | Kitchen 1610 AIROS | Kitchen 1610 LUC | HW1 1606 AIROS | HW1 1606 LUC | HW1 1606 AIROS | HW1 1606 LUC | BR1 1608 AIROS | BR1 1608 LUC | Notes |
|---|---|---|---|---|---|---|---|---|---|---|---|---|---|---|
| 1 | 1:00 | Occupied | On | Vacant | On | Vacant | Off | Vacant | Off | Vacant | Off | Vacant | Off | Living Room light turns on when entryway AIROS detects occupancy |
| 2 | 1:00 | Occupied | On | Occupied | On | Vacant | Off | Occupied | On | Vacant | On | Vacant | Off | |
| 3 | 1:01 | Vacant | Off | Activity | On | Occupied | On | Vacant | Off | Vacant | Off | Vacant | Off | Entryway and Hallway 1 lights turn off when person walks towards Kitchen |
| 4 | 1:03 | Vacant | Off | Vacant | Start Timer | Occupied | On | Vacant | On | Vacant | On | Vacant | Off | Entryway light stays off, Hallway 1 lights turn on when person walks in that direction |
| 5 | 1:05 | Vacant | Off | Vacant | Off | Activity | Off | Occupied | On | Occupied | On | Vacant | On | Bedroom 1 lights come on in response to person walking in that direction, Kitchen and Dining Room lights turned off |
| 6 | 1:08 | Vacant | Off | Vacant | Off | Vacant | Off | Vacant | Start Timer | Activity | Start Timer | Occupied | On | |
| 7 | 1:08 | Vacant | Off | Vacant | On | Vacant | On | Occupied | On | Occupied | On | Vacant | Off | Kitchen and Living Room lights turn on in response to person walking down Hallway 1. Bedroom 1 lights off after person leaves |
| 8 | 1:09 | Vacant | Off | Vacant | Start Timer | Occupied | On | Vacant | On | Vacant | Start Timer | Vacant | Off | Living Room lights timed turn-off started |
| 9 | 1:10 | Vacant | Off | Vacant | Timer | Activity | On | Occupied | On | Occupied | On | Vacant | Off | |
| 10 | 1:10 | Activity | Off | Occupied | On | Vacant | Off | Occupied | Off | Vacant | Off | Vacant | Off | |
| 11 | 1:55 | Activity | Off | Activity | On | Vacant | Off | Vacant | Off | Vacant | Off | Vacant | Off | |

USER-UPGRADEABLE LOAD CONTROL NETWORK

CROSS-REFERENCE TO RELATED APPLICATIONS

The present application claims the benefit under 35 U.S.C. § 120 of U.S. patent application Ser. No. 15/253,811, filed on Aug. 31, 2016 and entitled OCCUPANCY SENSING APPARATUS NETWORK; U.S. patent application Ser. No. 15/253,815, filed on Aug. 31, 2016 and entitled SYSTEMS AND METHODS FOR OCCUPANCY PREDICTION; U.S. patent application Ser. No. 15/253,819; filed on Aug. 31, 2016 and entitled OCCUPANCY-BASED COMMUNICATION NETWORK; International Application No. PCT/US2016/049797, filed on Aug. 31, 2016 and entitled SYSTEM FOR CONTROLLING LIVING SPACE FEATURES; U.S. patent application Ser. No. 15/756,510, entitled SYSTEM FOR CONTROLLING LIVING SPACE FEATURES and claiming the benefit under 35 U.S.C. § 371 of International Application No. PCT/US2016/049797; U.S. patent application Ser. No. 15/145,624, filed on May 3, 2016, entitled MODULAR DEVICE CONTROL UNIT, and issuing with U.S. Pat. No. 10,069,235 on Sep. 4, 2018; and U.S. patent application Ser. No. 15/074,915, filed on Mar. 18, 2016, entitled CONFIGURABLE DEVICE CONTROL NETWORK; and issuing with U.S. Pat. No. 10,063,002 on Aug. 28, 2018. The present application also claims the benefit under 35 U.S.C. § 119(e) of U.S. Provisional Application No. 62/212,388, filed Aug. 31, 2015 and entitled METHOD AND APPARATUS FOR CONTROLLING LIGHTS.

International Application No. PCT/US2016/049797 claims the benefit of and is a continuation of U.S. patent application Ser. Nos. 15/253,811, 15/253,815, and 15/253,819, 15/145,624, 15/074,915, and U.S. Provisional Application No. 62/212,388. U.S. patent application Ser. Nos. 15/253,811, 15/253,815, and 15/253,819 claim the benefit under 35 U.S.C. § 120 of U.S. patent application Ser. Nos. 15/145,624 and 15/074,915. U.S. patent application Ser. No. 15/145,624 also claims the benefit under 35 U.S.C. § 120 of U.S. patent application Ser. No. 15/074,915. U.S. patent application Ser. Nos. 15/253,811, 15/253,815, 15/253,819, 15/145,624, 15/074,915 also claim the benefit under 35 U.S.C. § 119(e) of U.S. Provisional Application Ser. No. 62/212,388.

U.S. patent application Ser. Nos. 15/253,811, 15/253,815, 15/253,819, 15/756,510, 15/145,624, 15/074,915, International Application No. PCT/US2016/049797, and U.S. Provisional Application No. 62/212,388 are all incorporated herein by reference in their entirety. Further U.S. Pat. Nos. 10,063,002 and 10,069,235 are both incorporated herein by reference in their entirety.

TECHNICAL FIELD

The present disclosure relates generally to device controllers and, more particularly, to a method and apparatus for controlling the automation of building functions.

BACKGROUND

The modification of an existing electrical wiring system in a commercial or residential building is often difficult and/or costly. An electrical wiring system in a commercial or residential building typically includes a multitude of electrical circuits in which electrical wires are routed between a mains power source and electrical junction boxes placed at fixed locations throughout the building. Based on known or anticipated needs, certain electrical junction boxes are wired to have direct access to electrical power (e.g. an electrical outlet), while other electrical junction boxes are wired such that access to electrical power is controlled by electrical switches (e.g. a light or a switched electrical outlet). The electrical wiring is typically installed during a construction phase of the building, secured to support structures according to electrical and building codes, and covered during a finishing phase. In this regard, a modification of the existing wiring system in response to changing needs is generally limited to minor alterations of electrical connections within accessible electrical junction boxes or the installation of new electrical wiring, which often requires remodeling and/or refinishing.

Further, the replacement, repair, or alteration of the functionality of existing electrical wiring devices such as electrical outlets or switches connected to a mains power source is often performed by a journeyman due to safety concerns and/or uncertainty regarding proper wiring configurations. It would therefore be advantageous to provide a safe, time effective way for consumers to replace and/or upgrade electrical outlets or switches connected to a mains power source.

Traditional stand-alone electrical switches and outlets are reliant on existing wiring for determining which lighting elements may be controlled by a given switch. Further, stand-alone electrical switches with occupancy detection are limited to actuating electrical loads using the existing wiring. It would therefore be advantageous to provide systems and methods for integrated multi-room home control.

SUMMARY

A method for installing a user-upgradeable load control network is disclosed in accordance with one or more illustrative embodiments of the present disclosure. In one illustrative embodiment, the method includes mounting one or more backplates to electrical junction boxes distributed throughout a building, where at least some of the one or more backplates include a cavity to interchangeably accept device control assemblies. In another illustrative embodiment, at least some of the one or more backplates further include electrical contacts and a translatable cover configured to shield the electrical contacts from the cavity when translated to a closed position and to expose the electrical contacts to inserted device control assemblies. In another illustrative embodiment, at least some of the one or more backplates further include a lock to allow the cover to be translated to an open position only when any of the device control assemblies are inserted into the cavity. In another illustrative embodiment, the method includes connecting the electrical contacts of the one or more backplates to one or more electrical loads distributed throughout the building through wiring extending into the electrical junction boxes. In another illustrative embodiment, the method includes installing one or more device control assemblies into the one or more backplates by inserting the one or more device control assemblies to engage the respective locks and translating the respective covers to the open positions. In another illustrative embodiment, any of the installed device control assemblies are upgradeable by a user by translating the cover to the closed position, removing the installed device control assembly, inserting another device control assembly, and translating the cover to the open position.

A networked load control system is disclosed in accordance with one or more illustrative embodiments of the present disclosure. In one illustrative embodiment, the system includes two or more backplates configured to mount to electrical junction boxes distributed throughout a building, where the two or more backplates further include electrical contacts to connect to an electrical load through wires extending into the respective electrical junction box. In another illustrative embodiment, at least some of the two or more backplates include a cavity to interchangeably accept device control assemblies, where at least some of the two or more backplates further include a translatable cover configured to shield the respective electrical contacts from the cavity when translated to a closed position and to expose the respective electrical contacts to inserted device control assemblies. In another illustrative embodiment, the system includes two or more device control assemblies inserted into the two or more backplates. In another illustrative embodiment, at least some of the two or more device control assemblies are configured to regulate an electrical load connected to the respective backplate through wiring extending into the respective electrical junction box. In another illustrative embodiment, any of the two or more device control assemblies are configurable to provide user control of any selected electrical load connected to any selected backplate of the two or more backplates by directing, via a communication network, a corresponding device control assembly of the two or more device control assemblies inserted into the selected backplate to regulate the selected electrical load.

A mounting assembly is disclosed in accordance with one or more illustrative embodiments of the present disclosure. In one illustrative embodiment, the mounting assembly includes a backplate configured to mount to an electrical junction box and further connect to an electrical load through wiring extending into the electrical junction box. In another illustrative embodiment, the backplate includes a cavity to interchangeably accept device control assemblies. In another illustrative embodiment, the backplate further includes a translatable cover configured to shield the electrical contacts from the cavity when translated to a closed position and to expose the electrical contacts to any of the plurality of device control assemblies upon insertion into the cavity. In another illustrative embodiment, an installed device control assembly inserted into any of the two or more backplates having a first set of load-regulation functions is upgradeable by a user to another device control assembly having a different set of load-regulation functions by translating the cover to the closed position, removing the inserted device control assembly, inserting the other device control assembly, and translating the cover to an open position.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 7D is a table summarizing the pairings between device control assemblies, electrically-connected luminaires, network-connected luminaires, and sensors in a configurable network, in accordance with one or more embodiments of the present disclosure.

FIG. 7E is a table summarizing physical pairings and addressable pairings between device control assemblies and electrically-connected luminaires in a configurable network, in accordance with one or more embodiments of the present disclosure.

FIG. 7F is a table summarizing the state diagram of electrically-connected luminaires in a configurable network, in accordance with one or more embodiments of the present disclosure.

FIG. 9H is a table providing an exemplary illustration of different ways of accessing the different display models via an Off mode, in accordance with one or more embodiments of the present disclosure.

FIG. 16B is a table including an exemplary description of occupancy data at positions P1-P11 illustrated in FIG. 16A, in accordance with one or more embodiments of the present disclosure.

FIG. 17B is a table including an exemplary look-up table for predicting a subsequent occupancy state based on the path 1702 and the associated velocity vector, in accordance with one or more embodiments of the present disclosure.

FIG. 17C is a table including exemplary occupancy states for position P1, P2, and the predicted next state, in accordance with one or more embodiments of the present disclosure.

FIG. 17D is a table including an updated version of FIG. 17B based on a case in which the user enters Bedroom 2 1604, in accordance with one or more embodiments of the present disclosure.

FIG. 18B-1 is a first portion of a table (continued in FIG. 18B-2) including occupancy data illustrating the behavior of luminaires under control (LUC) in select rooms of FIG. 18A according to one exemplary embodiment, in accordance with one or more embodiments of the present disclosure.

FIG. 18B-2 is a second portion of a table (continued from FIG. 18B-2) including occupancy data illustrating the behavior of luminaires under control (LUC) in select rooms of FIG. 18A according to one exemplary embodiment, in accordance with one or more embodiments of the present disclosure.

FIG. 18C is a table including occupancy data associated with a predictive lighting system incorporating predictive occupancy data, according to another exemplary embodiment, in accordance with one or more embodiments of the present disclosure.

DETAILED DESCRIPTION

Figure 1:
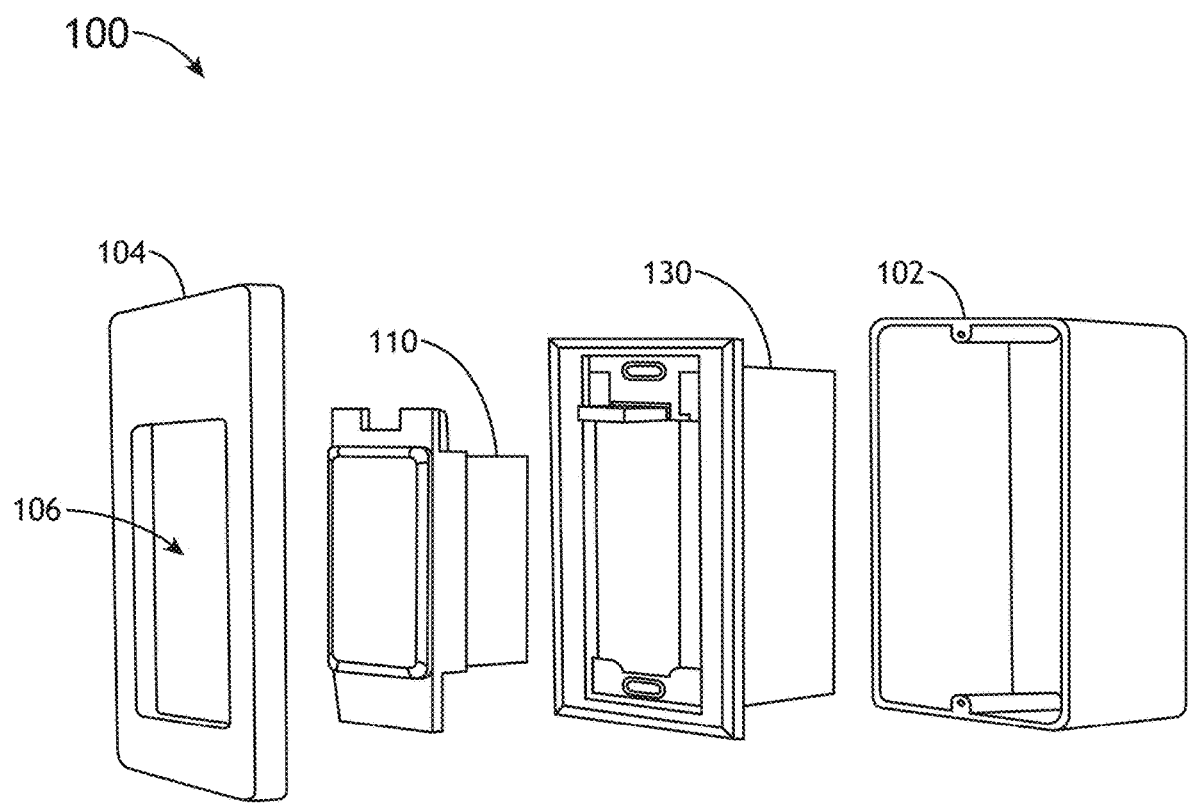
FIG. 1 is an exploded view of a modular control unit configured to mount within an electrical junction box, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Referring generally to FIGS. 1 through 22, a configurable network of device controllers to automate building functions is described, in accordance with one or more embodiments of the present disclosure. Embodiments of the present disclosure are directed to the formation of a network of device controllers that perform functions in a building. Additional embodiments of the present disclosure are directed to pairing device controllers with one or more loads in which a device controller regulates one or more paired loads. Additional embodiments are directed to device controllers in a configurable network configured to regulate any load connected to any other device controllers on the configurable network. Additional embodiments are directed to a network of backplates electrically connected to mains power to facilitate a network of modular device controllers. Additional embodiments are directed to monitoring building occupant location and determining building occupant habits. Additional embodiments of the present disclosure are directed to adjusting building functions based on predicted building occupant habits. Further embodiments of the present disclosure are directed to the automation of functions performed in a building to coincide with system settings.

It is recognized herein that an electrical wiring system of a building typically includes multiple electrical circuits to route electrical power from a power source (e.g. mains power) to multiple electrical junction boxes located throughout the building. Typically, power cables containing electrical wires are routed from a power distribution panel such as, but not limited to, an electrical fuse box, to the multiple electrical junction boxes. The electrical junction boxes may further facilitate electrical connections between the power distribution panel and one or more electrical devices or device controllers by providing an enclosure in which the electrical devices may be connected to, or otherwise terminate, the electrical wires provided by the power cable. An electrical junction box may additionally provide structural support for mounting an electrical device.

The topology of the configuration of wires between junction boxes as well as the number of wires routed between junction boxes may vary depending on the anticipated function of electrical devices to be installed within the junction boxes. Further, power cables associated with an electrical wiring system are typically routed between studs associated with walls and joists associated with ceilings of the building and are typically secured according to building and electrical codes. Accordingly, modifications of the configuration and number of wires between electrical boxes may be difficult and/or undesirable.

Embodiments of the present disclosure are directed to a configurable network of device controllers connected to the electrical wiring system and further in data communication to provide control over the regulation of electrical loads. In this regard, data communication between device controllers supplements and/or expands the capabilities of wired electrical connections associated with the electrical wiring system to provide fully customizable control over load regulation. Further embodiments of the present disclosure are directed to incorporating additional devices (e.g. shades, sensors, luminaires, electrical appliances, or the like) to the configurable network of device controllers. Additional embodiments of the present disclosure are directed to modular control units with interchangeable device control assemblies for flexible modification of the configurable network of device controllers.

Further embodiments of the present disclosure are directed to a network of device controllers having occupancy detection capabilities. In this regard, each device controller may detect occupancy in a zone surrounding the device controller and share the occupancy data to all device controllers in the network. Additional embodiments of the present disclosure are directed to device controllers having biometric recognition capabilities for occupancy detection. Additional embodiments of the present disclosure are directed to tracking and predicting occupancy patterns of one or more users. Additional embodiments are directed to an occupancy-based multi-directional communication system. In this regard, device controllers may provide audio/video intercom communication between select rooms based on occupancy. Additional embodiments of the present disclosure are directed to an occupancy-based multi-directional communication system that tracks occupants and adjusts which device controllers are associated with intercom communication based on occupancy. Additional embodiments of the present disclosure are directed to an occupancy-based security system.

FIG. 1 is an exploded view of a modular control unit 100 configured to mount within an electrical junction box 102, in accordance with one or more embodiments of the present disclosure. In some embodiments, the modular control unit 100 includes a backplate 130 configured to mount within the electrical junction box 102 and provide an electrical connection to an electrical wiring system. In some embodiments, a modular control unit 100 includes a device control assembly 110 to control one or more load devices that is configured to removably couple with the backplate 130. Further, the modular control unit 100 may include a faceplate 104 configured to cover the electrical junction box 102. In this regard, a backplate 130 may provide a standardized mounting assembly for device control assemblies 110. Further, device control assemblies 110 may be removably and/or interchangeably connected to the electrical wiring system through the backplate 130.

For the purposes of the present disclosure, a load device may include any device directly or indirectly attached to the electrical wiring system. For example, a load device may include a wired load such as, but not limited to, a luminaire, a fan, or an appliance. As an additional example, a load device may include an electrical outlet into which loads may be removably connected.

In some embodiments, a device control assembly 110 includes electrical circuitry and/or mechanical components to actuate, regulate, or otherwise control one or more load devices connected to the electrical wiring system. For example, a device control assembly 110 may include, but is not limited to, one or more input devices, one or more buttons, one or more mechanical switches (e.g., a single switch, a duplex switch, a triplex switch, or the like), one or more electrical relays, one or more MOSFETs (metal-oxide-semiconductor field-effect transistors) or one or more TRI-ACs (triode for alternating current). In this regard, a device control assembly 110 may include, but is not limited to, a toggle switch, a dimmer switch, an alternating current (AC) electrical outlet, a direct current (DC) electrical outlet (e.g. a universal serial bus (USB) outlet), or a multi-function keypad. Additionally, a device control assembly 110 may include, but is not limited to, one or more display devices, one or more speakers, one or more microphones, or one or more sensors.

In some embodiments, the backplate 130 is configured to electrically connect to an electrical wiring system through the electrical junction box 102. For example, the backplate 130 may connect to a power distribution panel through an electrical wiring system terminated at the electrical junction box 102. Additionally, the backplate 130 may be configured to terminate a power cable with any number of conductors such as, but not limited to, a two-conductor power cable, a three-conductor power cable, or a four-conductor power cable. It is noted herein that the backplate 130 may be compatible with any electrical wiring system in any configuration. For example, the backplate 130 may, but is not limited to, be configured to accept a wire connected to a ground source (e.g. a "ground" wire), a wire connected to a power source (e.g. a "hot" wire), a wire connected to a neutral bar (e.g. a "neutral" wire), or one or more additional wires (e.g. one or more "traveler" wires). Further, the backplate 130 may be configured to accept any gauge of wire. In some embodiments, the backplate 130 accepts 14-gauge wire (e.g. from a 14/2 power cable or a 14/3 power cable). In some embodiments, the backplate 130 accepts 12-gauge wire (e.g. from a 12/2 power cable or a 12/3 power cable). It is recognized herein that electrical systems may include any number of switches or connections between components. As such, the description of electrical wiring systems above is presented solely for illustrative purposes and should not be interpreted as limiting.

A backplate 130 may be electrically connected to an electrical wiring system through the electrical junction box 102. In some embodiments, a backplate 130 is configured to connect to an electrical wiring system through twist-on wire connectors. For example, a backplate 130 may include one or more wires suitable for connecting to a power cable through twist-on wire connectors. In some embodiments, the backplate 130 is configured to connect to an electrical wiring system through push-in wire connectors. For example, a backplate 130 may include one or more push-in connectors to connect to conductors in a power cable such as, but not limited to, a "hot" wire, a "neutral" wire, a "ground" wire, or a "traveler" wire.

In some embodiments, a backplate 130 is configured to interchangeably couple to device control assemblies 110 without modification of the connection between the backplate 130 and the electrical wiring network. For example, a device control assembly 110 configured to operate as a toggle switch may be removed and replaced with a device control assembly 110 configured to operate as a dimmer switch without modification to the backplate 130 or the associated electrical connections to the electrical wiring network. In this regard, the modular control unit 100 may provide a semi-permanent element (e.g. a backplate 130 attached to an electrical junction box 102 via one or more screws) connected to the electrical wiring system that may further couple to interchangeable functional units (e.g. a device control assembly 110).

In some embodiments, a device control assembly 110 may be inserted into or removed from a backplate 130 while a backplate 130 is connected to live power from the electrical wiring assembly. For example, an electrical connection established between a backplate 130 and a device control assembly 110 may be configured to establish a ground connection prior to establishing a "hot" wire connection.

A backplate 130 may be configured to occupy one or more device positions within an electrical junction box 102. In some embodiments, a backplate 130 is configured to occupy one position within an electrical junction box 102. In this manner, a single backplate 130 may be mounted to a 1-gang electrical junction box 102, two backplates 130 may be mounted to a 2-gang electrical junction box 102, or the like. Further, a backplate 130 may be mounted to an electrical junction box 102 alongside one or more additional devices. For example, a backplate 130 and a typical light switch may be mounted within 2-gang electrical junction box 102. In some embodiments, a backplate 130 is configured to occupy two or more positions within an electrical junction box 102. For example, a single backplate 130 may be configured to accept two or more device control assemblies 110 such that each device control assembly 110 effectively occupies a single position within the electrical junction box 102. As an additional example, a backplate 130 occupying two or more positions within an electrical junction box 102 may accept one or more device control assemblies 110 of any size. In this regard, a single device control assembly 110 may effectively occupy any portion of an electrical junction box 102.

In some embodiments, the modular control unit 100 includes a faceplate 104 to cover a portion of the electrical junction box 102 not covered by the backplate 130 or the device control assembly 110. In some embodiments, the faceplate 104 includes one or more openings 106 to provide access to one or more elements of the device control assembly 110. For example, the faceplate 104 may include, but is not limited to, one or more openings 106 to provide access to one or more displays, one or more speakers, one or more microphones, one or more antennas, or one or more sensors associated with a device control assembly. In some embodiments, the faceplate 104 provides access to one or more elements of the device control assembly 110 while covering exposed areas of the electrical junction box 102. For example, a device control assembly 110 and/or a backplate 130 attached to an electrical junction box 102 may leave one or more areas of the electrical junction box 102 exposed. In this regard, a faceplate 104 may cover the one or more exposed areas of the electrical junction box 102.

A device control assembly 110 may couple with a backplate 130 by any method known in the art suitable for providing a data connection and/or an electrical power connection between the device control assembly 110 and the backplate 130. For example, a device control assembly 110 may connect to a backplate 130 by way of a wired connection. In this regard, each of the device control assembly 110 and the backplate 130 may include one or more components suitable for providing a wired data connection and/or a wired electrical connection such as, but not limited to, one or more wires, one or more electrical contacts, or one or more electrical connectors. By way of another example, a device control assembly 110 may connect to a backplate 130, which may include one or more components suitable for providing a wireless data connection and/or a wireless electrical connection such as, but not limited to, one or more inductive coils, one or more wireless transmitters, or one or more wireless receivers.

In some embodiments, a device control assembly 110 couples to a backplate 130 without the need for external tools (e.g. screwdrivers, pliers, or the like) to insert or remove the device control assembly 110 from the backplate 130. In this regard, the device control assembly 110 and/or the backplate 130 includes latching and/or locking mechanisms suitable for interchangeably coupling a device control assembly 110 to a backplate 130 by hand.

It is noted herein that the above description of the modular control unit 100 is provided for illustrative purposes only and should not be interpreted as limiting. For example, the modular control unit 100 may include any combination of a device control assembly 110 and a faceplate 104 or a backplate 130. In some embodiments, the modular control unit 100 includes a device control assembly 110 and a faceplate 104. For example, a device control assembly 110 may include a mounting assembly configured to mount to an electrical junction box 102 and further configured to connect to electrical wiring within the electrical junction box 102. In this regard, the device control assembly 110 is configured to connect with the electrical wiring system without a backplate 130. In some embodiments, the modular control unit 100 includes a device control assembly 110 and a backplate 130. In this regard, a mounting assembly may include a backplate 130 such that the backplate 130 may be semi-permanently connected to the electrical junction box 102, provide one or more connections to electrical wiring within the electrical junction box 102, and provide for interchangeable coupling and/or toolless coupling with a device control assembly 110. In some embodiments, the modular control unit 100 does not include a faceplate 104. In this way, the device control assembly 110 may fully cover the electrical junction box 102 when coupled with a backplate 130. In some embodiments, the modular control unit 100 includes a device control assembly 110 configured to directly connect to the electrical wiring system and fully cover the electrical box 102 without a faceplate 104.

In some embodiments, a modular control unit 100 may include one or more components suitable for wired connections between a backplate 130 and a device control assembly 110. In this regard, data and/or electrical power may be transferred between the backplate 130 and the device control assembly 110. For example, the backplate 130 may contain, but is not required to contain, logic, memory or a communication transceiver. Further, the communication transceiver might use a technique such as, but not limited to, one-wire, I2C, SPI, USB, or a serial communication interface for data transfer.

FIGS. 2A through 2F illustrate a modular control unit 100 including a backplate 130 configured to interchangeably couple with device control assemblies 110 by way of a wired electrical connection, in accordance with one or more embodiments of the present disclosure. In some embodiments, the backplate 130 includes one or more backplate contacts 140 to provide one or more electrical connections between an electrical wiring assembly (e.g. one or more power cables) and the one or more contact pads 118 of an inserted device control assembly 110. In some embodiments, the one or more backplate contacts 140 are shielded (e.g. from a user) when no device control assembly 110 is present. In this regard, access to the backplate contacts 140 and, consequently, access to the electrical wiring system, is provided solely upon insertion of a device control assembly 110.

In some embodiments, the backplate 130 includes an air gap actuator 144 to provide access to backplate contacts 140 while engaged in an open position and prohibit access to backplate contacts 140 while engaged in a closed position. The air gap actuator 144 may translate between a closed position and an open position to regulate access to the backplate contacts 140. The air gap actuator 144 may be formed from any material known in the art suitable for insulating electrical contacts. For example, the air gap actuator 144 may, but is not limited to, include acrylic, acetal, A.B.S. (acrylonitrile, butadiene, and styrene), polystyrene, nylon, P.E.T. (polyethylene terephthalate), polycarbonate, polyurethane, PVC, or PTFE (poly-tetra-fluoro-ethylene).

In some embodiments, the backplate 130 includes an air gap actuator lock 148 configured to regulate the movement of the air gap actuator 144. In some embodiments, the air gap actuator lock 148 is configured to translate between a locked position and an unlocked position. In some embodiments, a spring 150 is connected to the backplate board assembly 146 and the air gap actuator lock 148 to force the air gap actuator lock 148 into a locked position unless a counter-force is applied. In this regard, a force must be applied to translate the air gap actuator lock 148 to an unlocked position. Further, it is noted that the backplate 130 may be configured (e.g. via the air gap actuator 144, an air gap actuator lock 148, a locking lever 152, keyed features 158, or the like) such that the air gap actuator 144 may only occupy an open position (e.g. to provide access to backplate contacts 140) when coupled to a device control assembly 110.

Figure 2A:
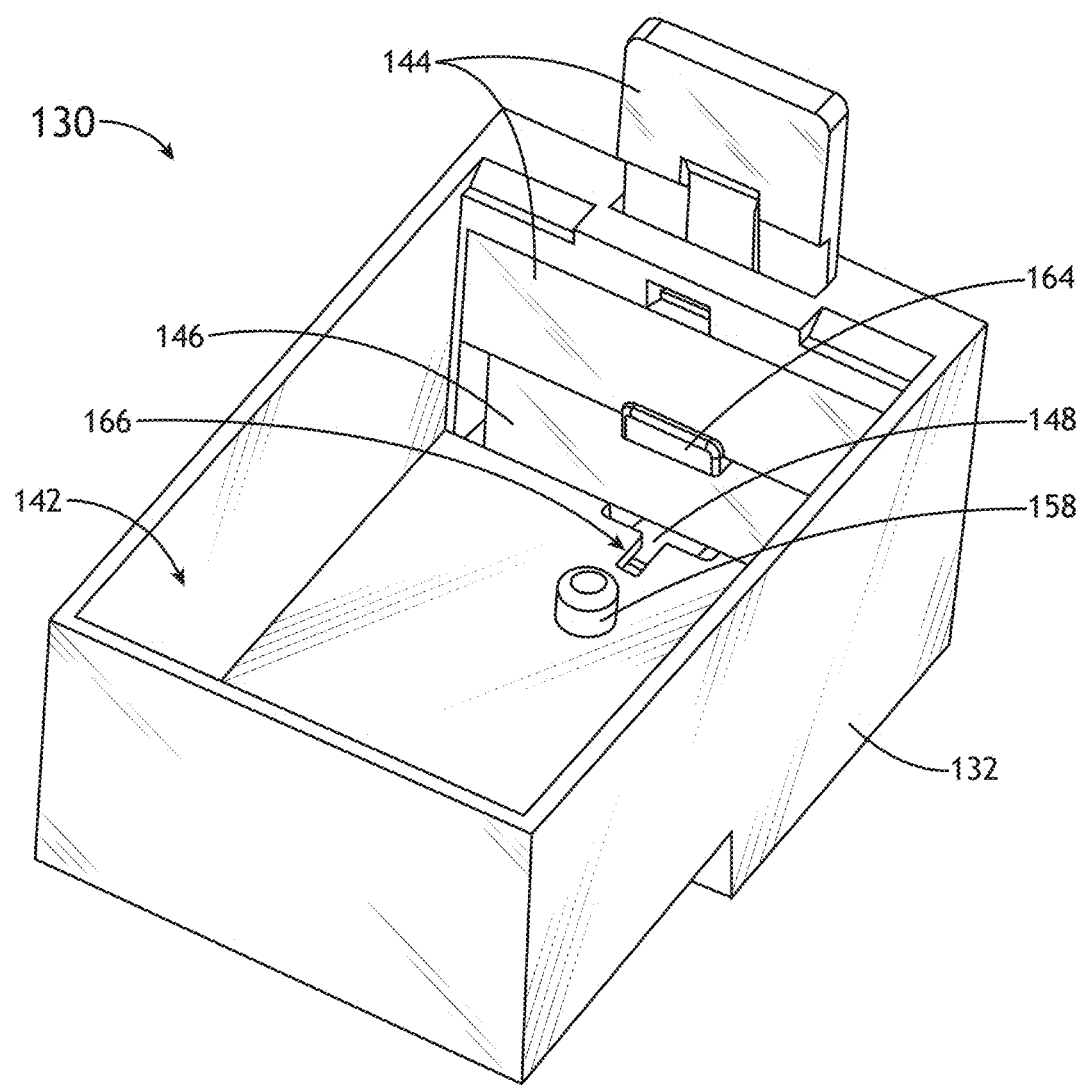
FIG. 2A is an isometric view illustrating a backplate with an air gap actuator in a closed position and including a recessed air gap actuator lock accessible through an opening in an inner wall of the casing of the backplate, in accordance with one or more embodiments of the present disclosure.
Figure 2B:
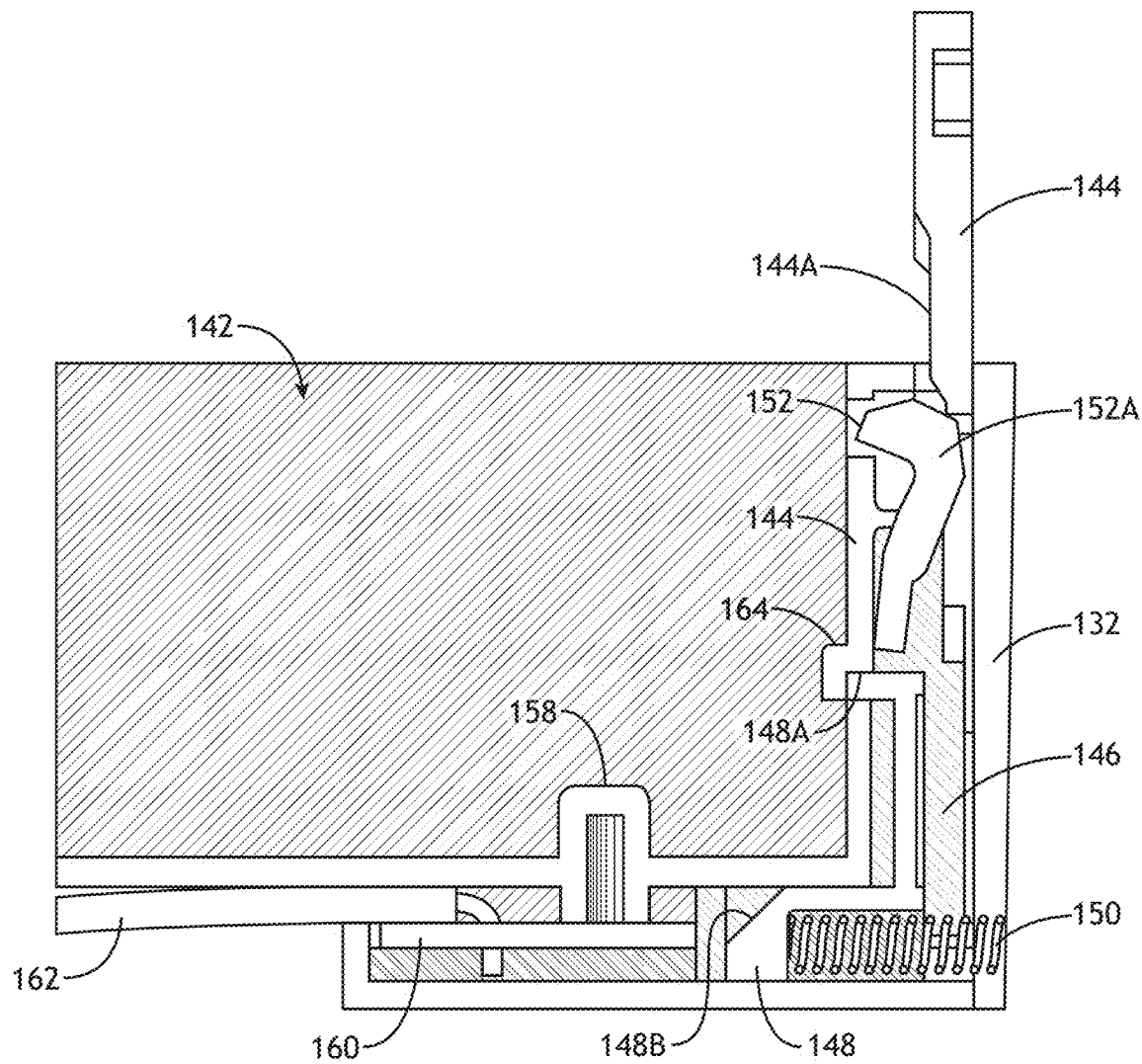
FIG. 2B is a cross-sectional view illustrating a backplate with an air gap actuator in a closed position and including a recessed air gap actuator lock accessible through an opening in an inner wall of the casing of the backplate, in accordance with one or more embodiments of the present disclosure.
Figure 2C:
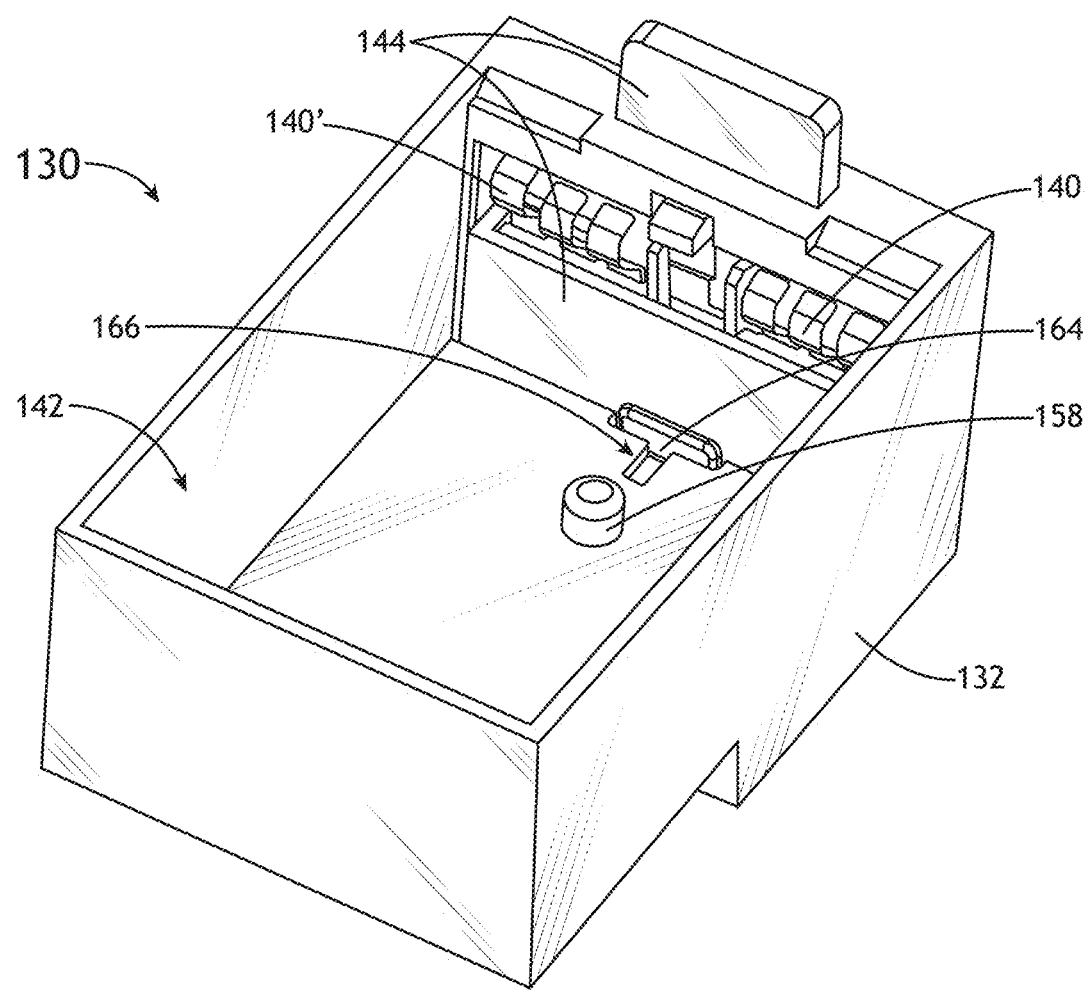
FIG. 2C is an isometric view illustrating a backplate with an air gap actuator in an open position and a recessed air gap actuator lock, in accordance with one or more embodiments of the present disclosure.
Figure 2D:
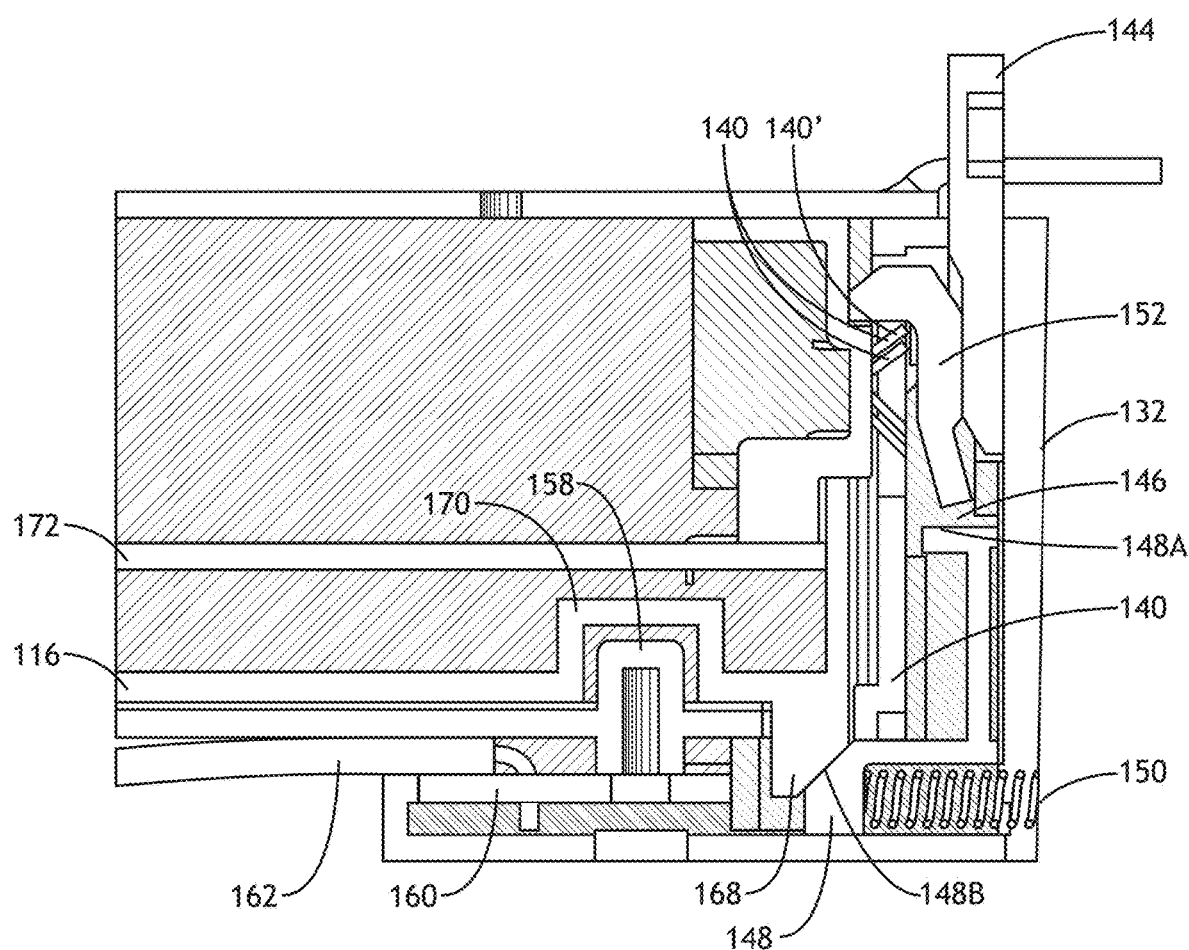
FIG. 2D is a cross-sectional view illustrating a backplate with an air gap actuator in an open position and a recessed air gap actuator lock, in accordance with one or more embodiments of the present disclosure.

FIGS. 2A and 2B are isometric and cross-sectional views illustrating a backplate 130 with an air gap actuator 144 (e.g., a backplate contact cover) in a closed position and including a recessed air gap actuator lock 148 accessible through an opening 166 in an inner wall of the casing 132 of the backplate 130. FIGS. 2C and 2D are isometric and cross-sectional views illustrating a backplate 130 with an air gap actuator 144 in an open position and a recessed air gap actuator lock 148. FIG. 2C illustrates the backplate 130 without a coupled device control assembly 110 and FIG. 2D illustrates the backplate 130 with a coupled device control assembly 110 for illustrative purposes.

Figure 2E:
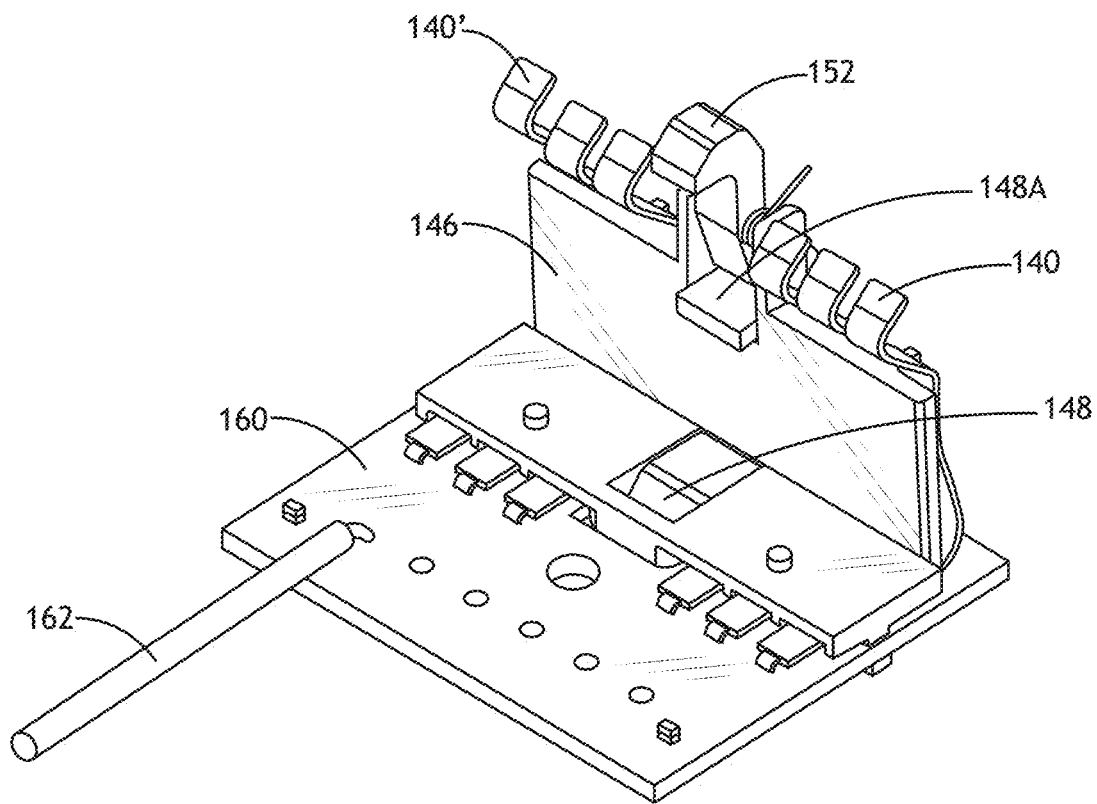
FIG. 2E is an isometric view of a backplate board assembly to mount the backplate contacts illustrating the recessed air gap actuator lock, in accordance with one or more embodiments of the present disclosure.
Figure 2F:
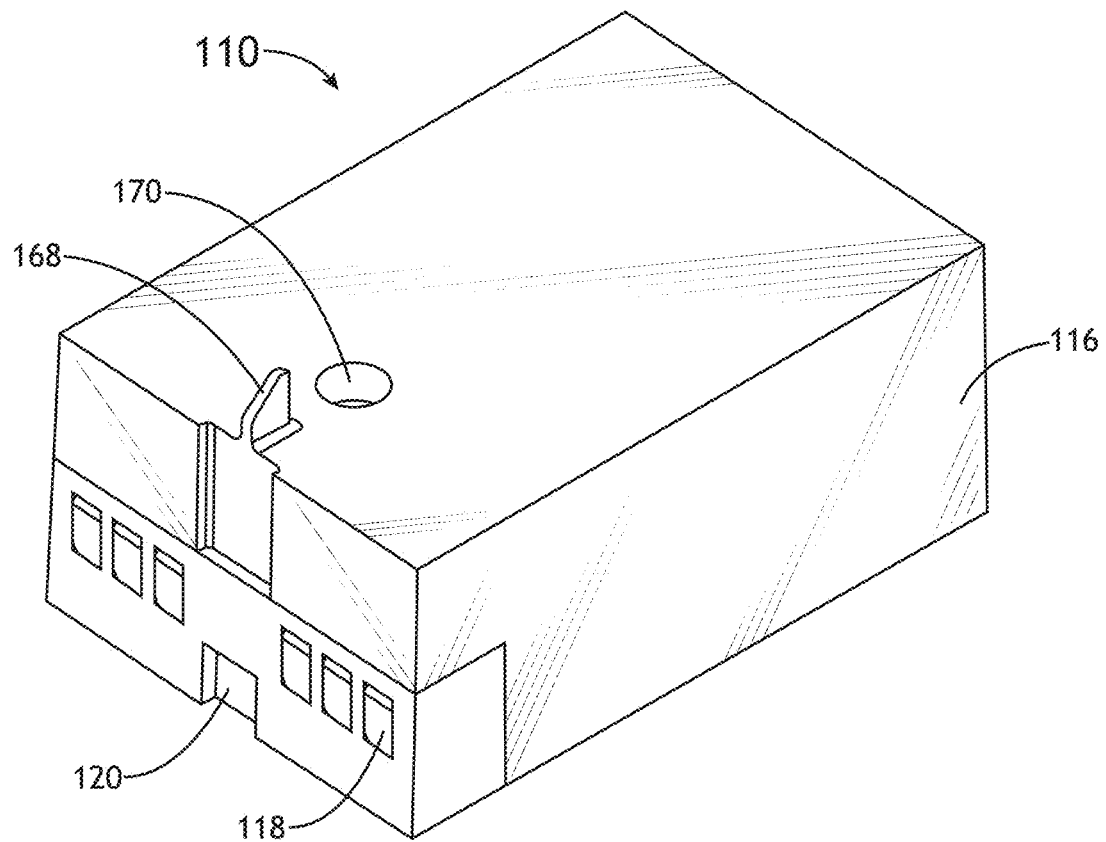
FIG. 2F is an isometric view illustrating a back side of a device control assembly including a coupling tab, in accordance with one or more embodiments of the present disclosure.

FIG. 2E is an isometric view of a backplate board assembly 146 illustrating the backplate contacts 140 and a recessed air gap actuator lock 148. FIG. 2F is an isometric view illustrating a back side of a device control assembly 110 including a coupling tab 168. For example, the coupling tab 168 may pass through opening 166 of the backplate 130 to actuate the air gap actuator lock 148 when coupling the device control assembly 110 to the backplate 130.

In some embodiments, the backplate 130 includes a casing 132 forming a partially enclosed opening 142 (e.g. a cavity, or the like) to receive a device control assembly 110. In some embodiments, the casing 132 of the backplate 130 includes one or more keyed features 158 to facilitate alignment of a device control assembly 110 into a backplate 130. The one or more keyed features 158 may be of any type known in the art. For example, the one or more keyed features 158 may include, but are not limited to, raised features, recessed features, or grooves. In some embodiments, a keyed feature 158 is a raised feature with a height equal to or greater than a height of the air gap actuator lock 148 in a locked position. In this regard, air gap actuator lock 148 is accessible to objects with one or more corresponding keyed features (e.g. keyed features 170 on a device control assembly 110).

In some embodiments, the opening 166 in the casing 132 of the backplate 130 is configured to restrict access to the air gap actuator lock 148. For example, the opening 166 may have a restrictive size (e.g. smaller than a human fingertip, or the like) to prevent undesired objects (e.g. a human fingertip, or the like) from accessing the air gap actuator lock 148. In this regard, the opening 166 and the coupling tab 168 may operate as keyed features with corresponding shapes such that the coupling tab 168 may be inserted into the opening 166 only when the device control assembly 110 is properly oriented.

In some embodiments, the air gap actuator lock 148 includes a blocking feature 148A (e.g. a portion of the air gap actuator lock 148, or the like). For example, the blocking feature 148A of the air gap actuator lock 148 may restrict the motion of the air gap actuator 144 (e.g. by occupying a portion of a translation path of the air gap actuator 144, or the like). In this regard, the blocking feature 148A may prevent the air gap actuator 144 from translating to the open position (e.g. to expose the backplate contacts 140) when the air gap actuator lock 148 is locked. In some embodiments, translation of the air gap actuator lock 148 to the unlocked position provides clearance for the air gap actuator 144 to translate to the open position. Further, the air gap actuator lock 148 may be maintained in a locked position (e.g. to prevent the air gap actuator 144 from translating from a closed position to an open position) by a spring 150.

In some embodiments, the air gap actuator lock 148 may be translated to an unlocked position by coupling with a coupling tab 168 of a device control assembly 110 during insertion. For example, the insertion of a device control assembly 110 into a backplate 130 may provide a force to translate the air gap actuator lock 148 (e.g. via the coupling tab 168) to an unlocked position. Accordingly, the translation of the air gap actuator lock 148 may translate the blocking feature 148A out of the translation path of the air gap actuator 144. In this regard, the air gap actuator 144 may translate to an open position to expose the backplate contacts 140 to the inserted device control assembly 110.

In some embodiments, the air gap actuator 144 includes a shroud 164 to conceal the blocking feature 148A of the air gap actuator lock 148 when the air gap actuator 144 is in the closed position (e.g. as illustrated in FIG. 2C). In this regard, the shroud 164 restricts access to the blocking feature 148A of the air gap actuator lock 148 (e.g. to a user, or the like).

In some embodiments, the air gap actuator lock 148 includes a graded feature 148B (e.g. a portion of the air gap actuator lock 148, or the like) to provide contact with a device control assembly 110 during coupling between the device control assembly 110 and the backplate 130. For example, contact between the coupling tab 168 of the device control assembly 110 and the graded feature 148B of the air gap actuator lock 148 may cause the air gap actuator lock 148 to translate from a locked position to an unlocked position (e.g. in a direction orthogonal to the motion of the coupling tab 168 as shown in FIGS. 2B and 2D). The graded portion 148B of the air gap actuator lock 148 may have any shape suitable for translating the air gap actuator lock 148 to a locked position upon insertion of a device control assembly 110 such as, but not limited to, a flat graded surface (e.g. a surface at a 45 degree angle relative to the translation direction) or a curved surface.

In some embodiments, the position of the air gap actuator 144 may be modified (e.g., by a user) when the air gap actuator lock 148 is translated to the unlocked position through the insertion of a device control assembly 110. In some embodiments, a position of the air gap actuator 144 (e.g., when the air gap actuator lock 148 is in the unlocked position) is maintained through friction associated with one or more adjacent elements (e.g. the casing 132). In some embodiments, the air gap actuator 144 is held in tension (e.g. by a spring) to force the air gap actuator 144 to remain in the closed position unless a counter-force is applied. In this regard, a force must be applied to translate the air gap actuator 144 from a closed position to an open position. In some embodiments, the position of the air gap actuator 144 is governed by a bi-stable system (not shown). For example, the air gap actuator 144 may be connected to a spring and one or more ratchets such that the air gap actuator 144 may be locked in either the open or a closed position. In this regard, an air gap actuator 144 in a closed position and held in tension by a spring may be transitioned to an open position by depressing the air gap actuator 144 past a center-point of a ratchet such that the ratchet locks the air gap actuator 144 in the open position. Similarly, the air gap actuator 144 locked in the open position may be transitioned to and locked in the closed position by depressing the air gap actuator 144 past a center-point of a ratchet.

In some embodiments, the backplate 130 includes a locking lever 152 to secure a device control assembly 110 to the backplate 130 when the air gap actuator 144 is in an open position (e.g. the backplate contacts 140 are in connection with the contact pads 118 of the device control assembly 110). For example, the locking lever 152 may couple to locking features 120 to secure an inserted device control assembly 110 to the backplate 130. In some embodiments, the locking lever 152 is mounted to a rod on the backplate board assembly 146 and held in tension against the air gap actuator 144 via a torsion spring 150. Further, the motion of the locking lever 152 may be governed by the position of the air gap actuator 144. For example, the air gap actuator 144 may include a graded portion 144A to couple with a graded portion 152A of the locking lever 152. In this regard, the locking lever 152 may rotate to provide clearance for a device control assembly 110 (not shown) when the air gap actuator 144 is in a closed position (e.g. as illustrated in FIG. 2B). Similarly, the locking lever 152 may be rotated to couple with locking features 120 of a device control assembly 110 as the air gap actuator 144 translates to an open position (e.g. as illustrated in FIG. 2D).

Figure 2G:
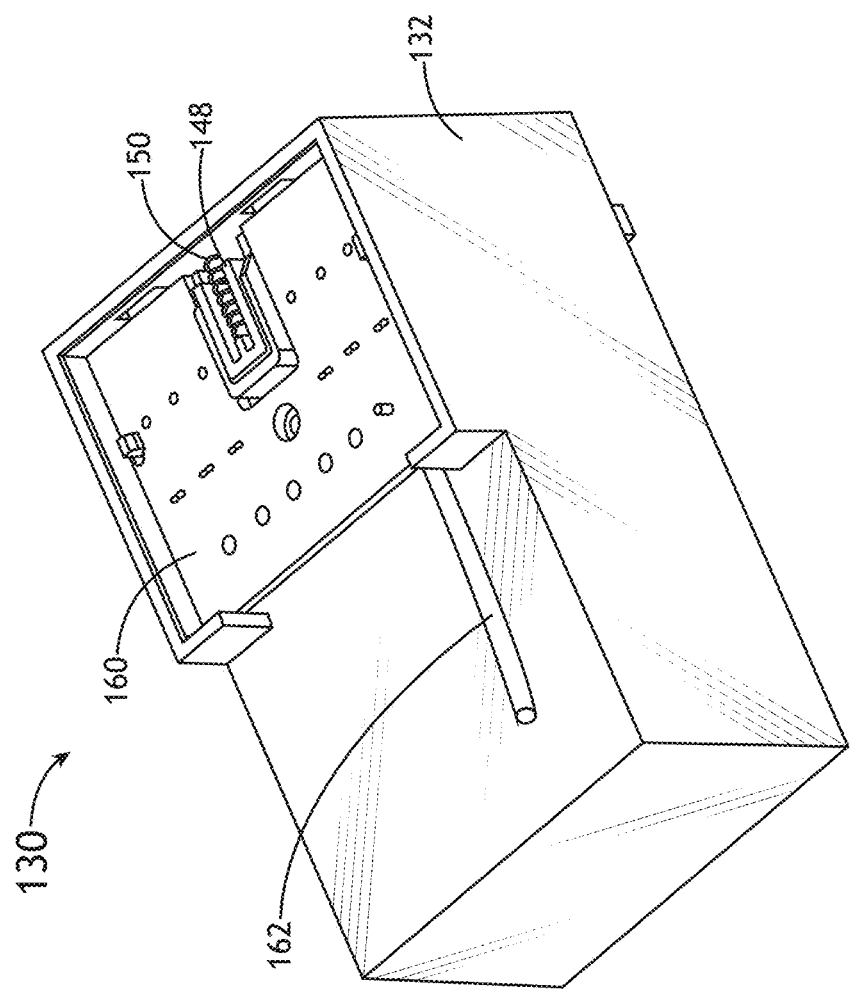
FIG. 2G is an isometric view of the back side of a backplate, in accordance with one or more embodiments of the present disclosure.

FIG. 2G is an isometric view of a back side of a backplate 130 illustrating the air gap actuator lock 148, spring 150, and circuit board 160. In some embodiments, the backplate 130 includes one or more connection wires 162 to provide one or more electrical connections between the one or more backplate contacts 140 and the electrical wiring system (e.g. one or more power cables). For example, the one or more connection wires 162 may connect directly to the one or more backplate contacts 140. As another example, the one or more connection wires 162 may connect to a circuit board 160. In this regard, the backplate 130 may include one or more power control elements (one or more resistors, one or more capacitors, one or more transistors, one or more diodes, one or more TRIACs, or the like) to monitor or manipulate the flow of electricity between an installed device control assembly 110 and the electrical wiring system.

Figure 2H:
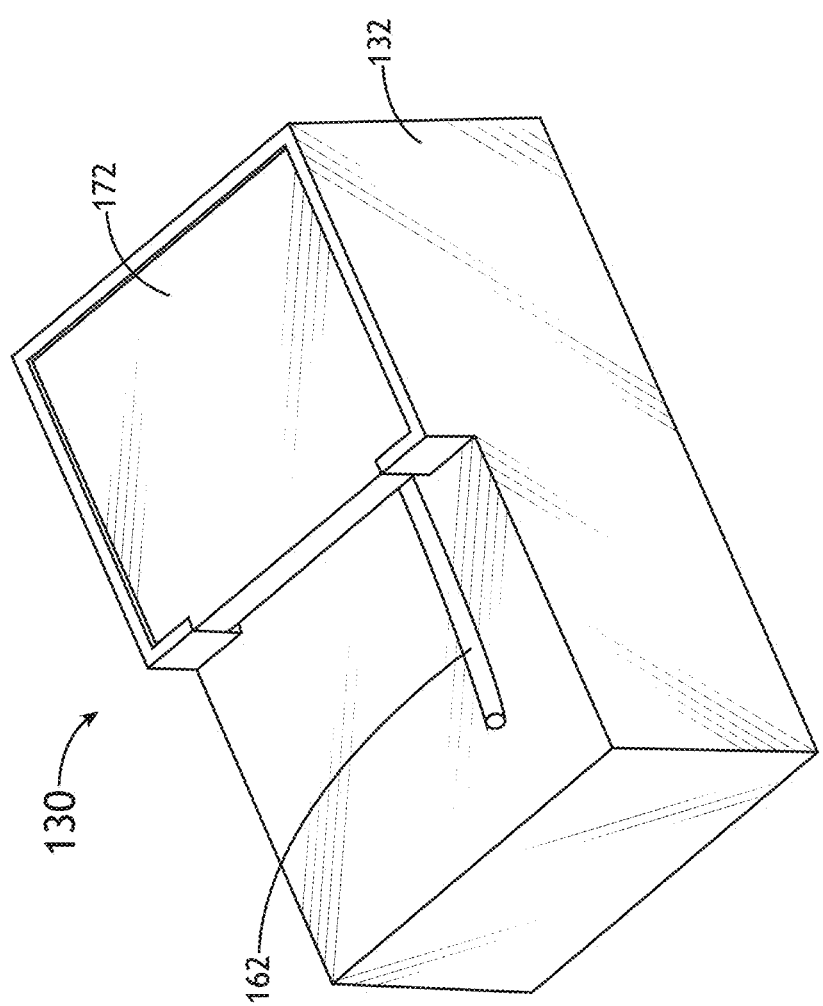
FIG. 2H is an isometric view of the back side of a backplate, in accordance with one or more embodiments of the present disclosure.

FIG. 2H is an is an isometric view of a back side of a backplate 130 illustrating a circuit board cover 172 to restrict access to internal components of the backplate 130 (e.g. the air gap actuator lock 148, spring 150, circuit board 160, or the like). In some embodiments, the circuit board cover 172 is removably accessible (e.g. to a user). For example, the circuit board cover 172 may be removably attached to the casing 132 of the backplate with one or more screws, one or more flexible tabs, or the like.

In some embodiments, a backplate contact 140 is formed from a conducting material such as, but not limited to, brass. In some embodiments, a backplate contact 140 maintains electrical contact with a contact pad 118 of a device control assembly 110 through pressure. In some embodiments, a backplate contact 140 is mounted to the backplate board assembly 146 in a cantilevered configuration. For example, a cantilevered portion of a backplate contact 140 may extend to a position in the opening 142 of the casing 132 (e.g. see FIGS. 2C and 2D). In this regard, a device control assembly 110 inserted into the opening 142 of the casing 132 will provide pressure between the one or more contact pads 118 and the one or more backplate contacts 140 to establish and/or maintain an electrical connection. Further, the one or more backplate contacts 140 may be connected to the electrical wiring assembly through a circuit board 160.

In some embodiments, the device control assembly 110 includes one or more contact pads 118 to provide an electrical connection from the backplate 130 to the electronic components within the casing 116. In this regard, the device control assembly 110 may be connected to the electrical wiring system through the backplate 130. The contact pads 118 may be formed from any material known in the art suitable for providing an electrical connection between the device control assembly 110 and the backplate 130 such as, but not limited to, brass. In some embodiments, the device control assembly 110 includes one or more locking features 120 for securing the device control assembly 110 to the backplate 130 when an electrical connection between the device control assembly 110 and the backplate 130 is established.

In some embodiments, electrical connections between backplate contacts 140 and contact pads 118 of an inserted device control assembly 110 are provided in an ordered configuration. For example, a backplate contact 140 associated with a ground connection between the backplate 130 and the inserted device control assembly 110 (e.g. associated with a ground wire from the electrical wiring system, a common ground between the backplate 130 and the device control assembly 110, or the like) may be provided prior to establishing one or more additional electrical connections (e.g. a "hot" connection, or the like). In this regard, providing an ordered configuration of electrical connections between the backplate 130 and the device control assembly 110 may facilitate the connection and/or disconnection of a device control assembly 110 from a backplate 130 when the backplate 130 is connected to a "live" power source (e.g., via wires 162). For example, an ordered configuration of electrical connections may prevent damage (e.g. due to arcing, or the like) to the backplate 130 and/or the device control assembly 110. In some embodiments, the order in which electrical connections are made between pairs of contact pads 118 and backplate contacts 140 is determined by the relative positions of the backplate contacts 140 and/or the contact pads 118. For example, as shown in FIGS. 2C, 2D and 2E, in some embodiments, one or more backplate contacts 140' may extend further in a direction towards a front face of the backplate 130 than other backplate contacts 140. Accordingly, an electrical connection between backplate contact 140' and a corresponding contact pad 118 may be provided prior to other electrical connections between backplate contacts 140 and corresponding contact pads 118. In some embodiments, though not shown, a position of one or more contact pads 118 may be configured to provide ordered electrical connections between backplate contacts 140 and contact pads 118.

Figure 3A:
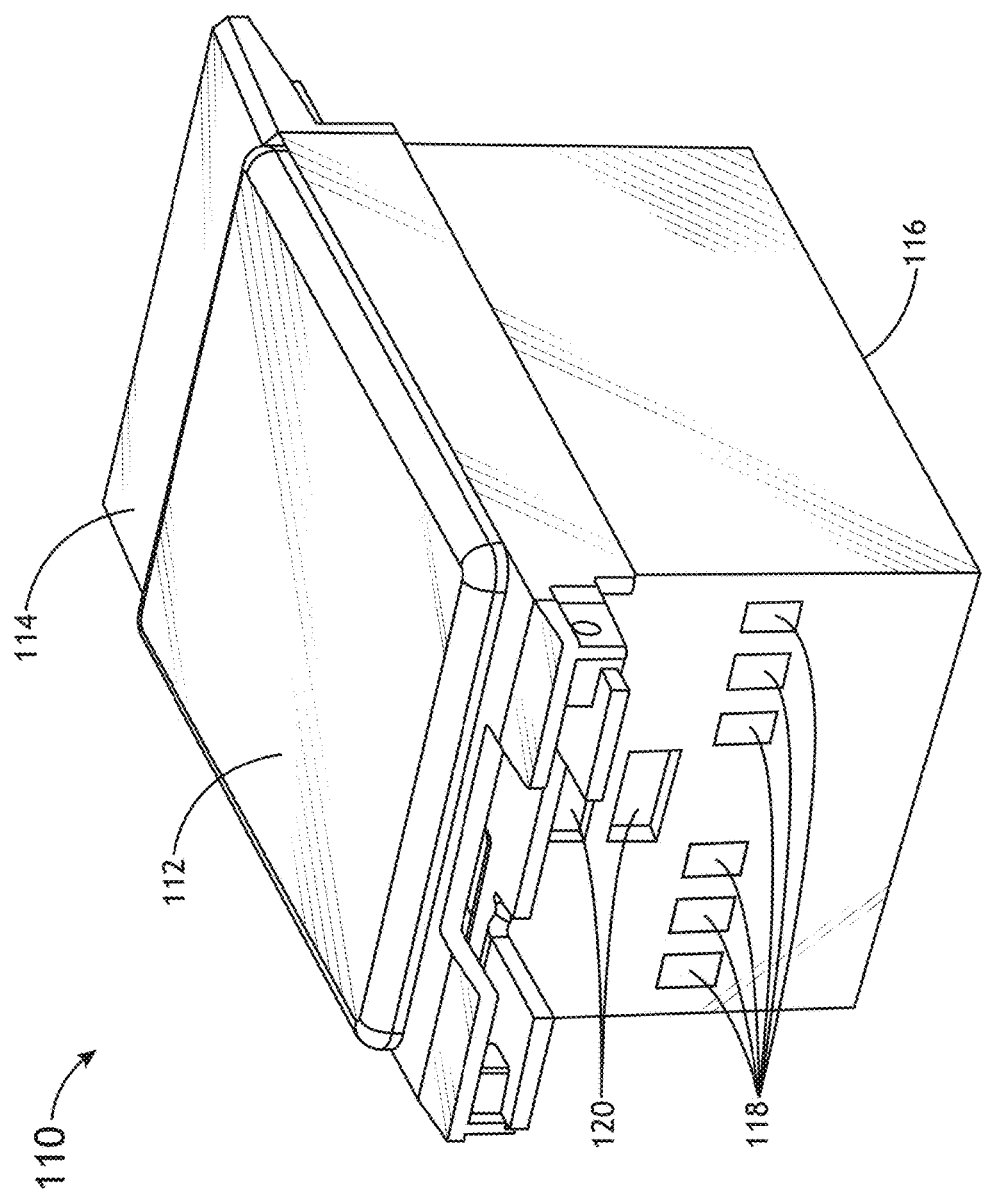
FIG. 3A is an isometric view of a device control assembly, in accordance with one or more embodiments of the present disclosure.

FIG. 3A is an isometric view of a device control assembly 110, in accordance with one or more embodiments of the present disclosure. In some embodiments, the device control assembly 110 includes a user interface 112 to accept one or more input signals. For example, the user interface 112 may include, but is not limited to, one or more touch-sensitive displays, one or more switches (e.g., mechanical switches, touch-sensitive switches, or the like), one or more variable controllers (e.g., dials, sliders, or the like). In some embodiments, the device control assembly 110 includes a single user interface 112 (e.g., a touch-sensitive display) suitable for separately controlling multiple loads. In some embodiments, the device control assembly 110 includes multiple user interfaces 112 (e.g., multiple displays, multiple switches, multiple variable controllers, or a combination thereof) suitable for controlling multiple loads.

In some embodiments, the device control assembly 110 includes a sensor panel 114 for housing one or more sensors. For example, the sensor panel may, but is not limited to, house a microphone, a speaker, and/or an occupancy sensor. In some embodiments, the user interface 112 and/or the sensor panel 114 are exposed (e.g. to a user) through the one or more openings 106 of the faceplate 104.

In some embodiments, the device control assembly 110 includes a casing 116 to enclose one or more electronic and/or mechanical components (e.g. components associated with the user interface 112, components associated with load regulation, one or more sensors within the sensor panel 114, or the like). In some embodiments, the casing 116 provides a sealed enclosure. Further, access to contents within the casing 116 may be provided via one or more removable panels (not shown).

Figure 3B:
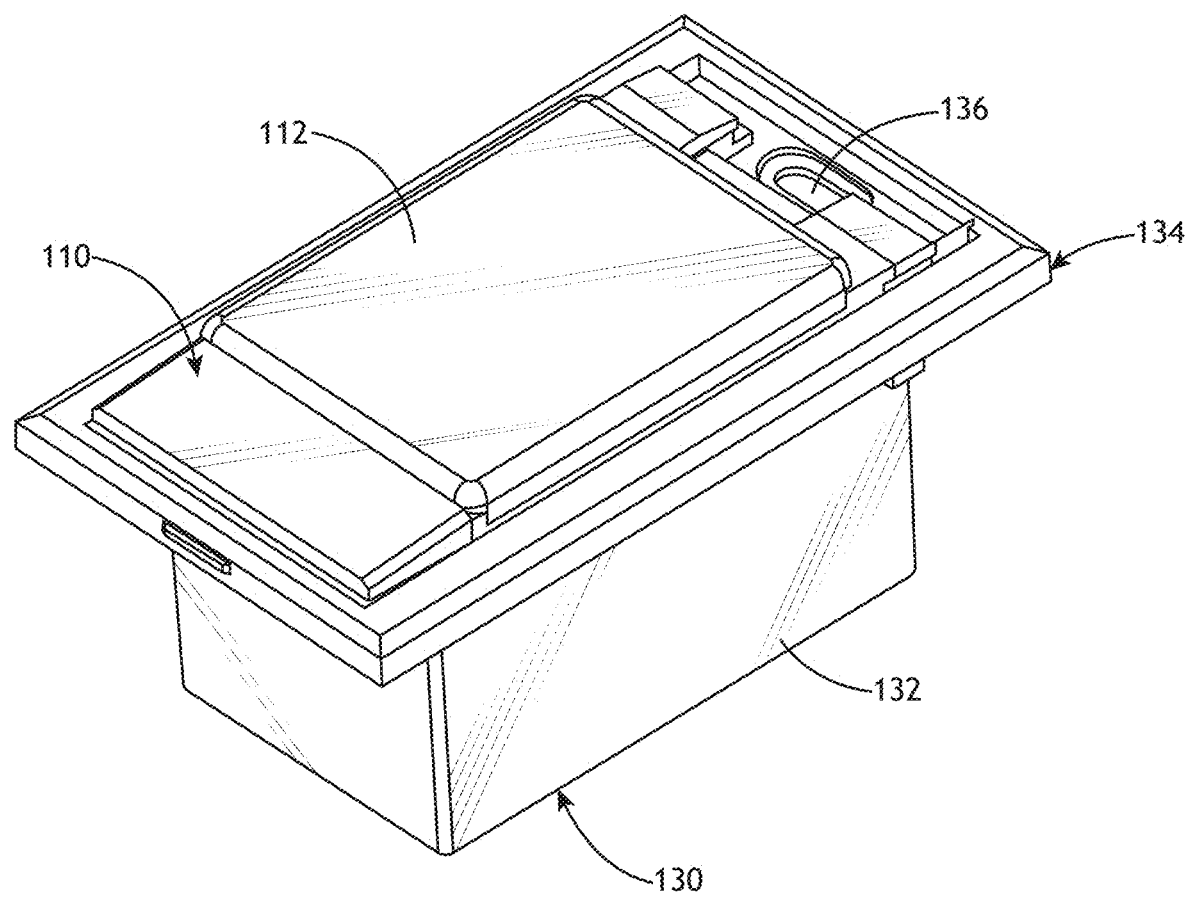
FIG. 3B is an isometric view of a device control assembly coupled to a backplate, in accordance with one or more embodiments of the present disclosure.

FIG. 3B is an isometric view of a device control assembly 110 coupled to a backplate 130, in accordance with one or more embodiments of the present disclosure. In some embodiments, the device control assembly 130 securely fits within the opening 142 of the backplate 130 such that all electrical connections (e.g. the backplate contacts 140 and the contact pads 118) are inaccessible (e.g. to a user).

In some embodiments, a modular control unit 100 may include one or more components suitable for wireless coupling between a backplate 130 and a device control assembly 110. In this regard, data and/or electrical power may be transferred between the backplate 130 and the device control assembly 110. For example, the backplate 130 and the device control assembly 110 may contain a wireless transmitter and/or a wireless receiver. For example, the backplate 130 and the device control assembly 110 may be coupled via a wireless coupling technique such as, but not limited to, Bluetooth Low Energy (BLE), WiFi, inductive coupling, or capacitive coupling.

Figure 4A:
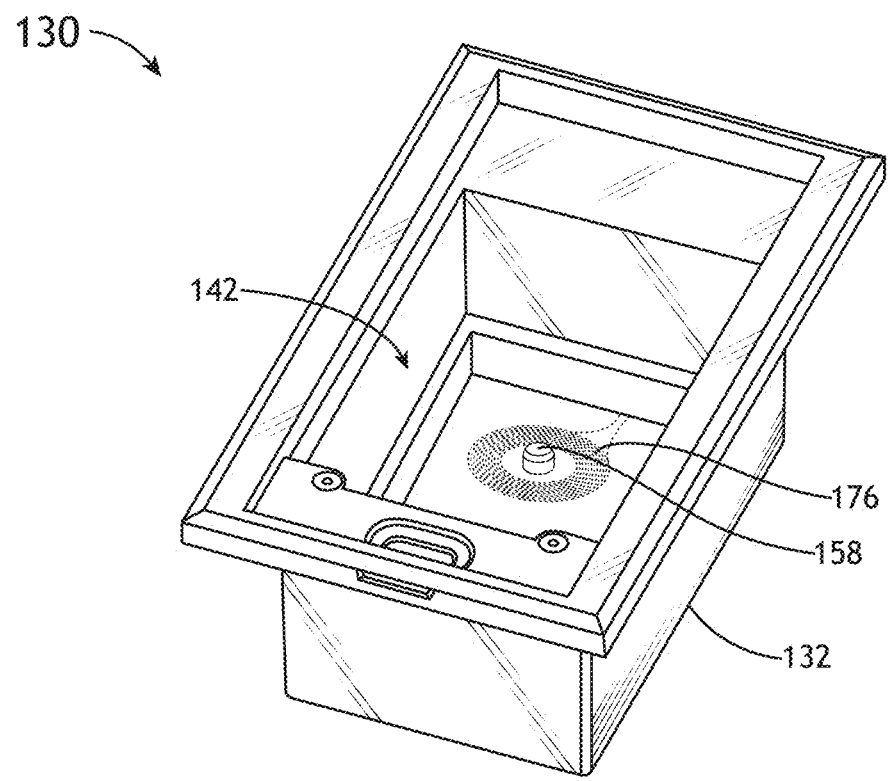
FIG. 4A is an isometric view of a backplate including a backplate induction coil, in accordance with one or more embodiments of the present disclosure.
Figure 4B:
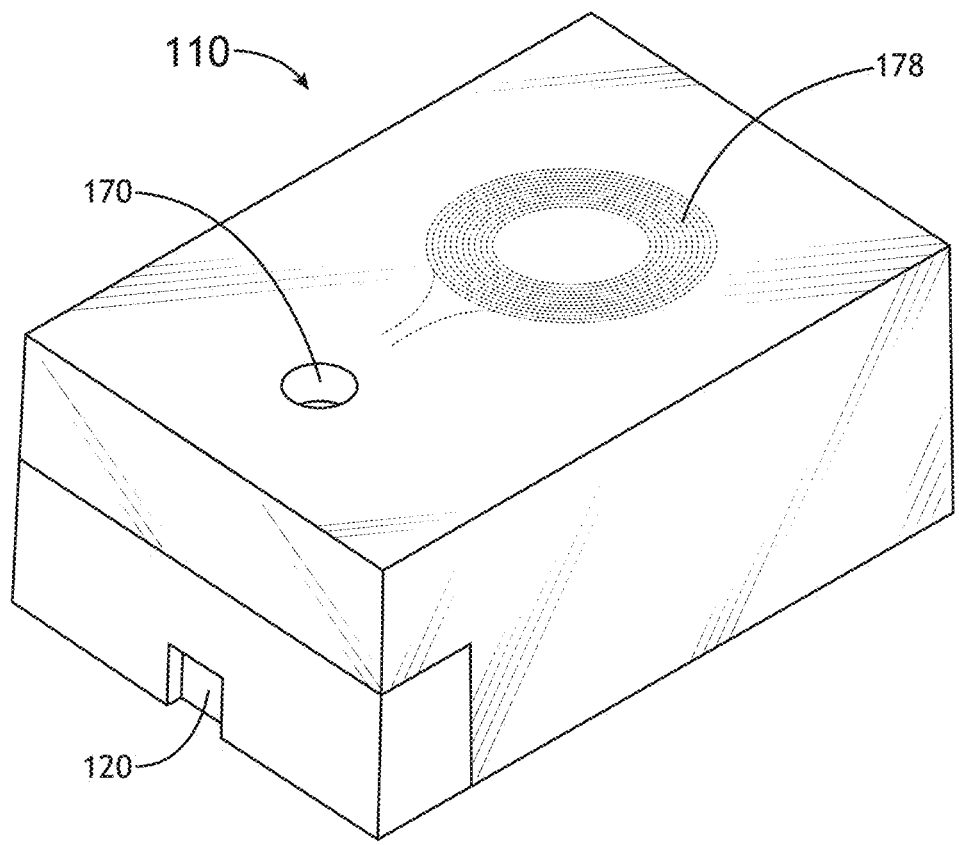
FIG. 4B is an isometric view of a back side of a device control assembly illustrating a device control assembly induction coil, in accordance with one or more embodiments of the present disclosure.

FIG. 4A is an isometric view of a backplate 130 including a backplate induction coil 176, in accordance with one or more embodiments of the present disclosure. FIG. 4B is an isometric view of a back side of a device control assembly 110 illustrating a device control assembly induction coil 178, in accordance with one or more embodiments of the present disclosure. In some embodiments, the backplate induction coil 176 may be connected to the circuit board 160. Accordingly, the backplate induction coil 176 may be suitable for the transmission of data and/or electrical power to a nearby induction coil (e.g. device control assembly induction coil 178).

In some embodiments, the backplate induction coil 176, shown in dotted lines in FIG. 4A, is located underneath the surface of the casing 132 of the backplate 130 near the cavity 142. In this regard, the backplate induction coil 176 may not be exposed to and may thus not be accessible to the cavity 142. Similarly, in some embodiments, the device control assembly induction coil 178, shown in dotted lines in FIG. 4B, is located underneath the surface of the casing 116 of the device control assembly 110. Further, the backplate induction coil 176 and the device control assembly induction coil 178 may be aligned when the device control assembly 110 is inserted into the backplate 130 such that data and/or electrical power may be transferred via inductive coupling. In addition, electrical components of the backplate 130 and/or the device control assembly 110 may be shielded regardless of whether a device control assembly 110 is inserted into a backplate 130.

It is noted herein that a device control assembly 110 and a corresponding cavity 142 of a backplate 130 may have any shape. For example, as illustrated in FIGS. 4A through 4B, a device control assembly 110 may have a rectangular shape configured to be inserted into a rectangular-shaped cavity 142 of a backplate 130. By way of another example, a device control assembly 110 may have a circular shape configured to be inserted into a circular-shaped cavity 142 of a backplate 130.

Figure 4C:
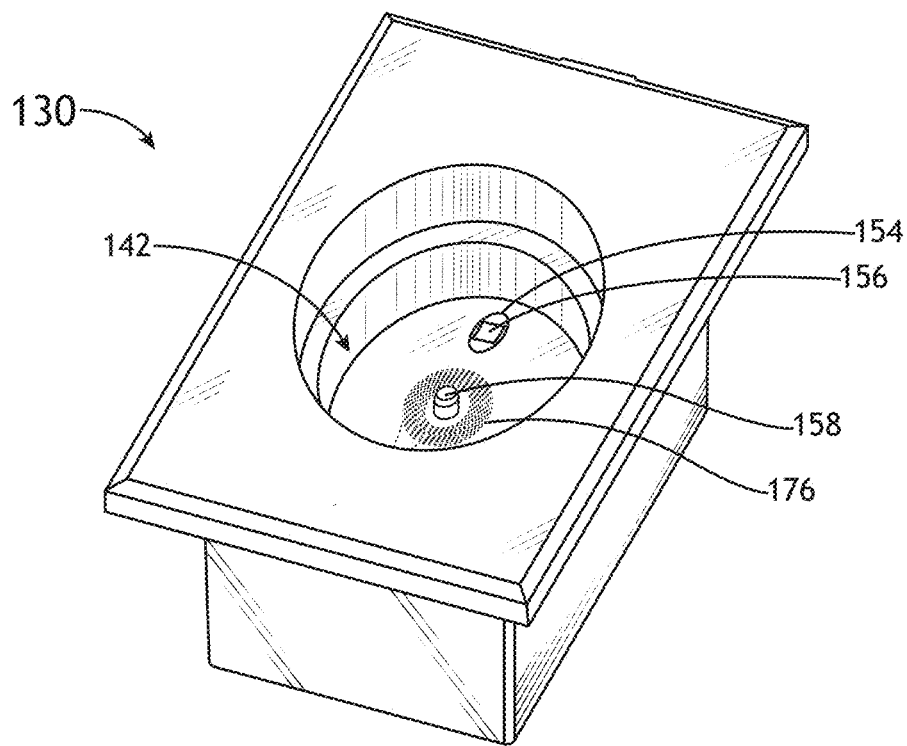
FIG. 4C is an isometric view illustrating a backplate having a circular shape, in accordance with one or more embodiments of the present disclosure.
Figure 4D:
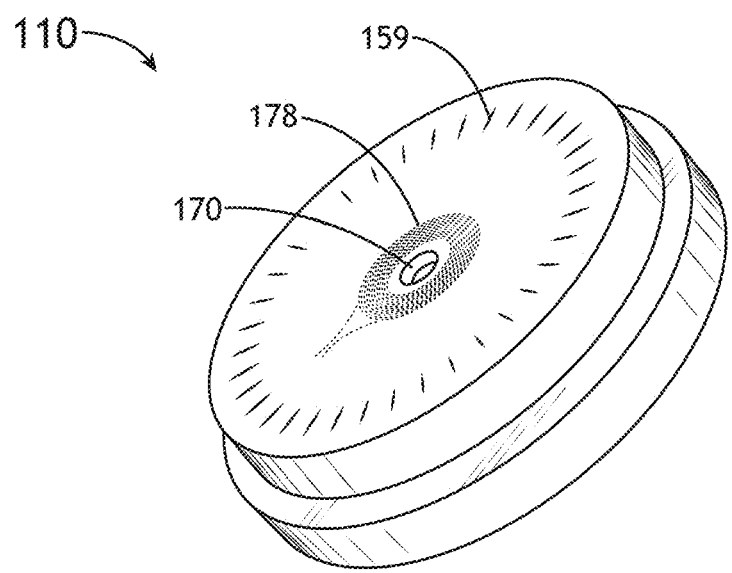
FIG. 4D is an isometric view of a back side of a device control assembly configured with a circular housing, in accordance with one or more embodiments of the present disclosure.

FIG. 4C is an isometric view illustrating a backplate 130 having a circular shape, in accordance with one or more embodiments of the present disclosure. FIG. 4D is an isometric view of a back side of a device control assembly 110 configured with a circular housing. In some embodiments, the backplate 130 includes a backplate induction coil 176 for transfer of data and/or electrical power via inductive coupling. Similarly, in some embodiments, the device control assembly 110 includes a device control assembly induction coil 178 for transfer of data and/or electrical power via inductive coupling (e.g. through inductive coupling with the backplate induction coil 176).

In some embodiments, a circular device control assembly 110 coupled to a backplate 130 may be rotated within the cavity 142 of the backplate 130. Further, a position of a circular device control assembly 110 within the cavity 142 of a backplate 130 may be measurable. For example, the position of a circular device control assembly 110 within the cavity 142 of a backplate 130 may be measurable via a rotary encoder (e.g. an optical encoder, a capacitive encoder, or the like), or one or more sensors (e.g. one or more accelerometers located within the device control assembly 110, or the like).

In some embodiments, a position of a circular device control assembly 110 within the cavity 142 of a backplate 130 may be utilized as a variable input parameter. In this regard, a user may adjust the variable input parameter by rotating the device control assembly 110 within the cavity 142 of the backplate 130. For example, a light level of luminaires connected to a circular device control assembly 110 including a dimmer may be adjustable by rotating the device control assembly 110 within the cavity 142 of the backplate 130. By way of another example, a speed of a fan connected to a circular device control assembly 110 including a variable fan speed controller may be adjustable by rotating the device control assembly 110 within the cavity 142 of the backplate 130. By way of another example, a volume of a multimedia device connected to a circular device control assembly 110 may be adjustable by rotating the device control assembly 110 within the cavity 142 of the backplate 130. By way of a further example, a temperature of a heating/cooling system connected to a circular device control assembly 110 may be adjustable by rotating the device control assembly 110 within the cavity 142 of the backplate 130. In some embodiments, a direction and/or a speed of a circular device control assembly 110 rotating within the cavity 142 of a backplate 130 may be utilized as a variable input parameter.

In some embodiments, as illustrated in FIGS. 4C and 4D, the backplate 130 includes an encoder to determine the position of a coupled device control assembly 110. For example, the backplate 130 may include a transparent cover plate 154 placed over an optical reader 156. In some embodiments, the device control assembly 110 includes optical marks 159 on the back portion of the device control assembly 110 housing. For example, as illustrated in FIG. 4D, the optical marks may be lines radially disposed about the back portion of the device control assembly housing. By way of another example, the optical marks 159 may include a pattern disposed circularly about the back portion of the device control assembly 110 housing. In this regard, the optical reader 156 may identify one or more optical marks 159 on the device control assembly 110 to determine the position of the device control assembly 110 within the cavity 142 of the backplate 130. Further, the optical reader 156 may include any number of optical components known in the art suitable for identifying the one or more optical marks 159 such as, but not limited to, a photodiode. In some embodiments, the backplate 130 includes a light source (e.g. a light emitting diode, a laser diode, or the like) suitable for illuminating the one or more optical marks 159.

It is to be understood that components for determining the position of the device control assembly 110 within the cavity 142 of the backplate 130 may be distributed between the device control assembly 110 and the backplate 130 in any configuration. For example, the device control assembly 110 may include an optical reader 156 to monitor one or more optical marks 159 distributed on the backplate 130. By way of another example, a device control assembly 110 may independently determine its orientation (e.g. using one or more accelerometers, or the like) and optionally report this orientation to the backplate 130.

Figure 5:
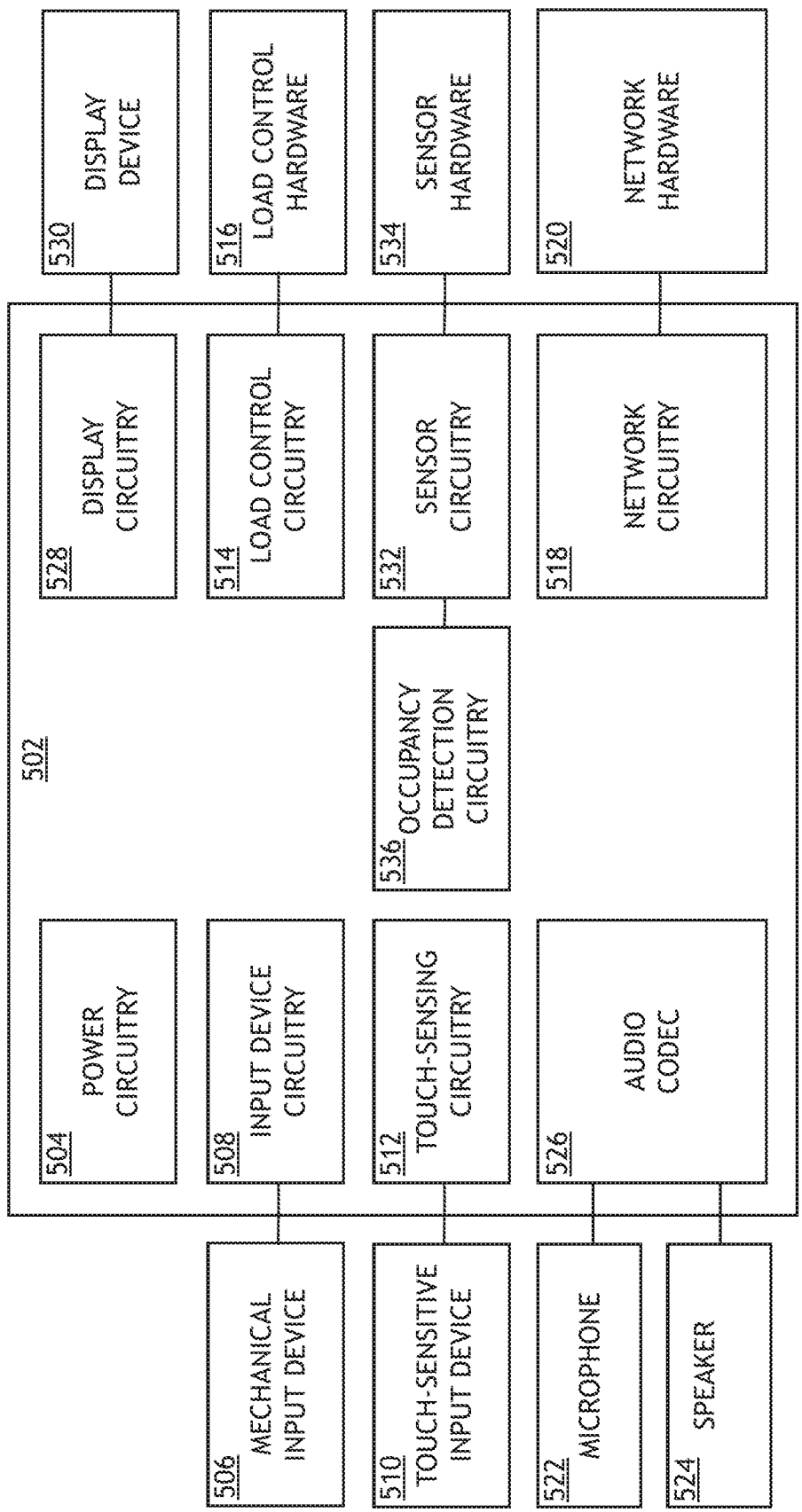
FIG. 5 is a block diagram illustrating components of a device control assembly, in accordance with one or more embodiments of the present disclosure.

FIG. 5 is a block diagram illustrating components of a device control assembly 110, in accordance with one or more embodiments of the present disclosure.

In some embodiments, a device control assembly 110 includes control circuitry 502. For example, control circuitry 502 may be located on circuit board 160. Further, the control circuitry 502 may include one or more processors. In some embodiments, the one or more processors are configured to execute a set of program instructions maintained in a memory medium, or memory. Further, the control circuitry 502 may include one or more modules containing one or more program instructions stored in the memory medium executable by the one or more processors. The one or more processors of control circuitry 502 may include any processing element known in the art. In this sense, the one or more processors may include any microprocessor-type device configured to execute algorithms and/or instructions. In some embodiments, one or more components of the control circuitry 502 are located external to the casing 116 of the device control assembly 110. For example, one or more components of the control circuitry 502 may be located in the backplate 130. By way of another example, one or more components of the control circuitry 502 may be located external to the modular control unit 100. In this regard, the device control assembly 110 may be communicatively coupled with an external controller including one or more processors. For example, one or more components of the control circuitry 502 may include, but are not limited to, a desktop computer, mainframe computer system, workstation, image computer, parallel processor, a locally-hosted system, a remotely-hosted system, a cloud-based system, or the like. It is noted herein that providing one or more components of the control circuitry 502 external to the device control assembly 110 may efficiently utilize processing resources and/or memory resources in the device control assembly 110 by off-loading processing-intensive tasks (e.g. occupancy detection, or the like). It is further recognized that the term "processor" may be broadly defined to encompass any device having one or more processing elements, which execute program instructions from a non-transitory memory medium.

It is recognized herein that the steps described throughout the present disclosure may be carried out by the control circuitry 502. Further, the controller may be formed from a single component or multiple components. It is further noted herein that the multiple components of the control circuitry 502 may be housed in a common housing or within multiple housings. In this way, any controller or combination of controllers may be separately packaged as a module suitable for integration into the modular control unit 100.

The memory medium may include any storage medium known in the art suitable for storing program instructions executable by the associated one or more processors. For example, the memory medium may include a non-transitory memory medium. As an additional example, the memory medium may include, but is not limited to, a read-only memory, a random access memory, a Flash memory, a magnetic or optical memory device (e.g., disk), a magnetic tape, a solid state drive and the like. It is further noted that memory medium may be housed in a common controller housing with the one or more processors. In some embodiments, the memory medium may be located remotely with respect to the physical location of the one or more processors and controller. For instance, the one or more processors of control circuitry 502 may access a remote memory (e.g., server), accessible through a network (e.g., internet, intranet and the like). Therefore, the above description should not be interpreted as a limitation on the present invention but merely an illustration.

In some embodiments, a device control assembly 110 includes power circuitry 504. For example, the device control assembly 110 may include elements to control the distribution of electrical power within the device control assembly including, but not limited to, a voltage regulator or an AC to DC converter to convert AC electrical power from the electrical wiring system to DC power suitable for powering one or more components on a circuit board 160.

In some embodiments, the device control assembly 110 includes a mechanical input device 506. For example, a device control assembly 110 may include, but is not limited to, a toggle switch, a button, or a dome switch. In some embodiments, the mechanical input device 506 provides tactile feedback when actuated. In some embodiments, the mechanical input device 506 provides audible and/or tactile (haptic) feedback when actuated. In this regard, actuation of the mechanical input device 506 is broadcasted (e.g. to a user). In some embodiments, the mechanical input device 506 is coupled to input device circuitry 508 to provide an input signal associated with actuation of the mechanical input device 506.

In some embodiments, a device control assembly 110 includes a touch-sensitive input device 510 coupled with touch-sensing circuitry 512. The touch-sensitive input device 510 provides a means for user input in which a user may contact (e.g. with a finger) a portion of the touch-sensitive input device 510 to generate an input signal. The touch-sensitive input device 510 may include any touch-sensitive input device 510 known in the art including, but not limited to, capacitive-type or resistive-type devices. Further, the input signal may provide information to the control circuitry 502 such as, but not limited to, a number of contact points on the touch-sensitive input device 510 (e.g. a number of fingers in contact), a location of one or more contact points on the touch-sensitive input device 510, or a pressure of one or more contact points. Accordingly, a user may interact with a touch-sensitive input device 510 through any method suitable for generating an input signal including, but not limited to, a single tap, multiple taps, a tap and hold, depressing a button one or more times, or depressing and holding a button.

In some embodiments, the device control assembly 110 includes load-control circuitry 514 coupled to load control hardware 516. In some embodiments, the load control hardware 516 actuates, regulates, or otherwise controls a connected load. As described above, a device control assembly 110 (e.g. as part of a modular control unit 100) connected to a power distribution panel in an electrical wiring system may control the electrical power to a load device connected to the electrical wiring system. Accordingly, the load control hardware may include, but is not limited to, one or more mechanical relays, one or more electrical relays, one or more diodes, one or more TRIACs, one or more MOSFETs, one or more resistors, one or more capacitors, one or more integrated circuits, or one or more motor controllers (e.g., motor speed controllers).

Figure 6A:
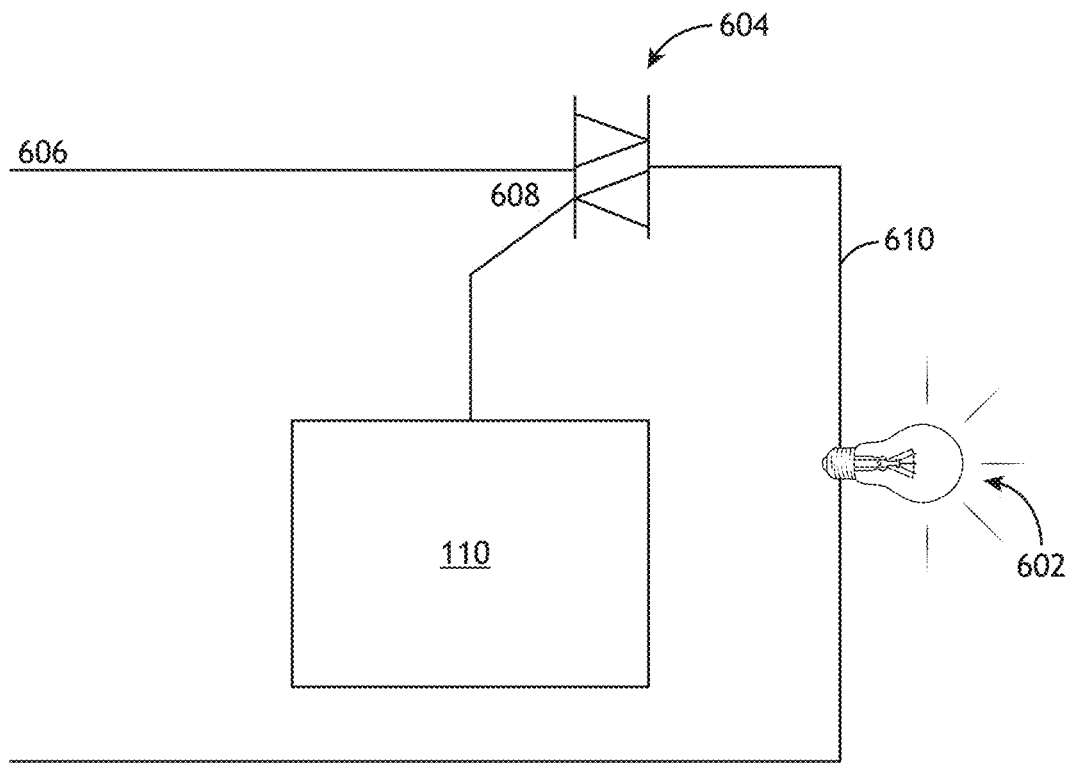
FIG. 6A is a schematic view of an electronic lighting dimmer circuit, in accordance with one or more embodiments of the present disclosure.
Figure 6B:
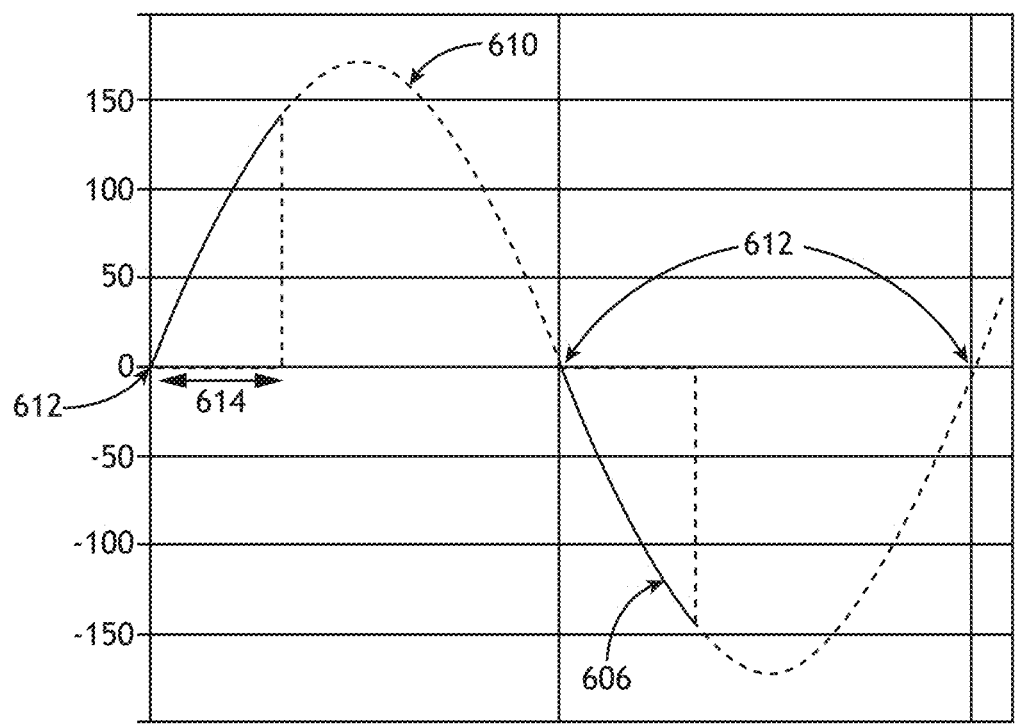
FIG. 6B is a plot illustrating the input AC waveform and a dimmed AC waveform, in accordance with one or more embodiments of the present disclosure.

FIG. 6A is a schematic view of an electronic lighting dimmer circuit 600, in accordance with one or more embodiments of the present disclosure. In some embodiments, the load-control circuitry 514 and/or the load control hardware 516 includes an electronic lighting dimmer circuit 600 that controls the amount of current delivered to a load device 602. For example, a TRIAC-based dimmer circuit as illustrated in FIG. 6A may include a TRIAC 604 accepting an input AC waveform 606 and a gate signal 608 for controlling the dim level of the load device 602. FIG. 6B is a plot illustrating the input AC waveform 606 and a dimmed AC waveform 610, in accordance with one or more embodiments of the present disclosure. In some embodiments, the electronic lighting dimmer circuit 600 dims the load device 602 by controllably reducing the average voltage level to the load device 602 via modifications to the gate signal 608. For example, the electronic lighting dimmer circuit 600 may detect a zero crossing 612 of the input AC waveform 606, not driven by the gate signal 608 for a determined time delay 614 based on a desired dim level, and then drive the gate signal 608 to allow current to flow to the load device 602 until the next zero crossing 612. Accordingly, the input AC waveform 606 may be alternately switched on and off to control the average voltage to the load device 602.

In some embodiments, the dim level is determined by the control circuitry 502. In some embodiments, the requested dim level of a load device 602 is set by the user.

It is noted herein that the electronic lighting dimmer circuit 600 may be suitable for dimming an electrically-connected load device 602. In some embodiments, the dimming level can also be expressed as a percentage of the half-cycle instead of the phase-angle.

Figure 6C:
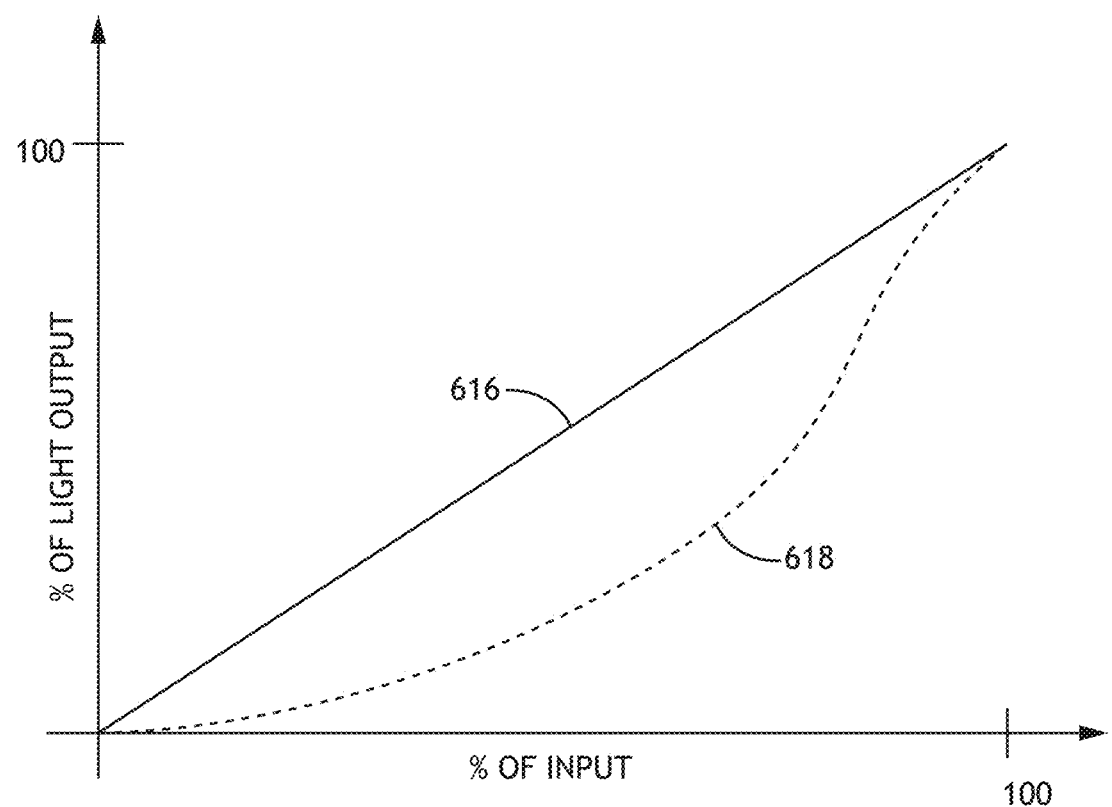
FIG. 6C is a plot illustrating a linearized lighting curve and a non-linearized lighting curve, in accordance with one or more embodiments of the present disclosure.

In some embodiments, the lighting device control assembly 110 adjusts the luminary level of a load device in accordance with a chosen linearization pattern. FIG. 6C is a plot illustrating a linearized lighting curve 616 and a non-linearized lighting curve 618, in accordance with one or more embodiments of the present disclosure. In some embodiments, a lighting level of a load device (e.g. a perceived brightness of the load device, or the like) may not vary linearly in response to a modification of an input AC waveform 606 (e.g. by electronic lighting dimmer circuit 600, or the like). For example, a given modification of an input AC waveform 606 may provide the non-linearized lighting curve 618. However, the device control assembly 110, in applying a linearization profile, may alter the dimming characteristics of the load-control circuitry 514 to provide the linearized lighting curve 616. In one instance, the device control assembly 110 may modify the time delay 614 associated with each desired dimming level. It is noted herein that the optimal linearization pattern may change depending on the type of load device and that the plot illustrated in FIG. 6C is provided solely for illustrative purposes and should not be interpreted as limiting. Accordingly, a linearization pattern for one type of load device may not function to linearize another type of load device.

In some embodiments, the device control assembly 110 detects the type of load device to which it is coupled. For example, a device control assembly 110 may detect if the load device is a compact fluorescent, incandescent or Light Emitting Diode (LED). Further, the device control assembly 110 may determine whether or not the load device is dimmable. In some embodiments, the type of load device is detectable by measuring the current through the load device over time and matching the current levels to a known current versus time profile. In some embodiments, a load device may be identified by the electrical current properties measured for the new load device when it is inserted into the device control assembly 110. In some embodiments, a user may be prompted to select the load device type (e.g. via a mobile phone application controlling the device control assembly 110, through interaction with the device control assembly 110 directly, or the like).

In some embodiments, a device control assembly 110 detects changes of a coupled load device and correspondingly modifies the linearization pattern applied to the load device. For example, if an incandescent load device is replaced with a LED load device, the device control assembly 110 may identify the new load device and apply a corresponding linearization pattern to produce a linear dimming curve for a LED load device.

In some embodiments, the device control assembly 110 includes a light sensor to measure the light output from a coupled load device. In this regard, the device control assembly 110 may measure light levels produced by the load device relative to expected values. In one instance, output from a light sensor may be utilized to generate a linearization profile for a load device. In another instance, a light sensor may be utilized to determine the type of load device coupled to the device control assembly 110.

In some embodiments, a device control assembly 110 includes network circuitry 518 coupled to network hardware 520. In some embodiments, the network circuitry 518 is coupled to an antenna to provide wireless data communication. In this regard, the antenna may be configured to operate in any frequency band known in the art. In some embodiments, the network circuitry and the antenna are configured to operate in a Radio Frequency (RF) band. In this regard, the network circuitry 518 may be compatible with any wireless protocol known in the art, such as, but not limited to, Bluetooth, Bluetooth Low Energy (BLE), WiFi, RFID, Zigbee, Z-Wave, Thread, 802.15.4, or the like. It is noted herein that the antenna (e.g. a portion of the network hardware 520) may be of any type known in the art, including, but not limited to, an embedded antenna or an external antenna.

In some embodiments, the network circuitry 518 is coupled to network hardware 520 to provide wired data communication. In some embodiments, the network circuitry 518 and network hardware 520 provide data communication over one or more electrical wires associated with the electrical wiring system (e.g. one or more wires in a power cable connected to the modular control unit 100). In this regard, the network circuitry 518 may be compatible with any wired protocol known in the art such as, but not limited to, universal powerline bus, X10, LonTalk, Homeplug AV, or Powerline AV.

In some embodiments, a device control assembly 110 forms a configurable network for data communication with one or more devices through the network circuitry 518 and network hardware 520. For example, a device control assembly 110 may form a network including one or more data connection pathways to at least a second device control assembly 110. As another example, a device control assembly 110 may form a network including one or more wireless devices (e.g. one or more wireless sensors, one or more wireless luminaires, one or more wireless electrical sockets, or the like). As a further example, a device control assembly 110 may form a network including one or more wired devices (e.g. one or more powerline devices). Additionally, a device control assembly 110 may form a network with any combination of device control assemblies 110, wireless devices, or wired devices. In this regard, a device control assembly 110 may transmit or receive data over one or more data pathways associated with the configurable network.

It is noted herein that the configurable network may have any topology known in the art including, but not limited to, a mesh topology, a star topology, a ring topology, a line topology, or a bus topology. It is further noted herein that data pathways between device control assemblies 110 within the configurable network may include single-hop (e.g. a direct connection) or multi-hop pathways (e.g. a connection including one or more additional nodes to repeat and/or facilitate the data connection). For example, the configurable network may have a flood mesh topology. In this regard, data sent from a first device (e.g. one node) on the network intended for a second device (e.g. a second node) is sent to all nodes on the network. Further, any additional nodes on the network may repeat or retransmit the data such that the data is received by the second device by one or more data pathways. As another example, the configurable network may have a routed mesh topology in which routing information describing data pathways for data communication between nodes of the network is defined and stored (e.g. by any of the nodes on the network or a controller).

The configurable network may include (e.g. as nodes of the network) one or more additional connected devices in addition to device control assemblies 110 such as, but not limited to, sensors, luminaires, or configurable electrical sockets. The connected devices may be connected to the configurable network through wired pathways (e.g. via a data connection provided by power cables associated with the electrical wiring system) or wireless pathways (e.g. via Bluetooth, Bluetooth Low Energy (BLE), WiFi, RFID, Zigbee, Z-Wave, Thread, 802.15.4, or the like). Further, the configurable network may include one or more electrical appliances connected (e.g. via wired or wireless pathways) such as, but not limited to, connected televisions, connected set-top boxes (e.g. Apple TV, Roku, Chromecast, or the like), connected thermostats (e.g. Nest, Ecobee, or the like), or connected speakers audio devices (e.g. Amazon Echo, Sonos, or the like). Additionally, the configurable network may include one or more mobile devices (e.g. phones, tablets, wearable devices, or the like).

In some embodiments, the device control assembly 110 includes WiFi circuitry to make a connection to the Internet. For example, the device control assembly 110 may include a bridge or access point hub to communicate with a WiFi router. By way of another example, the access point hub may integrate into the device control assembly 110 and be integrated in the mesh network. For instance, each device control assembly 110 may use one or more access point hubs to connect to the Internet. In some embodiments, the device control assembly 110 may operate as an access point to the local network (e.g. a mesh network of device control assemblies 110, sensors, or the like) or to the Internet.

In some embodiments, a device control assembly 110 may provide one or more physical functions and/or one or more addressable functions (e.g. in response to command instructions from another device on the network). For example, the physical function of a device control assembly (e.g. regulating a current and/or a voltage to a load device) may be performed by electrical and/or mechanical elements (e.g. switches, relays, or the like) within the casing of the device control assembly 110. In some embodiments, a device control assembly 110 provides a physical function upon actuation of a user input device (e.g. a mechanical input device 506 or a touch-sensitive input device 510). For example, a device control assembly 110 may operate as a dimmer switch to regulate electrical power to one or more connected luminaires by swiping a finger along a linear path on a touch-sensitive input device 510. In this regard, an input signal generated by the touch-sensing circuitry 512 including a location of a finger contact may determine the relative brightness of the connected luminaires. Further, an input signal generated by the touch-sensing circuitry 512 including a location of a finger contact may determine the color output of a multi-color luminaire.

In some embodiments, a device control assembly 110 is directed to perform a physical function (e.g. control one or more load devices using load control circuitry 514 coupled to load control hardware 516) by at least one other device (e.g. a second device control assembly 110) on a configurable network via data communication. Accordingly, a device control assembly 110 may have an addressable function in which the device control assembly 110 directs one or more additional device control assemblies to perform their associated physical functions. In some embodiments, the physical and addressable functions of a device control assembly 110 are independent. In this regard, a device control assembly 110 may perform a physical function without actuation of an input device of the device control assembly 110 (e.g. a mechanical input device 506 or a touch-sensitive input device 510).

Similarly, a device control assembly 110 may provide an addressable function by directing at least a second device control assembly 110 to perform a physical function via data communication. For the purposes of the present disclosure, for example, a device control assembly 110 may be configured to direct a second device control assembly to actuate a load (e.g. toggle the state of a connected electrical device) upon actuation of an input device (e.g. a mechanical input device 506 or a touch-sensitive input device 510). In this way, actuation of a device control assembly 110 (e.g. via a mechanical input device 506 or a touch-sensitive input device 510) may cause the regulation of a load device by another device control assembly 110. In this regard, a device control assembly 110 may perform an addressable function without performing a physical function.

In some embodiments, a device control assembly 110 provides multiple functions including one more physical functions and one or more addressable functions. For example, a device control assembly 110 is configured to provide a physical function upon actuation of a first portion of a touch-sensitive input device 510 and is further configured to provide an addressable function upon actuation of a second portion of the touch-sensitive input device 510. In this regard, a device control assembly 110 may operate as a multi-function keypad.

For the purpose of the present disclosure, a device control assembly 110 is paired with a load device if the device control assembly 110 is configured to control the load through a physical or an addressable function. It is noted herein that a device control assembly 110 may be configured to exclusively perform one or more addressable functions by only pairing the device with one or more loads not regulated by a physical function of the device control assembly 110 (e.g. not pairing the device control assembly 110 with a load associated with a physical function).

In some embodiments, pairings between device control assemblies 110 and load devices within a configurable network are dynamically assignable. In some embodiments, device pairings are defined and stored locally on each device control assembly 110 within the network. Accordingly, a device control assembly 110 is physically paired with a load if the device control assembly 110 is configured to regulate electrical power to the load device through load control circuitry 514 and associated load control hardware 516 (e.g. as a physical function). Similarly, a device control assembly is addressably paired with a load device if the device control assembly 110 is configured to direct one or more additional device control assemblies 110 to regulate the load device through load control circuitry 514 and associated load control hardware 516 of the one or more additional device control assemblies.

In some embodiments, a pairing for a device control assembly 110 and a load is determined by the device control assembly 110 itself. In some embodiments, pairings between device control assemblies 110 and load devices within a configurable network are determined by a controller associated with the configurable network. The controller may have any type of architecture known in the art such as, but not limited to, a centralized architecture or a distributed architecture. In some embodiments, one device controller within the configurable network operates as the controller (e.g. to define, store, and distribute device pairings to device control assemblies 110 on the network). In some embodiments, a controller for assigning device control assembly pairings 110 is distributed. In this regard, one or more device control assemblies 110 operate together as the controller. In a further embodiment, a controller is an element on the network other than a device control assembly 110 such as, but not limited to, a hub, a centralized server, or a distributed server.

In some embodiments, the controller includes one or more processors. Further, the one or more processors may be configured to execute a set of program instructions maintained in a memory medium, or memory. The one or more processors of a controller may include any processing element known in the art. In this sense, the one or more processors may include any microprocessor-type device configured to execute algorithms and/or instructions. In some embodiments, the one or more processors may consist of a stand-alone device hub, a desktop computer, a mainframe computer system, a workstation, or any other computer system (e.g., networked device) configured to execute a program configured to operate the configurable network, as described throughout the present disclosure. It is further recognized that the term "processor" may be broadly defined to encompass any device having one or more processing elements, which execute program instructions from a non-transitory memory medium.

Figure 7A:
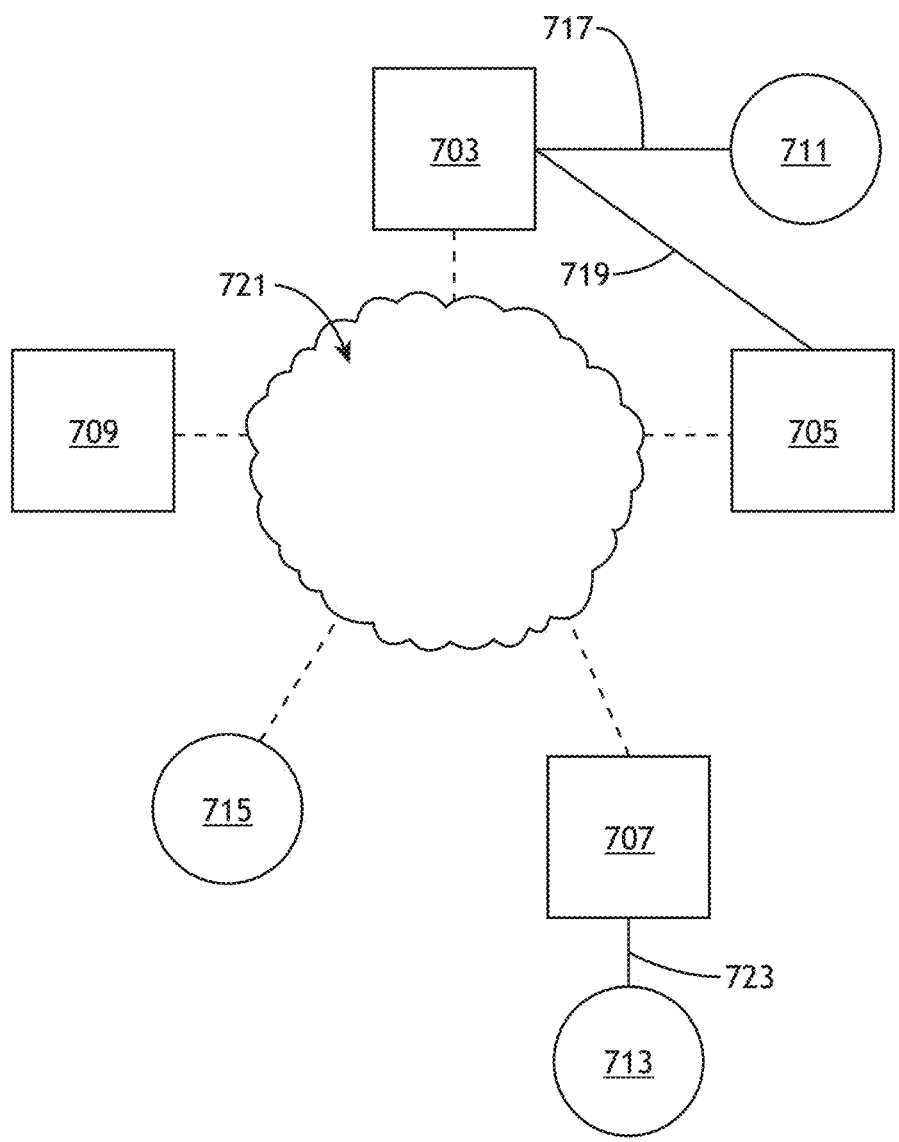
FIG. 7A is a block diagram of a configurable network of modular control unit for actuating one or more load devices, in accordance with one or more embodiments of the present disclosure.

FIG. 7A is a block diagram of a configurable network 700 of modular control units for actuating one or more load devices, in accordance with one or more embodiments of the present disclosure. It is noted herein that the network 700 described herein is provided solely for illustrative purposes and should not be interpreted as limiting the present disclosure. In some embodiments, device control assemblies 703, 705, 707, 709 are communicatively coupled within the network 700 via one or more data connections 721. Further, the network 700 may include one or more load devices 711, 713, 715. The load devices may be any type of load devices including, but not limited to, luminaires, fans, or electrical outlets configured to provide power to one or more attached electrical devices.

In some embodiments, device control assembly 707 is physically paired with load device 713 such that actuating device control assembly 110 regulates electrical power to load device 713 via one or more wires 723. In some embodiments, device control assemblies 703 and 705 are physically paired with load device 711. Further, device control assemblies 703 and 705 are connected to load device 711 via wires 717 and 719 in a three-way switch configuration. In this regard, wire 719 may be a "traveler" wire associated with a power cord within an electrical wiring system. In some embodiments, device control assembly 709 is not physically paired with any load device. In some embodiments, load device 715 is not physically paired with any device control assembly 711, 713, 715 on the network. Further, load device 715 is directly connected to the configurable network 700 (e.g. via a data pathway 721). Load device 715 may be connected to the configurable network 700 via a wired or wireless data pathway 721.

It is noted herein that pairings between device control assemblies 703, 705, 707, 709 and load devices 711, 713, 715 may be dynamically modified or updated. For example, device control assembly 709 may be paired with any load device 711, 713 on the network. As another example, device control assembly 709 may be paired with load device 713 such that device control assemblies 707 and 709 operate as a three-way switch to control load device 713.

As another example, device control assembly 707 may be paired exclusively with load device 715 and device control assembly 709 may be paired with load device 713. In this regard, device control assembly 709 may provide an addressable function (e.g. controlling load device 715) but not a physical function (e.g. control of load device 713) when actuated. However, device control assembly 707 may facilitate the control of load device 713 by device control assembly 709 via a data pathway 721.

As a further example, device control assembly 703 may be paired with load device 713 and not paired with load device 711. Accordingly, device control assembly 703 may control load device 713 via a data connection 721 to device control assembly 705. Further, device control assemblies 703 and 707 may operate as a three-way switch to control load device 713.

It is noted herein that any number of device pairings between device control assemblies 703, 705, 707, 709 and load devices 711, 713, 715 may be established via the configurable network 700. Accordingly, the descriptions of pairings above are intended solely for illustrative purposes and should not be interpreted as limiting.

Figure 7B:
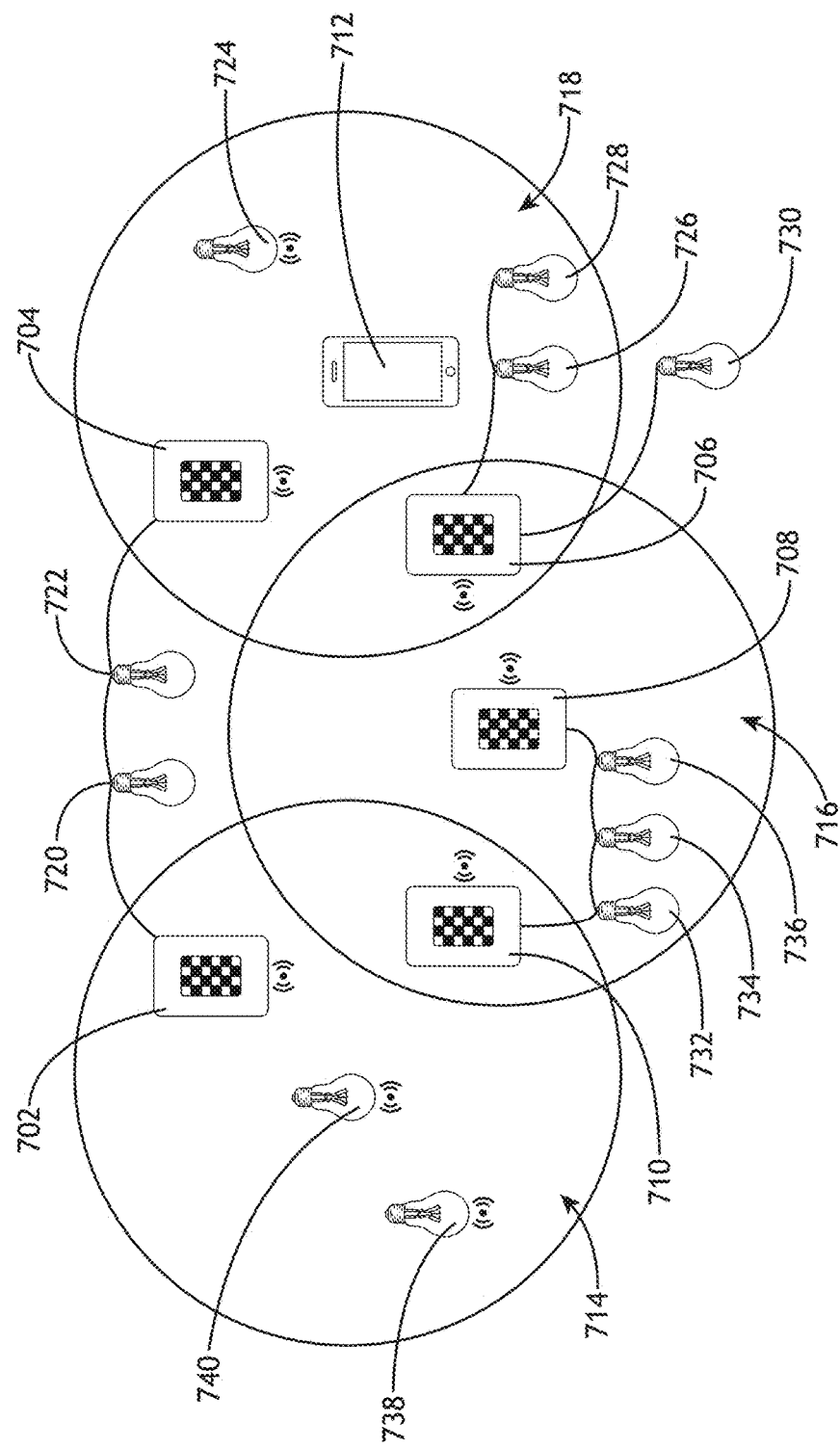
FIG. 7B is an illustration of a configurable network, in accordance with one or more embodiments of the present disclosure.

FIG. 7B is an illustration of a configurable network 701, in accordance with one or more embodiments of the present disclosure. It is noted herein that the network 701 described herein is provided solely for illustrative purposes and should not be interpreted as limiting the present disclosure. In some embodiments, the network includes device control assemblies 702, 704, 706, 708, 710 and a connected mobile device 712 (e.g. a phone, a tablet, a wirelessly-connected computer, or the like) configured to control one or more load devices 720, 722, 724, 726, 728, 730, 732, 734, 736, 738, 740.

In some embodiments, device control assemblies 702 and 704 are physically paired to load devices 720 and 722 and are configured to operate as a three-way switch. In some embodiments, device control assembly 706 is physically paired to load devices 726-730 and is configured to operate as a multi-function keypad to operate load devices 726-728 and load device 730 independently. In some embodiments, device control assemblies 708 and 710 are physically paired to load devices 732-736 and are configured to operate as a three-way switch. Further, device control assembly 708 and device control assembly 710 may each be configured to operate as a dimmer switches. In some embodiments, load devices 724, 738, and 740 are wirelessly connected to the network 701 and are further not physically paired with any device control assembly 702, 704, 706, 708, 710.

In some embodiments, device control assemblies 702, 704, 706, 708, 710 are wirelessly connected within the network 701 via one or more data pathways. In some embodiments, network circuitry 518 and associated network hardware 520 of the device control assemblies 110 are configured to connect via a Bluetooth Low Energy (BLE) protocol in a mesh network topology (e.g. a flood mesh topology). Further, mobile device 712 and load devices 724, 738, and 740 are nodes within the mesh network 701. In this regard, each node on the mesh network may transmit or retransmit mesh network traffic such that all nodes of the mesh network may communicate (e.g. via single-hop or multi-hop paths). Accordingly, mobile device 712 can be paired with load devices 738 and 740 via the network 701. For example, mobile device 712 may have a data range 718 insufficient to reach load device 738. However, device control assembly 708 may serve as a repeater (e.g. in a flood mesh network). In this regard the data range 716 overlaps with data range 718 of mobile device 712 and data range 714 of load device 738 to provide data communication. In some embodiments, the mobile device 712 connects to a device control assembly (e.g. device control assembly 706) for communication with load devices within the network 701. In this regard, device control assembly 706 may operate as a bridge to communicate data between the mobile device 712 and any device on the network 701. It is noted herein that mobile device 712 or, alternately any connected device (e.g. a connected television, a connected electrical appliance, a wearable device, or the like), may not include appropriate hardware to properly communicate on the network 701. However, a device control assembly (e.g. device control assembly 706) may simultaneously connect with the network 701 on a first protocol (e.g. a flood mesh protocol) and a connected device on a second protocol (e.g. a Bluetooth protocol) to provide a bridge for data communication between the connected device and one or more devices on the network 701.

It is noted herein that any number of device pairings between device control assemblies 702, 704, 706, 708, 710, mobile device 712, and load devices 720, 722, 724, 726, 728, 730, 732, 734, 736, 738, 740 may be established via the configurable network 701. Accordingly, the descriptions of pairings above are intended solely for illustrative purposes and should not be interpreted as limiting.

In some embodiments, a device control assembly 110 includes at least one of a microphone 522 or a speaker 524 coupled with an audio codec 526. In this regard, the device control assembly 110 may accept and/or emit audio signals.

In some embodiments, a device control assembly 110 includes display circuitry 528 coupled to a display device 530 for driving the display device 530. The display device 530 may be any type of display device known in the art suitable for displaying visual information including, but not limited to, a light-emitting diode (LED), a LED display, an organic light-emitting diode (OLED) display, a liquid crystal display (LCD), a thin-film transistor (TFT) display, or an electronic ink (E-ink) display. In some embodiments, the display circuitry 528 may provide a programmable user interface for the programming of one or more functions (e.g. actuating load devices, responding to notifications, or the like).

Figure 7C:
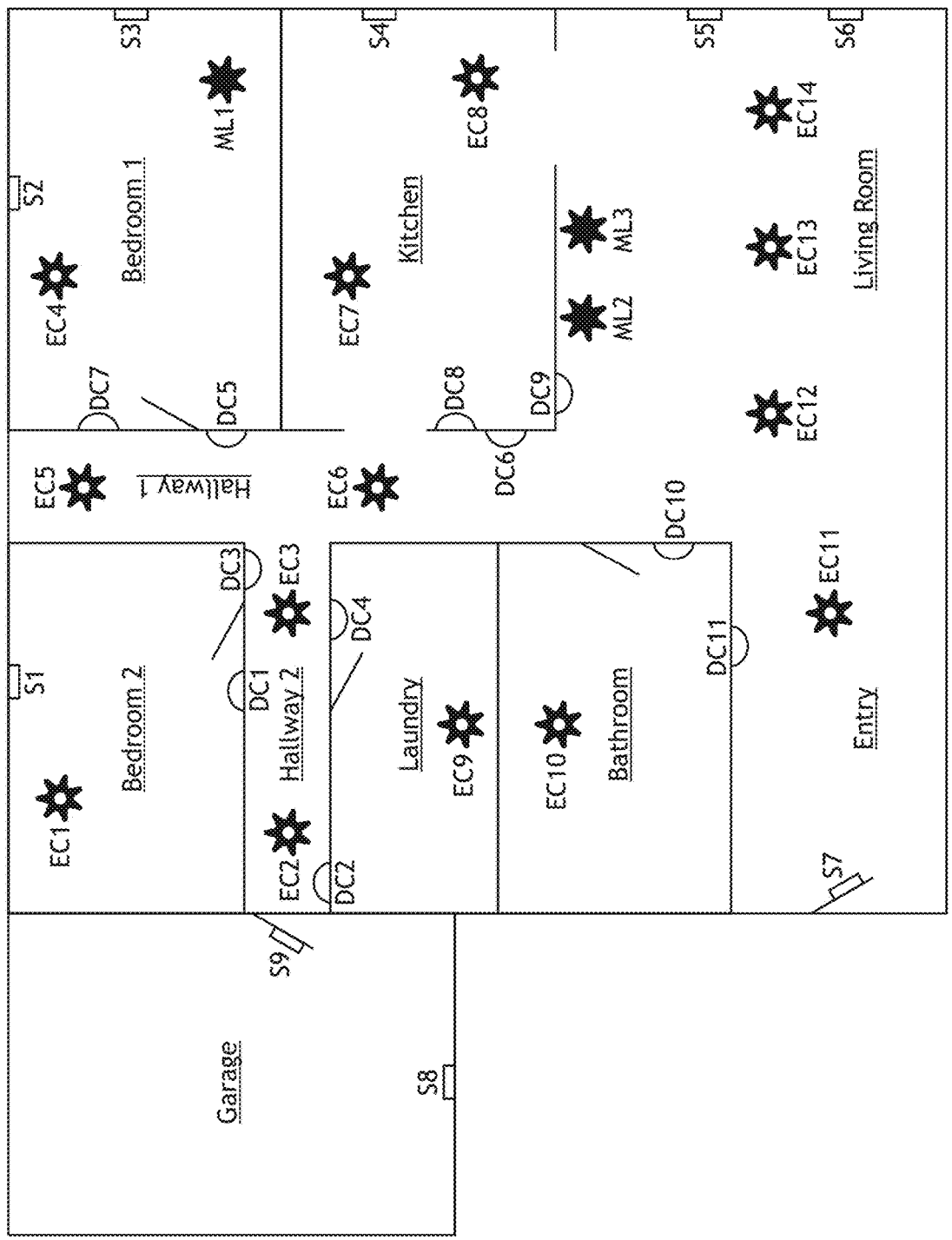
FIG. 7C is an illustration of a configurable network in a household, in accordance with one or more embodiments of the present disclosure.

FIG. 7C is an illustration of a configurable network 750 in a household, in accordance with one or more embodiments of the present disclosure. It is noted herein that the network 750 described herein is provided solely for illustrative purposes and should not be interpreted as limiting the present disclosure. For example, a configurable network may be employed in any environment including, but not limited to, industrial buildings, commercial buildings, multi-family households, or outdoors.

In some embodiments, the configurable network 750 includes as nodes device control assemblies DC1-DC11, electrically-connected luminaires EC1-EC14 (e.g. luminaires physically paired to one or more device control assemblies), network-connected luminaires ML1-ML3 (e.g. mesh-connected luminaires), and window/door sensors S1-S9. In some embodiments, all nodes of the configurable network 750 are communicatively coupled via data connections. In some embodiments, the pairings between device control assemblies, electrically-connected luminaires, network-connected luminaires; and sensors are summarized in FIG. 7D. Further, the pairing type (e.g. physical or addressable) between connected devices is summarized in FIG. 7E. It is noted herein that device control assemblies 110 may be simultaneously paired with multiple device types (e.g. DC7 and DC9 are paired with electrically-connected luminaires, network-connected luminaires, and sensors), as shown in FIG. 7D. Further, connected devices may be simultaneously paired with multiple device control assemblies, as shown in FIG. 7E. For example, EC2 is physically paired with DC2 and addressably paired with DC3. Similarly EC3 is physically paired with DC3 and addressably paired with DC2. Together, DC2 and DC3 operate, via data pathways of the network 750, as a three-way switch to simultaneously control EC2 and EC3.

As another example, custom switching patterns may be defined through defined pairings of device control assemblies and load devices. For example, DC5 and DC6 are paired to luminaires EC5, EC6, and EC12, and an exemplary state diagram is provided in FIG. 7F. Further, EC12 is additionally paired to DC 9. In this regard, EC5 and EC6 are controlled by DC5 and DC6 in a traditional three-way switch configuration. Accordingly, actuating either DC5 or DC6 will actuate both EC5 and EC6. However, the state of EC12 is dependent on the current state and on the actuating device (e.g. DC5, DC6, or DC12), as shown in FIG. 7F.

It is noted herein that any number of device pairings between device control assemblies DC1-DC11, electrically-connected luminaires EC1-EC14, and network-connected luminaires ML1-ML3 may be established via the configurable network 750. Accordingly, the descriptions of pairings above are intended solely for illustrative purposes and should not be interpreted as limiting.

Figure 8:
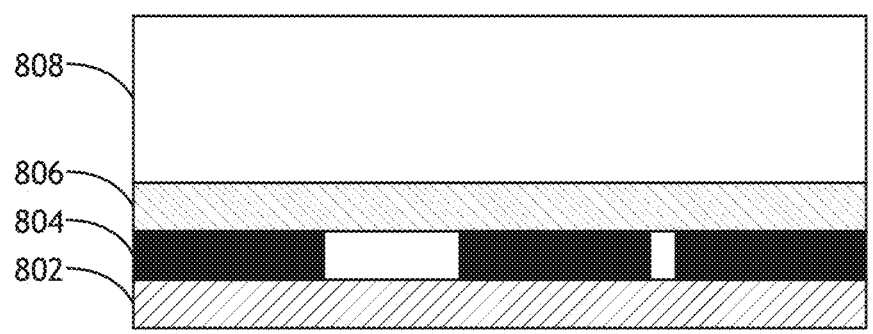
FIG. 8 is a cross-section view illustrating a display device configured to display visual information using deadfronting, in accordance with one or more embodiments of the present disclosure.

In some embodiments, the display device 530 uses a deadfronting technique to display visual information. FIG. 8 is a cross section view illustrating a display device 530 configured to display visual information using deadfronting, in accordance with one or more embodiments of the present disclosure. In some embodiments, the display device includes a backlight 802. The backlight 802 may include one or more optical components suitable for generating illumination such as, but not limited to, one or more LEDs, one or more light guides, one or more lasers, one or more homogenizers, one or more filters, or one or more polarizers. Further, the backlight 802 may produce illumination of any color such as, but not limited to, white light or light of a particular color. In some embodiments, the color of illumination provided by the backlight 802 is adjustable. In some embodiments, the display device 530 includes an opaque layer 804. For example, the opaque layer 804 may include one or more transparent regions (e.g. portions of transparent material, holes, voids, or the like) corresponding to one or more images to be displayed. Further, the opaque layer 804 may be positioned proximate to the backlight 802 such that illumination from the backlight 802 propagates through the one or more transparent regions to produce one or more illuminated images to be displayed. In some embodiments, the display device 530 includes a semi-transparent layer 806. For example, the semi-transparent layer 806 may be located proximate to the opaque layer 804 such that the transparent regions and the opaque regions of the opaque layer 804 are distinguishable only when illuminated by the backlight 802. In some embodiments, the display device 530 includes a cover lens 808. For example, the cover lens 808 may be positioned proximate to the semi-transparent layer 806. In this regard, the cover lens 808 may protect underlying layers. In some embodiments, the display device 530 and the touch-sensitive input device 510 are integrated into a single unit (e.g. a user interface 112).

In some embodiments, the display device 530 may operate in any number of display modes. For example, a display device 530 may have multiple display modes in which a different image or set of images is displayed in each display mode. In this regard, user input (e.g. signals from a display device 530 coupled with a touch-sensitive input device 510) may be interpreted differently by the control circuitry 502 based on the current display mode. Accordingly, a user may interface with different features of the device control assembly 110 through different display modes.

Figure 9A:
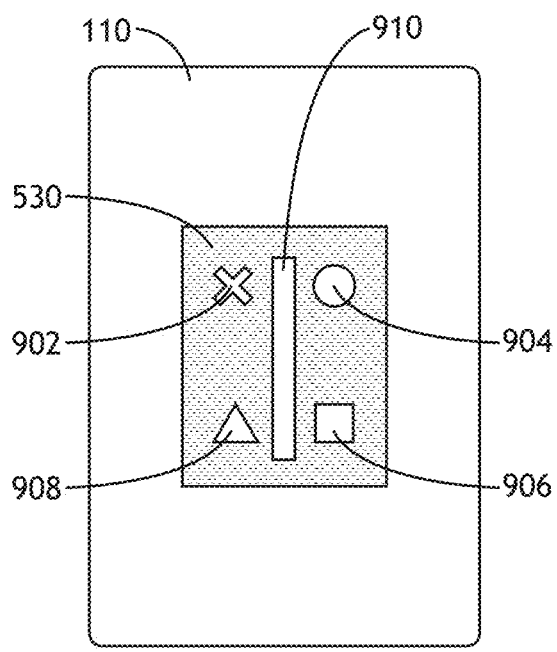
FIG. 9A is a top view of an opaque layer including shapes that are transparent to illumination from the backlight, in accordance with one or more embodiments of the present disclosure.

In some embodiments, a display device 530 incorporating a deadfront display (e.g. as illustrated in FIG. 8) may include images and/or patterns associated with each display mode. FIG. 9A is a top view of an opaque layer (e.g. opaque layer 804, or the like) including shapes 902-910 that are transparent to illumination from the backlight 802, in accordance with one or more embodiments of the present disclosure. In this regard, any combination of shapes 902-910 may be selectively illuminated by the backlight 802 in a given display mode. Further, any of shapes 902-910 may function as soft buttons. Accordingly, a user may tap, press, tap and hold, or otherwise interact with the display device at a location corresponding to the shapes 902-910 to generate one or more input signals (e.g. to be interpreted by the touch-sensing circuitry 512, or the like) indicating a desired function.

Figure 9B:
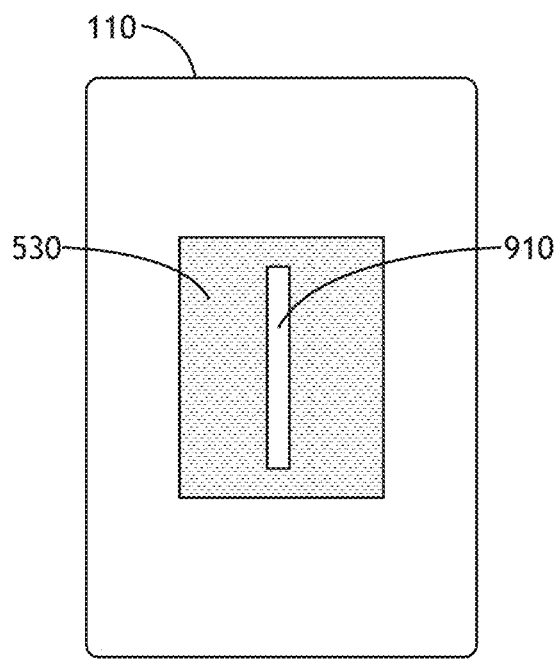
FIG. 9B is a top view of a device control assembly having a display device in a Dimmer display mode, in accordance with one or more embodiments of the present disclosure.

In some embodiments, a display mode includes a dimmer display mode. FIG. 9B is a top view of a device control assembly 110 having a display device 530 in a Dimmer display mode, in accordance with one or more embodiments of the present disclosure. In some embodiments, a shape 910 including a rectangular shape is illuminated in the Dimmer mode. In one instance, a user may adjust a dim level for a load based on a location of a finger along the shape 910. Further, the intensity of illumination may correspond to a current dim level. For example, the shape 910 may be nominally illuminated with a first illumination profile (e.g. an illumination brightness and/or color) such that the entire outline of the shape 910 may be seen. Additionally, a portion of the shape 910 may be illuminated with a second illumination profile to indicate a current dim level. In another instance, a press of the display device 530 may toggle between dim levels (e.g. on, off, preset dim levels, or the like).

Figure 9C:
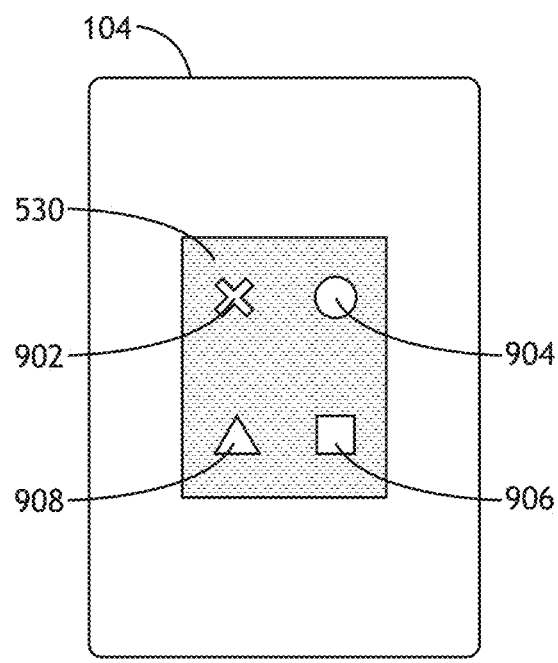
FIG. 9C is a top view of a device control assembly having a display device in a Keypad display mode, in accordance with one or more embodiments of the present disclosure.

In some embodiments, a display mode includes a Keypad display mode. FIG. 9C is a top view of a device control assembly 110 having a display device 530 in a Keypad display mode, in accordance with one or more embodiments of the present disclosure. In some embodiments, shapes 902-908 are illuminated in the Keypad mode. Further, the illumination profile of each shape 902-908 may correspond to a current state of a function associated with the shape 902-908. For example, shapes 902-908 may be illuminated with a first illumination profile to provide visibility. Additionally, one or more shapes 902-908 may be illuminated with an additional illumination profile when selected by a user.

In some embodiments, a user may interact with a display device 530 in a Keypad display mode through a variety of input methods. For example, each shape 902-908 may serve as a soft button to initiate a desired feature. By way of another example, a user may simultaneously select two or more shapes (e.g. with two or more fingers) to initiate additional features. Further, the mode of user input may differentiate between desired functions. In one instance, a single tap on a shape 902-908 may initiate a first function (e.g. turning off one or more loads, or the like), a double tap on a shape 902-908 may initiate a second function (e.g. initiating a scene including preset states of one or more loads, or the like), and so on. By way of a further example, a button press may initiate an additional function (e.g. toggle one or more load devices, or the like).

Figure 9D:
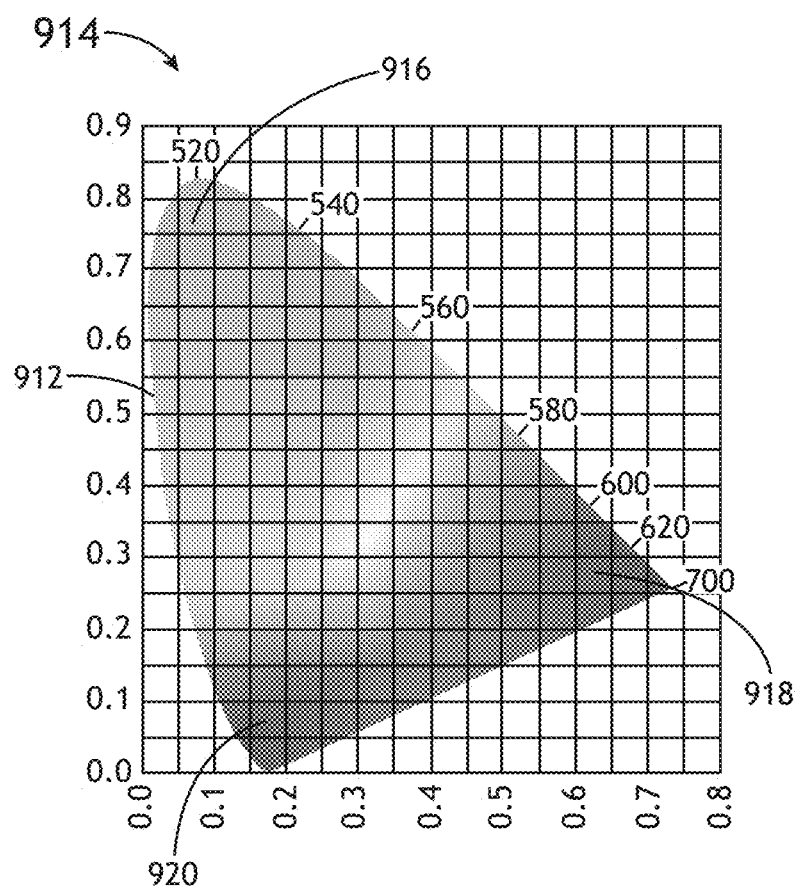
FIG. 9D is a top view of a device control assembly having a display device in a Color Selection display mode, in accordance with one or more embodiments of the present disclosure.
Figure 9E:
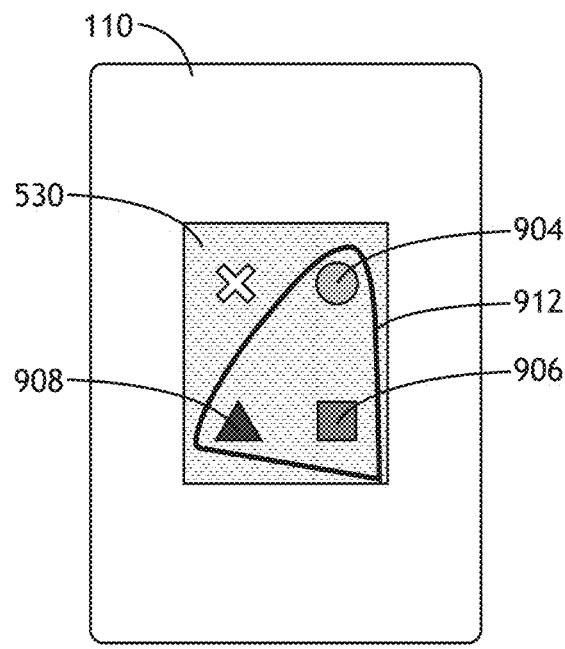
FIG. 9E is a plot illustrating a color chart, in accordance with one or more embodiments of the present disclosure.

In some embodiments, a display mode includes a Color Selection display mode. FIG. 9D is a plot illustrating a color chart 914 (e.g. a 1931 CIE color chart, or the like), in accordance with one or more embodiments of the present disclosure. In some embodiments, a display device 530 in a Color Selection display mode may facilitate the modification of a color (e.g. a hue, or the like) of a color-controllable luminaire. FIG. 9E is a top view of a device control assembly 110 having a display device 530 in a Color Selection display mode, in accordance with one or more embodiments of the present disclosure. In some embodiments, a selection region 912 of a display device 530 in a Color Selection display mode may correspond to a color chart (e.g. a reversed version of the color chart illustrated in FIG. 9D) such that the display device 530 may control the color of a color-controllable luminaire based on a location of a finger of a user within the selection region, which further corresponds to a color of the color chart. For example, a first region 916 of the color chart may indicate hues of green, a second region of the color chart 918 may indicate hues of red, and a third region of the color chart 920 may indicate hues of blue. Further, the selection region 912 may include continuously varying regions such that a color on a continuous scale may be selected. In some embodiments, the selection region 912 is visible (e.g. the selection region 912 corresponds to a pattern in an opaque layer 804 of a deadfront display, or the like). In some embodiments, the selection region 912 is not visible on the display device 530. In some embodiments, one or more portions of the display device 530 may be illuminated to provide visual feedback of a current color state. Further, the mode of user input may differentiate between desired functions. In one instance, a button press may initiate an additional function (e.g. toggle one or more load devices, or the like).

Figure 9F:
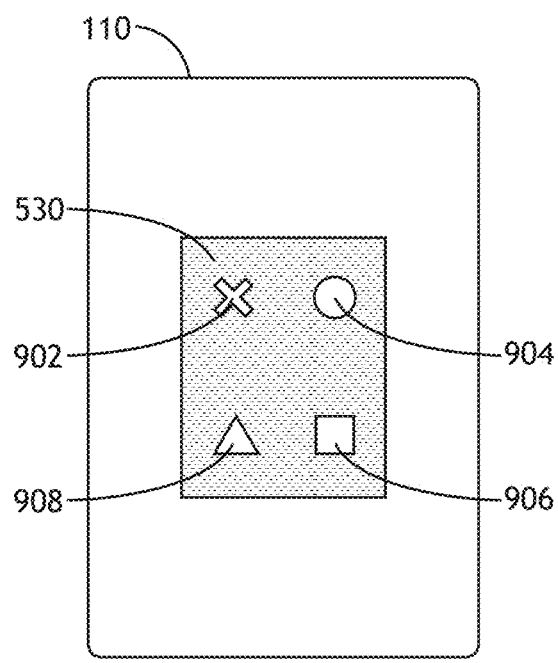
FIG. 9F is a top view of a device control assembly having a display device in a Notification display mode, in accordance with one or more embodiments of the present disclosure.

In some embodiments, a display mode includes a Notification display mode. FIG. 9F is a top view of a device control assembly 110 having a display device 530 in a Notification display mode, in accordance with one or more embodiments of the present disclosure. In some embodiments, one or more shapes 902-908 may illuminate with a notification illumination profile (e.g. an intensity and/or color associated with a notification). For example, a shape 902-908 may blink red to indicate a notification. In response, a user may interact with the blinking shape 902-908 (e.g. via a tap, a double tap, or the like) to respond to the notification. In one instance, the triangle 908 may blink red to indicate that a door (e.g. a garage door, a front door, or the like) is open or unlocked. In response, the user may tap the triangle 908 to address the notification (e.g. close the garage door, lock the front door, or the like) and reset the notification (e.g. return the triangle 908 to a nominal illumination profile). In some embodiments, each shape 902-908 may indicate a different notification (e.g. an open door, an open window, a missed telephone call, or the like). Further, each shape may illuminate with any number of illumination profiles (e.g. combinations of color and intensity) to indicate any number of notifications.

Figure 9G:
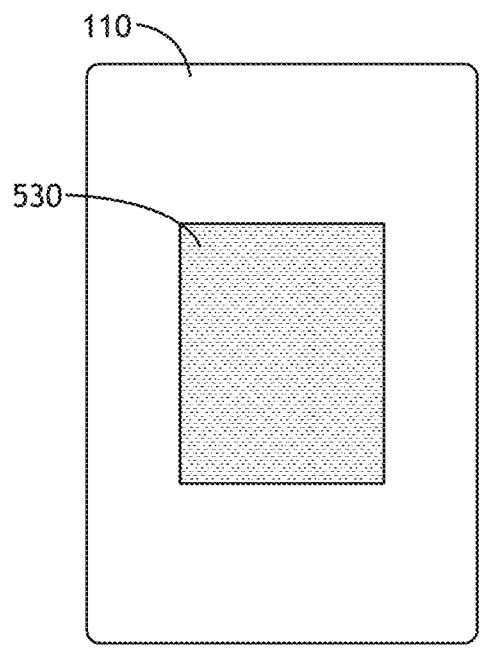
FIG. 9G is a top view of a device control assembly having a display device in an Off display mode, in accordance with one or more embodiments of the present disclosure.

In some embodiments, a display mode includes an Off display mode. FIG. 9G is a top view of a device control assembly 110 having a display device 530 in an Off display mode, in accordance with one or more embodiments of the present disclosure. In some embodiments, in an Off display mode, none of the shapes 902-910 are illuminated. In one instance, an Off display mode may function as a load toggle. In this regard, interacting with the display device may toggle and/or actuate a desired function (e.g. actuate a load device, actuate a defined grouping of load devices, start a function, or the like). In another instance, an Off display mode may indicate a selection state such that a display mode may be selected. In this regard, interacting with the display device 530 (e.g. at any location) may switch the display mode and illuminate any number of shapes 902-910. FIG. 9H is a table providing an exemplary illustration of different ways of accessing the different display modes via an Off mode, in accordance with one or more embodiments of the present disclosure.

In some embodiments, the device control assembly 110 includes sensor circuitry 532 coupled to one or more sensors (e.g. sensor hardware 534). For example, a device control assembly 110 may include, but is not limited to, a visible light sensor, a temperature sensor, a proximity sensor, a pressure sensor, a passive infrared (PIR) sensor, an active infrared sensor, or a thermopile sensor. In this regard, the sensor circuitry 532 may generate one or more sensor input signals associated with an environment proximate to the device control assembly 110.

In some embodiments, the device control assembly 110 includes occupancy detection circuitry 536 coupled to the sensor circuitry 532 and/or the sensor hardware 534 to determine occupancy of a room in which the device control assembly 110 is located based on signals from the sensor hardware 534. In some embodiments, the occupancy detection circuitry 536 performs occupancy detection and vacancy detection. Further, the device control assembly 110 may detect one or more occupants in a space (e.g. a room, an area proximate to the device control assembly 110, or the like). Additionally, the device control assembly 110 may detect stationary or moving occupants.

Figure 10:
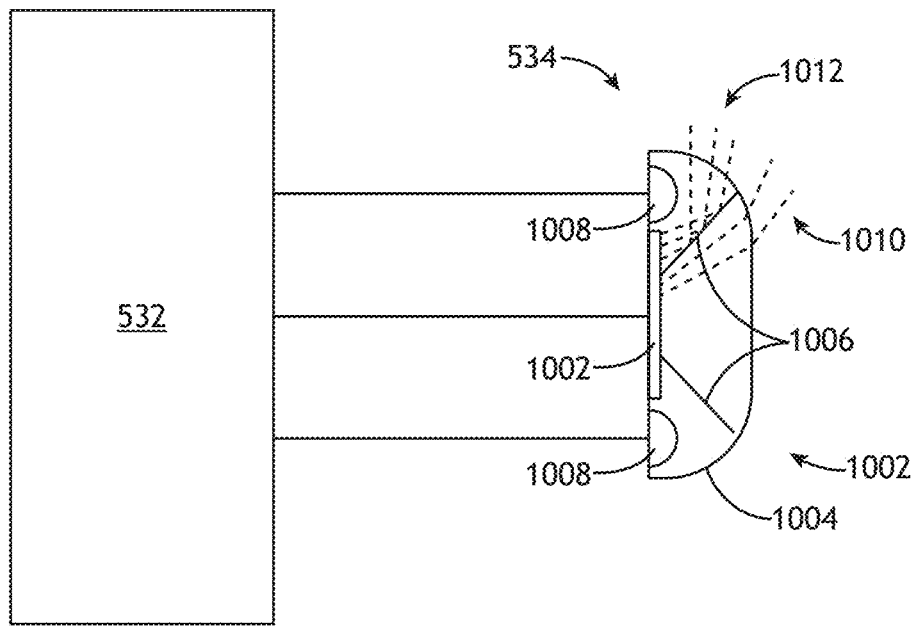
FIG. 10 is a conceptual view of sensor hardware, sensor circuitry, and occupancy detection circuitry of a device control assembly for occupancy detection, in accordance with one or more embodiments of the present disclosure.

FIG. 10 is a conceptual view of sensor hardware 534 and sensor circuitry 532 of a device control assembly 110 for occupancy detection (e.g. in communication with occupancy detection circuitry 536), in accordance with one or more embodiments of the present disclosure. In some embodiments, the sensor hardware 534 includes a sensor assembly 1002. For example, the sensor assembly 1002 may include one or more components to capture light such as, but not limited to, a complementary metal-oxide semiconductor (CMOS) sensor, a charge-coupled device (CCD), a thermopile array (TPA) sensor, a passive infrared (PIR) sensor, or the like. In this regard, the sensor assembly 1002 may capture light (e.g. visible light, infrared light, or the like) from sources external to the device control assembly 110. In one instance, a sensor assembly 1002 may capture infrared light from one or more occupants (e.g. human occupants, animal occupants, or the like). In another instance, a sensor assembly 1002 may capture ambient infrared light.

In some embodiments, the sensor hardware 534 includes a lens 1004 to collect infrared light and direct the infrared light to the sensor assembly 1002. The lens 1004 may include any type of lens known in the art that is at least partially transparent to infrared radiation detectable by the sensor assembly 1002. Further, a shape of the lens 1004 may enable a wide field of view. For example, the lens 1004 may include a fish-eye lens. By way of another example, the lens 1004 may include a multi-field lens. In this regard, the lens 1004 may include one or more mirror-like surfaces 1006 to divide light from certain incident angles on the lens 1004 to certain portions of the sensor assembly 1002. In some embodiments, as illustrated in FIG. 10, the lens 1004 includes a tri-field lens that creates three different sections on the image sensor corresponding to light from different incident angles. Further, the outside sections may be mirrored in one axis relative to a middle section. For example, illumination 1010 from a first set of solid angles may propagate through the lens 1004 and interact with a first portion of the sensor assembly 1002, while illumination 1012 from a second set of solid angles may reflect off of one of the mirror-like surfaces 1006 and interact with a second portion of the sensor assembly 1002. In some embodiments, the mirror-like surfaces 1006 in the lens 1004 create a nearly 180 degree field of view. It is noted herein that the outside sections of the lens 1004 may be distort light (e.g. similar to distortion induced by a fish-eye lens, or the like). In some embodiments, the occupancy detection circuitry 536 performs image processing. In this regard, the device control assembly 110 may correct for distortions and/or aberrations (e.g. defocus, astigmatism, coma, chromatic aberrations, or the like) induced by the lens 1004 (e.g. via the sensor circuitry 532 and/or the occupancy detection circuitry 536).

In some embodiments, the sensor assembly 1002 includes a single type of sensor. For example, the sensor assembly 1002 may include any one of a CMOS sensor, a CCD, a TPA, or a PIR. In some embodiments, the device control assembly 110 determines occupancy at least in part based on capturing still and/or sequential images. For example, still and/or sequential images may be captured by a CMOS sensor, a CCD, or the like.

Figure 11A:
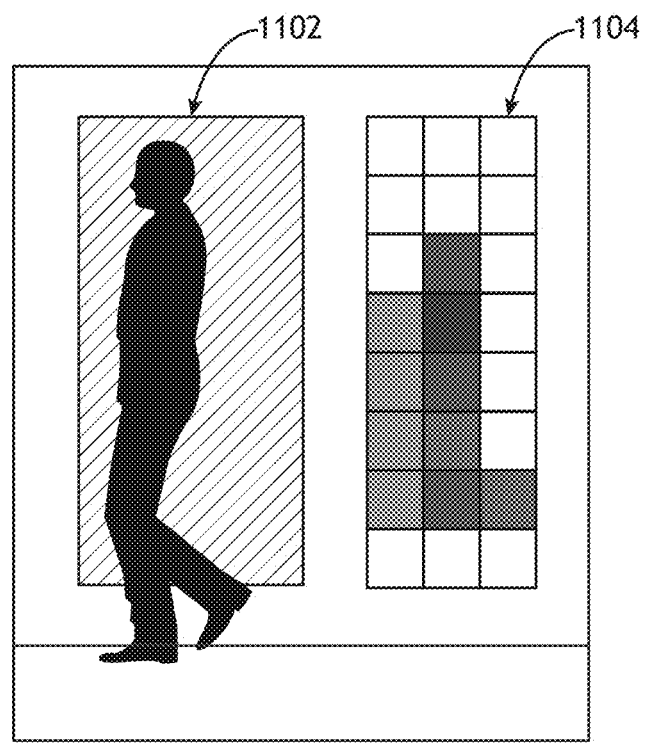
FIG. 11A is a conceptual view of a person in motion and a corresponding heat map as imaged by a TPA, in accordance with one or more embodiments of the present disclosure.
Figure 11B:
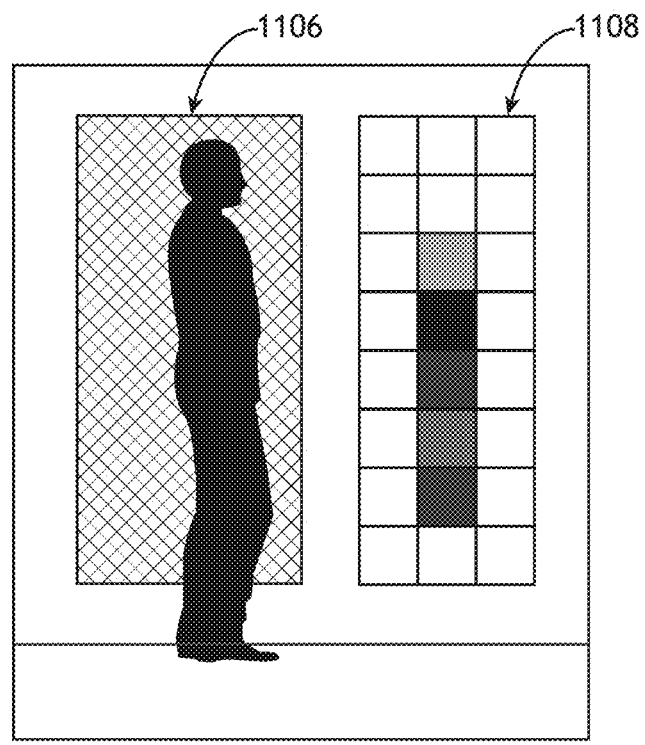
FIG. 11B is a conceptual view of a stationary person and a corresponding heat map as imaged by a TPA, in accordance with one or more embodiments of the present disclosure.

In some embodiments, the device control assembly 110 determines occupancy at least in part based on measuring the temperature (e.g. actual temperature, relative temperature, or the like) of the field of view of the sensor assembly 1002. For example, TPA and a directional lens may measure the temperature of an area surrounding the device control assembly 110. In this regard, a resolution of the temperature measurement may be related to a resolution of the TPA (e.g. the number of thermopile sensors, the size of thermopile sensors, or the like) and/or a resolution of the lens 1004. FIG. 11A is a conceptual view of a person in motion 1102 and a corresponding heat map 1104 as imaged by a TPA, in accordance with one or more embodiments of the present disclosure. FIG. 11B is a conceptual view of a stationary person 1106 and a corresponding heat map 1108 as imaged by a TPA, in accordance with one or more embodiments of the present disclosure. For example, a grayscale value in the heat map 1104 may correspond to measured temperature such that darker grayscale values may indicate higher measured temperatures. In some embodiments, TPA measurements are reported in a heat map grid where darker grid locations indicate higher measurement readings.

In some embodiments, the sensor assembly 1002 includes a combination of multiple sensor types to provide enhanced occupancy detection relative to the use of a single type of sensor. For example, the sensor assembly 1002 may include a CMOS sensor and a PR sensor. In one instance, a PIR sensor may be tuned for long-range detection (e.g. by adjusting the gain of a sensing element, the sensitivity to changes in temperature, or the like) to complement the shorter range, but higher resolution of a CMOS sensor. In this regard, the combined sensor assembly 1002 may be suitable for picking up motion of warm, moving bodies at long distances in order to maintain an occupancy detection status when an object is out of range of the CMOS sensor. By way of another example, the sensor assembly 1002 may include a CMOS sensor and a TPA sensor. In this regard, an image associated with the CMOS sensor and an image associated with the TPA sensor may be overlaid to provide a multidimensional image to further improve the accuracy of the occupancy detection circuitry 536.

In some embodiments, the sensor hardware 534 includes one or more IR emitters 1008 to emit one or more wavelengths of infrared light that may be detected by the sensor assembly 1002. IR emitters 1008 may include any type of source suitable for emitting infrared light such as, but not limited to, an infrared diode, an infrared laser, or the like. In this regard, the device control assembly 110 may include an active infrared occupancy sensor (AIROS). It is noted herein that IR illumination may allow a consistent depiction of the room regardless of the current ambient light level. In some embodiments, one or more IR emitters 1008 illuminate a room with infrared light for a period of time to facilitate detection of infrared light reflected from objects within the room (e.g. human occupants, animals, surfaces, or the like). In some embodiments, the IR emitters 1008 are modulated synchronously to the sensor assembly 1002 (e.g. a CMOS sensor, or the like) to cancel out the effect of external sources of infrared light. For example, remote controllers, reflections from moving window blinds and/or doors may act as sources of infrared light and/or influence the distribution of infrared light collected by the sensor assembly 1002.

In some embodiments, the device control assembly 110 captures an image with and without the one or more IR emitters 1008 illuminating the space. In this regard, the occupancy detection circuitry 536 may generate a difference image by taking the difference of two acquired images. For example, the difference is taken of two acquired images where one image is taken of the space illuminated by the IR emitters 1008 and the other image was taken without the space being illuminated by the one or more IR emitters 1008. Further, the difference image may provide an image of the room free from variations due to ambient light. In some embodiments, the occupancy detection circuitry 536 may perform image processing to determine a background image (e.g. an image of the unoccupied space) and one or more foreground images that are analyzed to determine occupancy.

Referring generally to FIGS. 12A through 12H, in some embodiments, the occupancy detection circuitry 536 utilizes shape detection to identify one or more objects. In some embodiments, the occupancy detection circuitry 536 performs one or more image processing steps to an image (e.g. an image generated by the sensor assembly 1002, or the like). For example, the occupancy detection circuitry 536 may, but is not limited to, perform image filtering, binarization, edge detection, contour detection, or morphological image processing (e.g. image opening, image closing, or the like). By way of another example, the occupancy detection circuitry 536 may, but is not required to, utilize shape identification algorithms. The occupancy detection circuitry 536 may utilize any shape and/or object identification algorithm known in the art such as, but not limited to, Hough transforms, convolution, differential methods, Fourier Transform-based detection, or blob detection. In some embodiments, the device control assembly 110 utilizes pose detection (e.g. static pose detection, dynamic pose detection, or the like) to identify one or more poses and/or gestures of an identified object. In this regard, the occupancy detection circuitry 536 may identify the orientations of one or more body parts of an occupant such as hands, fingers, arms, legs, head, or the like. For example, the occupancy detection circuitry 536 may generate a wire frame representation of an identified object (e.g. an identified person, or the like) for pose detection in which select body parts are identified as basic shapes and/or lines. In some embodiments, the device control assembly 110 may be controllable through identified poses and/or gestures. In this regard, the occupancy detection circuitry 536 may identify one or more poses and/or gestures and may perform one or more functions (e.g. turning on one or more luminaires, or the like) based on the one or more identified poses and/or gestures.

Figure 12A:
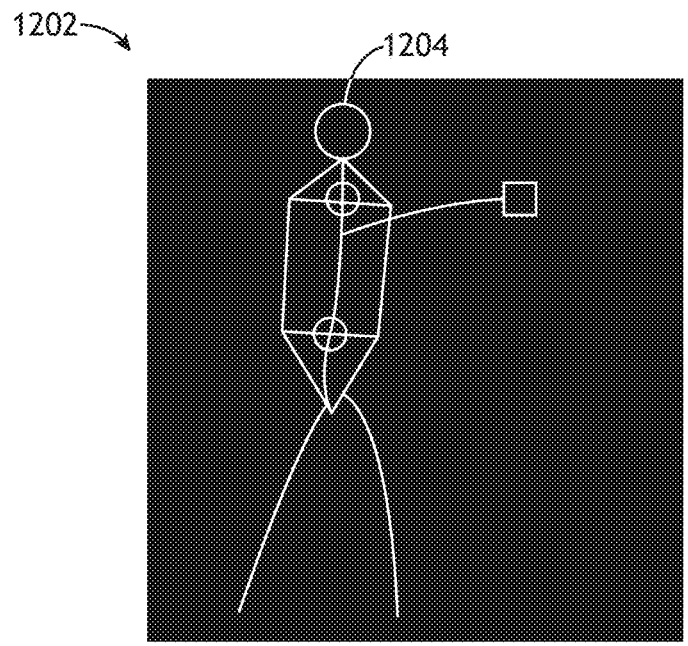
FIG. 12A is a processed image illustrating a wire frame of a person as identified by the occupancy detection circuitry from a static foreground image, in accordance with one or more embodiments of the present disclosure.
Figure 12B:
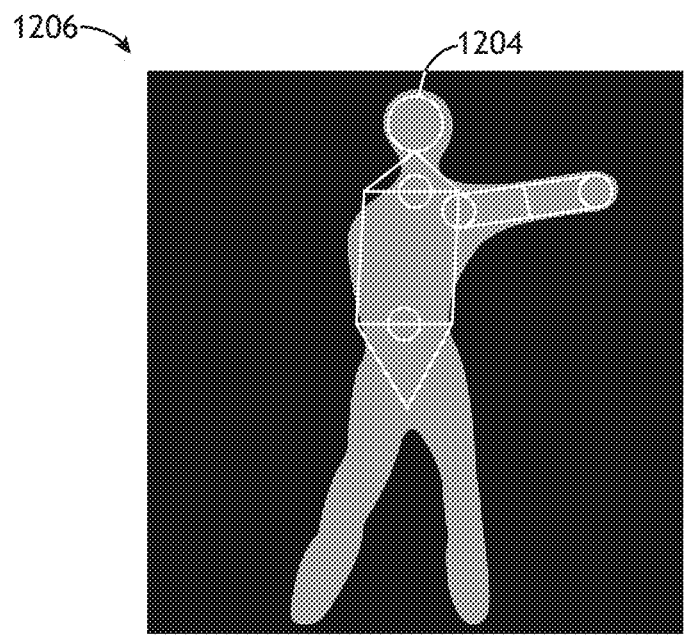
FIG. 12B is a processed image illustrating the wire frame of the identified person as shown in FIG. 12A superimposed over a binarized image of the identified person, in accordance with one or more embodiments of the present disclosure.
Figure 12C:
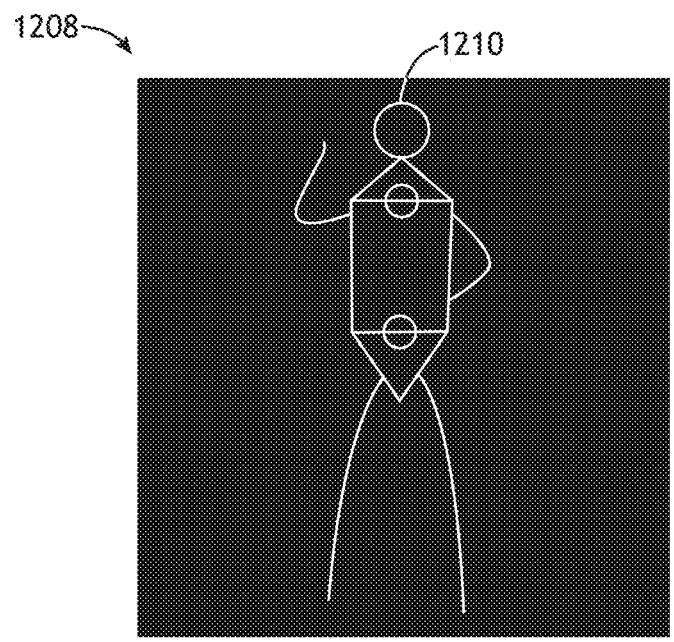
FIG. 12C is a processed image illustrating a wire frame of a person as identified by the occupancy detection circuitry from a static foreground image, in accordance with one or more embodiments of the present disclosure.
Figure 12D:
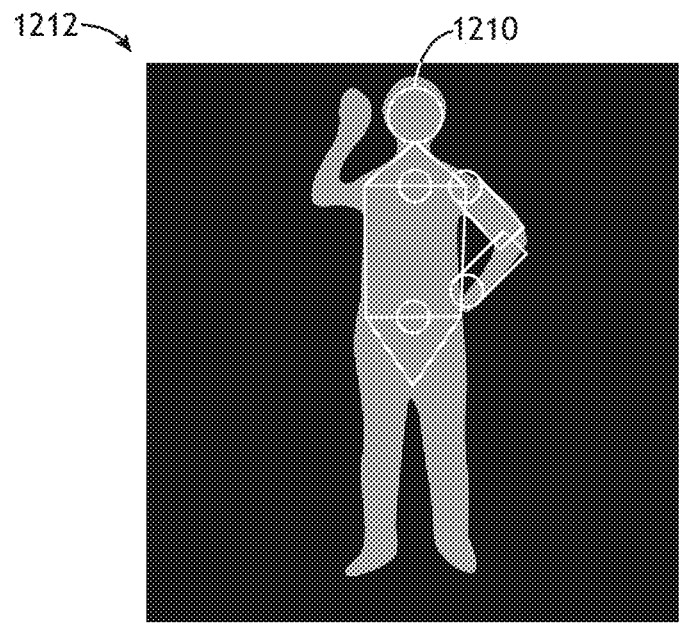
FIG. 12D is a processed image illustrating the wire frame of the identified person shown in FIG. 12C superimposed over a binarized image acquired by the occupancy detection circuitry, in accordance with one or mroe embodiments of the present disclosure.
Figure 12E:
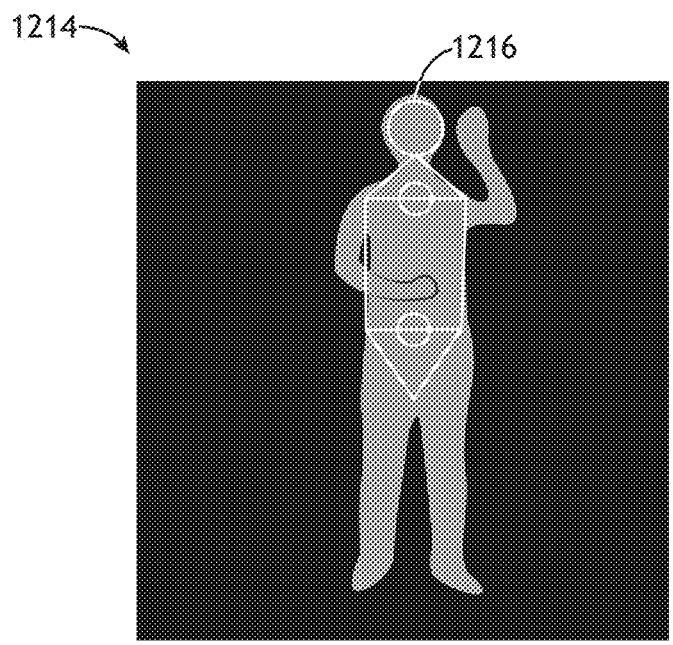
FIG. 12E is a processed image illustrating a wire frame of a person holding an arm in front of his/her body as identified by the occupancy detection circuitry from a static foreground image, in accordance with one or more embodiments of the present disclosure.
Figure 12F:
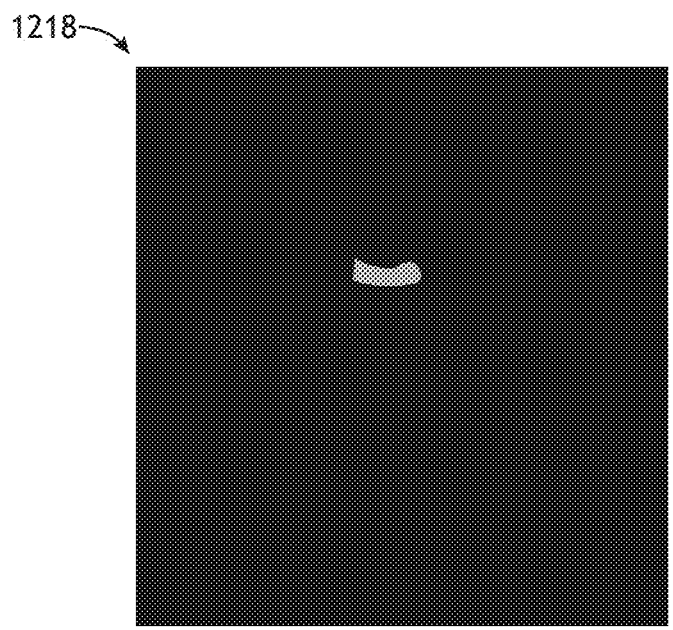
FIG. 12F is a processed image illustrating the location of the arm of FIG. 12E alone, in accordance with one or more embodiments of the present disclosure.
Figure 12G:
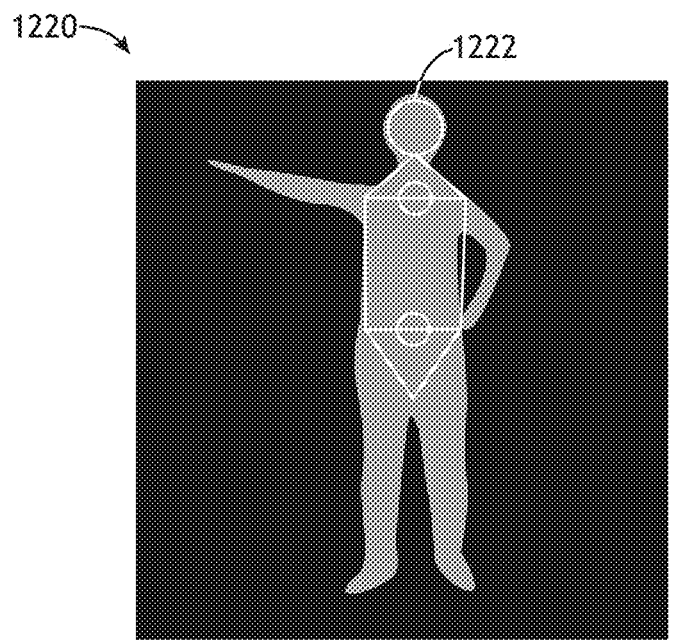
FIG. 12G is a processed image illustrating a wire frame of an identified person superimposed over a binarized image acquired by the occupancy detection circuitry from a static foreground image, in accordance with one or more embodiments of the present disclosure.
Figure 12H:
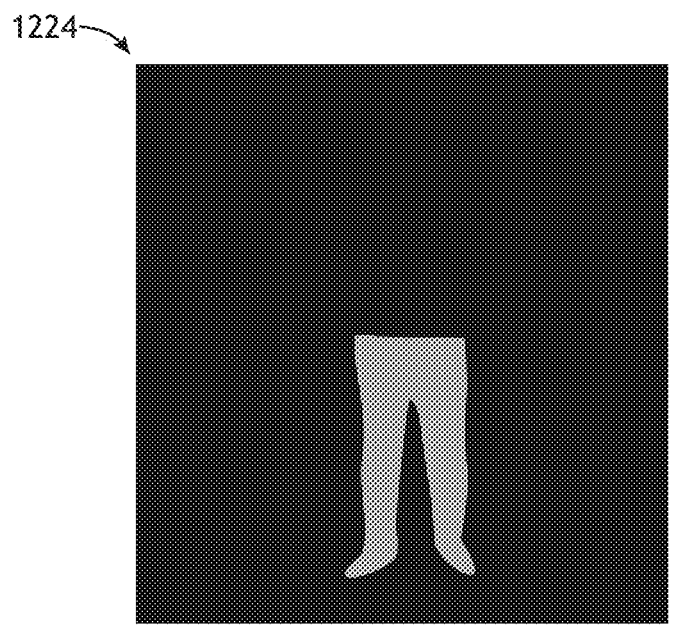
FIG. 12H is a processed image illustrating the position of the legs of the person identified in FIG. 12G, in accordance with one or more embodiments of the present disclosure.

FIG. 12A is a processed image 1202 illustrating a wire frame 1204 of a person as identified by the occupancy detection circuitry 536 from a static foreground image, in accordance with one or more embodiments of the present disclosure. For example, the head may be represented as a circle, a torso may be represented as a series of triangles and rectangles, arms and legs may be represented as lines, and hands may be represented as circles or squares. FIG. 12B is a processed image 1206 the wire frame 1204 of the identified person as shown in FIG. 12A superimposed over a binarized image of the identified person (e.g. acquired by the device control assembly 110), in accordance with one or more embodiments of the present disclosure. For example, FIGS. 12A and 12B may illustrate a pose including an outstretched arm, FIG. 12C is a processed image 1208 illustrating a wire frame 1210 of a person as identified by the occupancy detection circuitry 536 from a static foreground image, in accordance with one or more embodiments of the present disclosure. FIG. 12D is a processed image 1212 illustrating the wire frame 1210 of the identified person shown in FIG. 12C superimposed over a binarized image acquired by the occupancy detection circuitry 536, in accordance with one or more embodiments of the present disclosure. For example, FIGS. 12C and 12D may illustrate a pose indicating a particular orientation of two arms. In some embodiments, the occupancy detection circuitry 536 may distinguish between one or more overlapping body parts of an occupant in an image. FIG. 12E is a processed image 1214 illustrating a wire frame 1216 of a person holding an arm in front of his/her body as identified by the occupancy detection circuitry 536 from a static foreground image, in accordance with one or more embodiments of the present disclosure. FIG. 12F is a processed image 1218 illustrating the location of the arm of FIG. 12E alone, in accordance with one or more embodiments of the present disclosure. FIG. 12G is a processed image 1220 illustrating a wire frame 1222 of an identified person superimposed over a binarized image acquired by the occupancy detection circuitry 536 from a static foreground image, in accordance with one or more embodiments of the present disclosure. FIG. 12H is a processed image 1224 illustrating the position of the legs of the person identified in FIG. 12G, in accordance with one or more embodiments of the present disclosure. In some embodiments, shape and motion detection will be used to identify moving objects. In this regard, the occupancy detection circuitry 536 may discriminate between human occupants and additional objects such as pets, insects, or the like.

In some embodiments, the sensor hardware 534 includes a microphone 522. For example, the microphone 522 may be used to listen to ambient noise in a space to determine occupancy. Further, the occupancy detection circuitry 536 may utilize a combination of audio and visual sensor inputs to determine occupancy.

Figure 13:
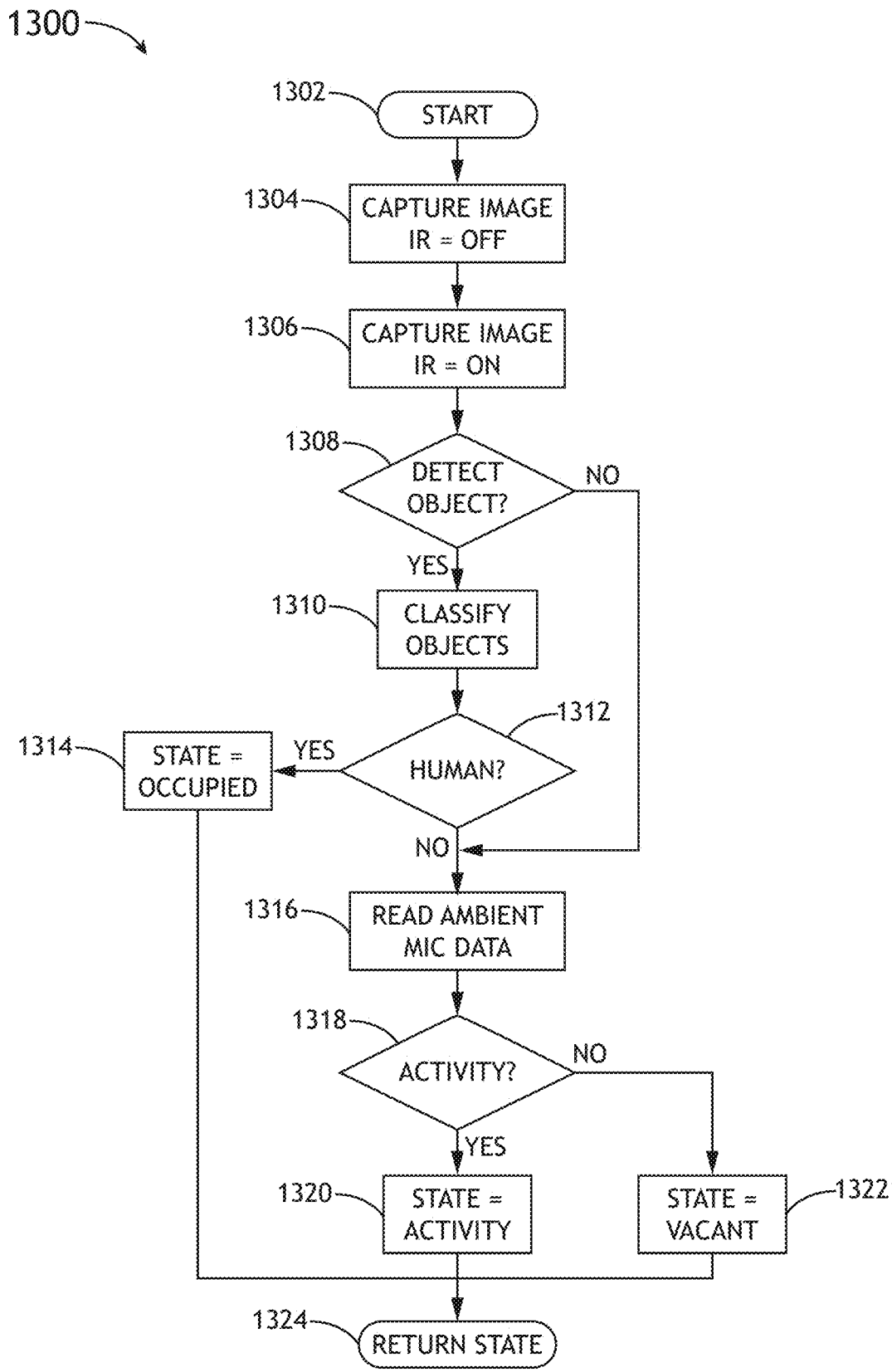
FIG. 13 is a flow diagram illustrating a method for occupancy detection, in accordance with one or more embodiments of the present disclosure.

FIG. 13 is a flow diagram illustrating a method 1300 for occupancy detection, in accordance with one or more embodiments of the present disclosure. Applicant notes that the embodiments and enabling technologies described previously herein in the context of modular control unit 100 should be interpreted to extend to method 1300. It is further noted, however, that the method 1300 is not limited to the architecture of the modular control unit 100.

In some embodiments, a step 1302 includes starting the method. In some embodiments, a step 1304 includes capturing a first image without the use of IR emitters 1008. In some embodiments, a step 1306 includes capturing a second image with IR illumination from one or more IR emitters 1008. In some embodiments, a step 1308 includes detecting one or more objects based on the first and/or the second images. For example, the first image may be subtracted from the second image to generate a difference image (e.g. a static foreground image, or the like). Further, one or more image processing steps may be applied to any image (e.g. the first image, the second image, a difference image, or the like) to facilitate the detection of one or more objects in the image. In some embodiments, a step 1310 includes classifying one or more identified objects. Objects may be classified into any number of classifications such as, but not limited to, human, animal, pet, insect, window, door, furniture, or the like. In some embodiments, a step 1312 includes determining whether any of the one or more identified objects are human. In some embodiments, a step 1314 includes classifying a state of the room as OCCUPIED if one or more humans are identified (e.g. by step 1310). In some embodiments, a step 1316 includes acquiring one or more additional sensor signals to determine ambient conditions in the room if a human is not determined to be in the room (e.g. in steps 1310 and 1312). For example, step 1316 may include reading audio data from a microphone, motion data from a PIR sensor, or the like. In some embodiments, a step 1318 includes determining whether activity is occurring in the room based on an image (e.g. the first image, the second image, a difference image, or the like) and/or audio data from the microphone. In some embodiments, a step 1320 includes classifying the state of the room as ACTIVITY if activity is identified in step 1318. In some embodiments, a step 1322 includes classifying the state of the room as VACANT if activity is not identified in step 1318. In some embodiments, a step 1324 includes providing the state of the room. In some embodiments, occupancy detection circuitry 536 may perform the method 1300 periodically to update the status of the room.

In some embodiments, occupancy detection circuitry 536 may perform biometric authentication of an identified person. The occupancy detection circuitry 536 may provide any method of biometric recognition known in the art. For example, an image provided by the sensor assembly 1002 may be analyzed to provide facial recognition, retinal recognition, fingerprint recognition or the like. By way of another example, a device control assembly 110 may include one or more dedicated biometric sensors for biometric identification of occupants.

In some embodiments, the occupancy detection circuitry 536 detects facial features and authenticates known users of a device control assembly 110. In some embodiments, the facial recognition function is enhanced using the IR emitters 1008 to create shadows on either side of a face.

Figure 14:
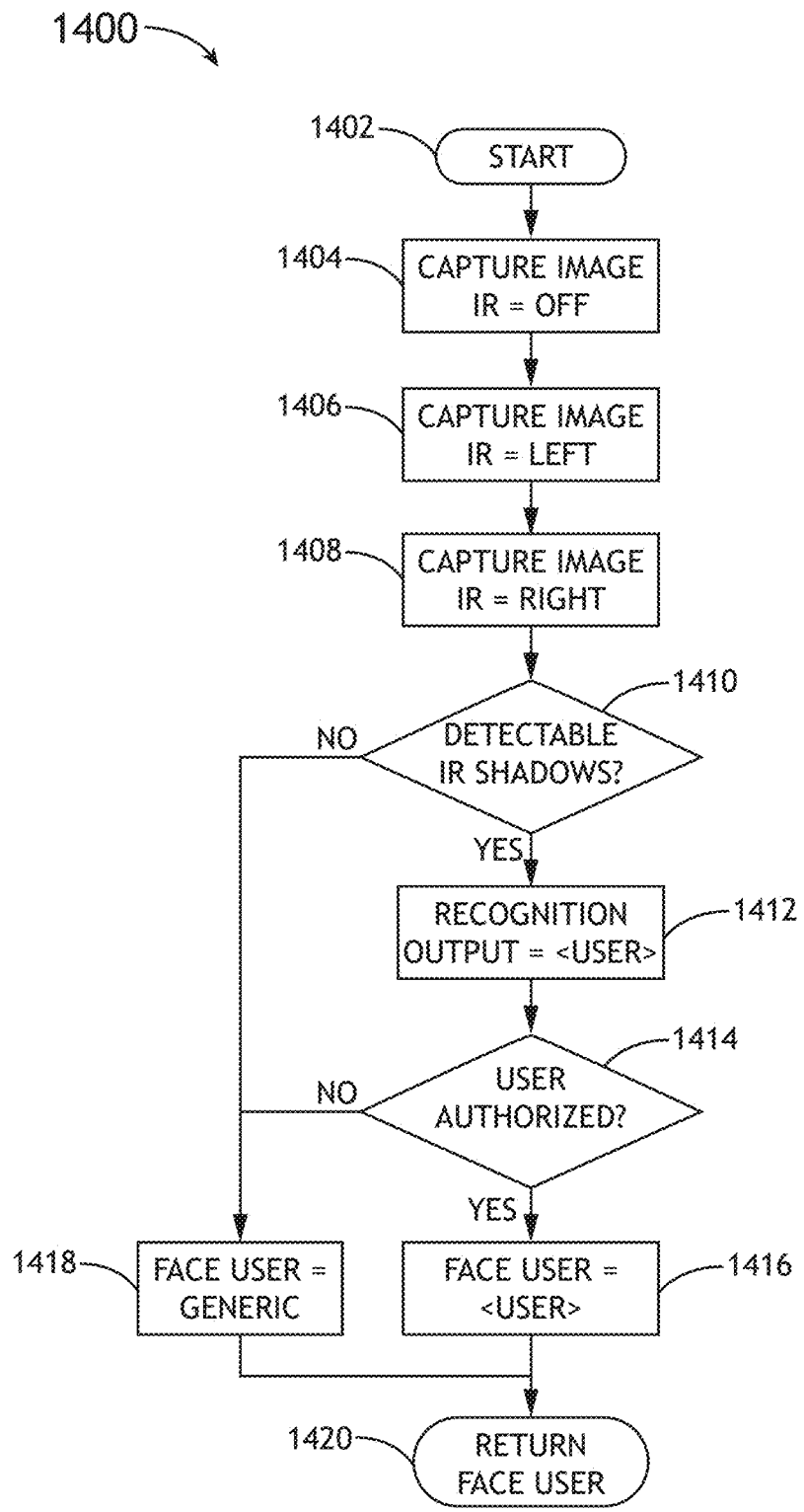
FIG. 14 is a flow diagram illustrating a method for facial detection, in accordance with one or more embodiments of the present disclosure.

FIG. 14 is a flow diagram illustrating a method 1400 for facial detection, in accordance with one or more embodiments of the present disclosure. Applicant notes that the embodiments and enabling technologies described previously herein in the context of modular control unit 100 should be interpreted to extend to method 1400. It is further noted, however, that the method 1400 is not limited to the architecture of the modular control unit 100.

In some embodiments, a step 1402 includes starting the method. In some embodiments, a step 1404 includes capturing a first image of a target face without the use of IR emitters 1008. In some embodiments, a step 1406 includes capturing a second image with IR illumination from one or more IR emitters 1008 positioned to illuminate a left side of the target face. In some embodiments, a step 1408 includes capturing a third image with IR illumination from one or more additional IR emitters 1008 positioned to illuminate a right side of the target face. In some embodiments, a step 1410 includes detecting one or more shadows in at least one of the first, second, or third images. For example, occupancy detection circuitry 536 may detect and compare shadows on the target face for no IR illumination, left-side IR illumination, and right-side IR illumination. In this regard, the occupancy detection circuitry 536 may distinguish the presence of a human face from a printed image of a face by characterizing differences in shadows of the first, second, and third images. In some embodiments, a step 1418 includes classifying the target face as GENERIC. In some embodiments, a step 1412 includes performing user recognition. For example, the occupancy detection circuitry 536 may compare any combination of the first, second, or third images with a database of known users. In some embodiments, a step 1414 includes determining whether the target face is associated with a known user (e.g. based on a comparison performed in step 1412). In some embodiments, if the target face (e.g. as associated with any combination of the first, second, or third images) does not correspond to a known user, the method may proceed to step 1418 such that the target face is classified as GENERIC. In some embodiments, if the target face (e.g. as associated with any combination of the first, second, or third images) does not correspond to a known user, the method may proceed to step 1416 such that the target face is classified according to a USERNAME such as, but not limited to, a given name, or any type of user identifier known in the art. In some embodiments, a step 1420 includes returning the classification of the target face (e.g. GENERIC, a USERNAME, or the like).

In some embodiments, a device control assembly 110 may determine a distance between itself and another object (e.g. another device control assembly 110, an occupant, a mobile device, or the like). For example, a distance between two objects may be correlated to a ratio of a power of a transmitted signal from a first object and the power of the received signal at the second object. In this regard, a device control assembly 110 may include one or more components (e.g. one or more sensors, one or more radios, or the like) to determine a distance between the device control assembly 110 and an object.

In some embodiments, a device control assembly 110 utilizes triangulation to determine a location of an object with respect to one or more device control assemblies 110 in the network. In this regard, the distance data from multiple device control assemblies 110 with known positions and shared between the multiple device control assemblies 110 may be utilized to determine the location of the object in 3-dimensional space. In some embodiments, the occupancy detection circuitry 536 may utilize location information of one or more objects based on triangulation for occupancy detection.

It is noted herein that a location of an object may be determined using triangulation based on any type of signal known in the art. In some embodiments, a device control assembly 110 may include a depth sensor (e.g. a time of flight sensor, multiple cameras spaced at known distances, or the like) to measure a distance between the device control assembly 110 and the object for a triangulation calculation. In some embodiments, a device control assembly 110 includes radio frequency sensors suitable for detecting the distance between a radio-frequency identification tag (RFID tag) for a triangulation calculation. Accordingly, a location of a person or object with a RFID tag may be determined using triangulation.

In some embodiments, a device control assembly 110 includes one or more Bluetooth radios used as beacons to determine a distance between the device control assembly 110 and a Bluetooth object (e.g. a mobile phone, or the like). Accordingly, a location of a person or object with a Bluetooth device may be determined using triangulation. Further, Bluetooth information provided by the object may be used to determine the identity of an occupant.

Figure 15A:
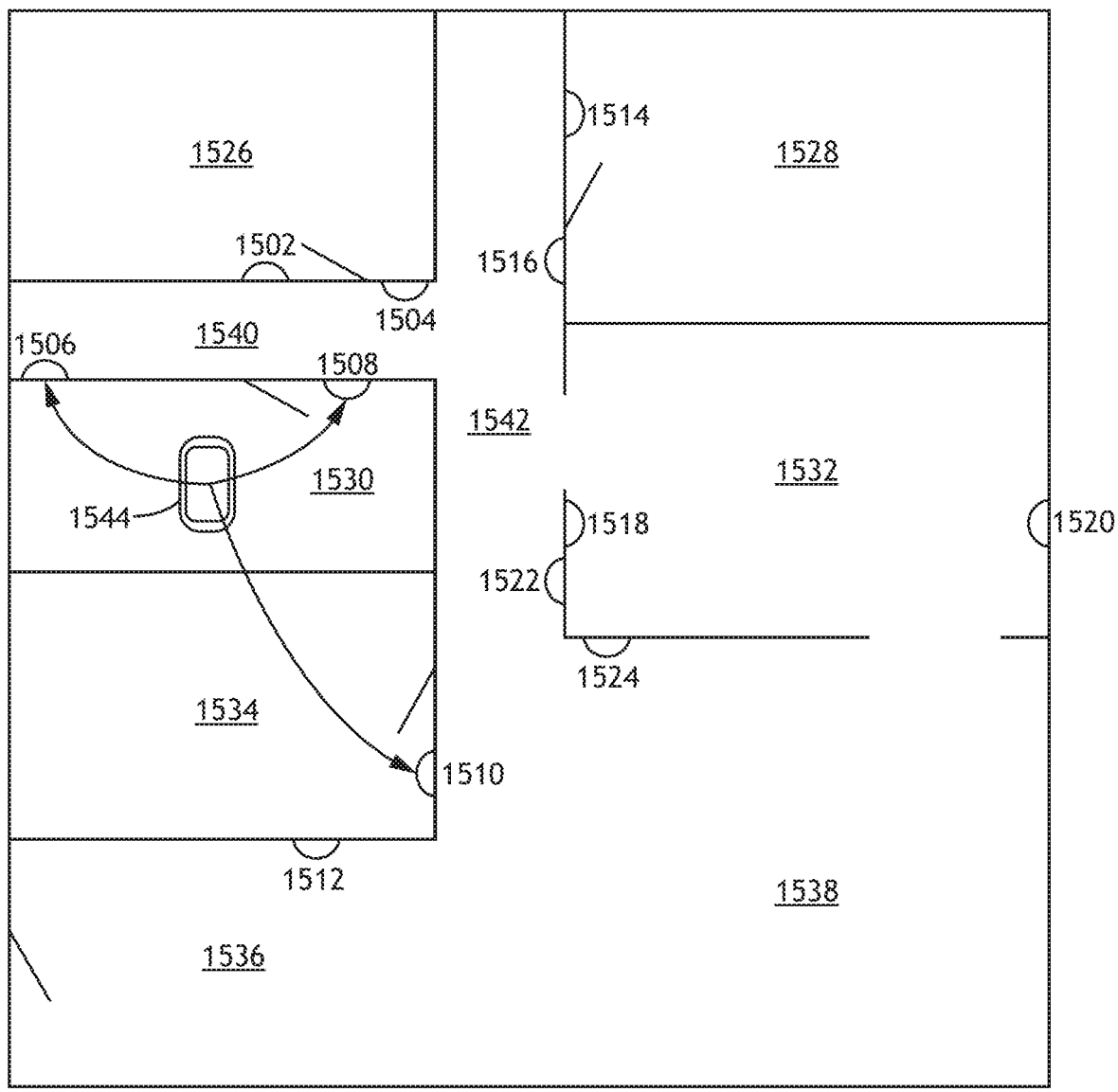
FIG. 15A is a conceptual view of a Bluetooth device (e.g. a mobile phone, or the like) located in a residence locatable via triangulation, in accordance with one or more embodiments of the present disclosure.

FIG. 15A is a conceptual view of a Bluetooth device (e.g. a mobile phone, or the like) located in a residence locatable via triangulation, in accordance with one or more embodiments of the present disclosure. In some embodiments, the residence includes device control assemblies 1502-1524 distributed throughout rooms 1526-1538 and hallways 1540-1542. For example, each device control assembly 1502-1524 may be, but is not required to be, coupled to a backplate (not shown) to form a complete modular control unit (not shown). In some embodiments, as illustrated in FIG. 15A, a Bluetooth device 1544 (and potentially a user associated with the Bluetooth device) may be located within room 1530 by triangulation using device control assemblies 1506-1510. In this regard, each device control assembly 1506-1510 may determine the distance between itself and the Bluetooth device 1544 such that the location of the Bluetooth device 1544 may be determined via triangulation. In some embodiments, additional modular control units such as, but not limited to, modular control unit 1502, device control assembly 1504, or device control assembly 1502 may provide additional information to complement and verify the determination of the location of the Bluetooth device.

Figure 15B:
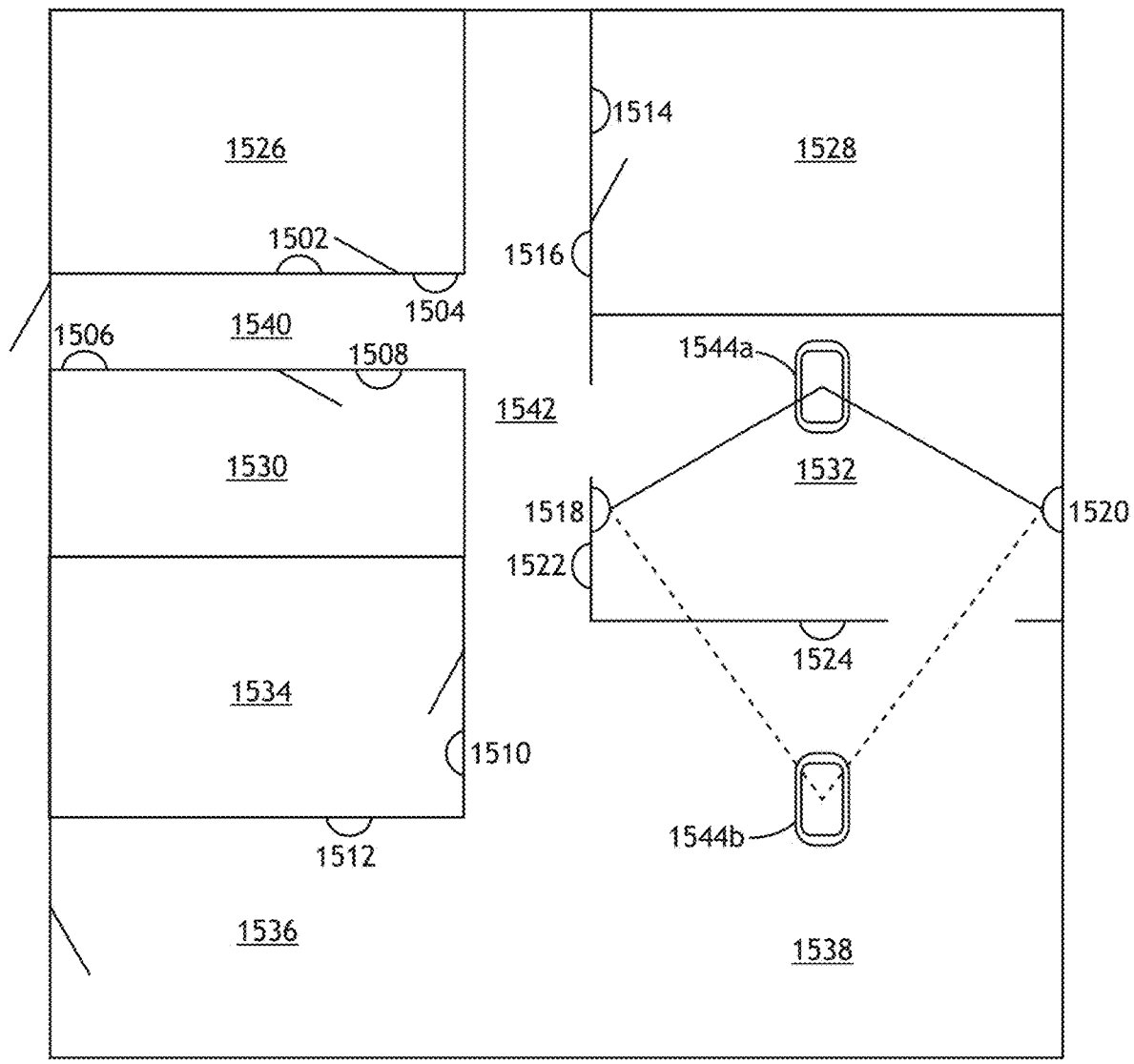
FIG. 15B is a conceptual view of a Bluetooth device (e.g. a mobile phone, or the like) located in a residence locatable via triangulation, in accordance with one or more embodiments of the present disclosure.

In some embodiments, a person, animal, or object carrying a Bluetooth device may be located through a combination of triangulation and occupancy sensing. FIG. 15B is a conceptual view of a Bluetooth device (e.g. a mobile phone, or the like) located in a residence locatable via triangulation, in accordance with one or more embodiments of the present disclosure. In some embodiments, a Bluetooth device 1544 may be located equidistant from device control assemblies 1518-1520. Further, device control assembly 1524 is equidistant from device control assemblies 1518-1520. In this regard, triangulation may not be sufficient to determine whether the Bluetooth device is in room 1532 (e.g. illustrated as 1544a) or room 1538 (e.g. illustrated as 1544b). However, an occupancy sensor associated with any of device control assemblies 1518-1524 may facilitate an accurate location determination based upon an occupant carrying the Bluetooth device.

In some embodiments, one or more device control assemblies 110 within a network of device control assemblies 110 may track and/or predict the movements of one or more occupants. For example, a single device control assembly 110 may monitor the occupancy within a detection zone proximate to the device control assembly 110. In this regard, a detection zone may define a detection range in which one or more occupants may be detected. In one instance, a detection zone may correspond to a field of view of the sensor assembly 1002 (e.g. as defined by the lens 1004). Further, a network of device control assemblies 110 may have a combined detection zone that includes the detection zones of each of the device control assemblies 110 within the network. It is noted herein that a detection zone of a device control assembly 110 may include an indoor space such as, but not limited to, a portion of a room or an entire room. Further, a detection zone of a device control assembly 110 may include an outdoor space. In this regard, a network of device control assemblies 110 may monitor occupancy in any combination of indoor or outdoor spaces.

In some embodiments, the relative locations of one or more device control assemblies 110 are known and are made available to all devices in the network. In this regard, the detection zones of the device control assemblies 110 form a combined detection zone for occupancy detection. In some embodiments, the relative locations of one or more device control assemblies 110 on the network are known relative to a map of physical objects within the detection zones (e.g. a floorplan, or the like). In some embodiments, one or more device control assemblies 110 automatically determine their relative locations. For example, one or more device control assemblies 110 may utilize triangulation based on BLE signals transmitted and received by each other to determine their relative locations. In some embodiments, the locations of one or more device control assemblies 110 are provided by a user. In some embodiments, the relative locations of one or more backplates 130 are known. In this regard, one or more backplates 130, which may be semi-permanently mounted to electrical junction boxes 102, may have fixed positions that may be transmitted to any inserted device control assembly 110. For example, backplates 130 may include circuitry to store and transmit a location (e.g. a location relative to one or more other objects, a location relative to a common map, or the like) to an inserted device control assembly. Further, the locations of one or more backplates 130 may be determined by the backplates 130 themselves (e.g. through triangulation based on transmitted and received signals) or by inserted device control assemblies 110 that may transmit a location to a coupled backplate 130 for future use by the backplate 130 or another device control assembly 110 interchangeably coupled to the backplate 130.

In some embodiments, a device control assembly 110 classifies occupancy within a detection zone according to an occupancy state. For example, an occupancy state of a detection zone may include, but is not limited to, OCCUPIED (e.g. one or more occupants are detected), VACANT (e.g. no occupants are detected), NOISE or ACTIVITY (e.g. one or more actions are occurring).

In some embodiments, an OCCUPIED occupancy state may include an action of one or more occupants such as, but not limited to, Enter (N) to describe occupants entering a field of view, Exit (X) to describe occupants exiting the field of view, Stationary (S) to describe occupants standing or sitting in a single place, or Moving (M) to describe occupants moving throughout the field of view. In some embodiments, an OCCUPIED occupancy state may include a location of one or more occupants within the field of view (e.g. the field of view of the sensor assembly 1002) such as, but not limited to, Floor Right (FR) to describe occupants at floor level in a right portion of the field of view, Floor Left (FL) to describe occupants at floor level in a left portion of the field of view, Floor Middle (FM) to describe occupants at floor level in a middle portion of the field of view, Lower Right (LR) to describe occupants in a lower-right portion of the field of view (e.g. on a staircase below a current floor level), Lower Middle (LM) to describe occupants in a lower-middle portion of the field of view, Lower Left (LL) to describe occupants in a lower-left portion of the field of view, Upper Right (UR) to describe occupants in an upper-right portion of the field of view (e.g. on a staircase above a current floor level), Upper Middle (UM) to describe occupants in an upper-middle portion of the field of view, Upper Left (UL) to describe occupants in an upper-right portion of the field of view. Further, an occupancy state may include an action as well as a location of an object. In some embodiments, a NOISE state may include, but is not limited to, Shuffling Feet (SF) to describe footsteps, Television (TV) to describe a television on in the zone, Conversation (TK), Music (MC), or Typing (TP).

For example, an occupancy state corresponding to occupant entering the right field of view of a device control assembly 110 at floor level may be, but is not required to be, described as N-FR. By way of another example, an occupancy state corresponding to occupant exiting an upper-left portion of a field of view of a device control assembly 110 (e.g. by going up a staircase, or the like) may be, but is not required to be, described as X-UL. By way of another example, an occupancy state corresponding to occupant moving in an upper-left portion of a field of view of a device control assembly 110 (e.g. by going down a staircase, but remains within the field of view, or the like) may be, but is not required to be, described as M-LR. By way of another example, an occupancy state corresponding to occupant stationary within the middle of a field of view of a device control assembly 110 at floor level may be, but is not required to be, described as S-FM. By way of a further example, an occupancy state corresponding to audible shuffling of feet (e.g. footsteps) may be, but is not required to be, described as A-SF.

In some embodiments, an occupancy state generated by a device control assembly 110 includes environmental conditions such as, but not limited to, ambient light values, ambient noise values, temperature, the time of day, the date; or weather information. In this regard, the environmental conditions may provide context for measured occupancy data. In some embodiments, an occupancy state generated by a device control assembly 110 includes an identified user. For example, an occupancy state may include a USER-NAME associated with a user identified by facial detection, an identified Bluetooth device, an identified RFID tag, or the like.

Occupancy states generated by a device control assembly 110 in a network may be stored in device on the network such that occupancy states of all device control assemblies 110 within the network may be simultaneously available to any device in the network. In some embodiments, the output data of each device control assembly 110 in the network may be combined into a single frame of system occupancy data representing the occupancy states of all zones of the system. For example, the system occupancy data may be, but is not limited to be, captured at a fixed interval (e.g. 500 ms corresponding to a 2 Hz refresh rate, or the like). In this regard, updated occupancy data of the entire system including, but not limited to, identified users, unidentified users, occupied zones, vacant zones, or active zones may be available to any device in the network.

In some embodiments, the system occupancy data (e.g. occupancy data of one or more individual device control assemblies 110, system occupancy data including occupancy data of all device control assemblies 110, or the like) is stored on one or more devices of the network. In this regard, historical occupancy data may be available to any device on the network. For example, occupancy data may be stored on one or more of the device control assemblies 110 in the network. By way of another example, occupancy data may be stored on a dedicated storage system accessible to one or more devices on the network. By way of a third example, occupancy data may be stored on a device external to the network (e.g. an external server, a cloud-based storage system, or the like).

In some embodiments, occupancy data generated by one or more device control assemblies 110 may be utilized to track the movement of one or more occupants. In some embodiments, occupancy data generated by one or more device control assemblies 110 may be utilized to track one or more patterns of movement of one or more occupants. For example, an occupant may follow one or more routines. In one instance, a user may follow a certain routine on weekday mornings before work, another routine on weekday afternoons upon returning from work, and another routine on Sunday mornings. Accordingly, a network of device control assemblies 110 may track and/or record movements through any zones monitored by the device control assemblies 110.

Figure 16A:
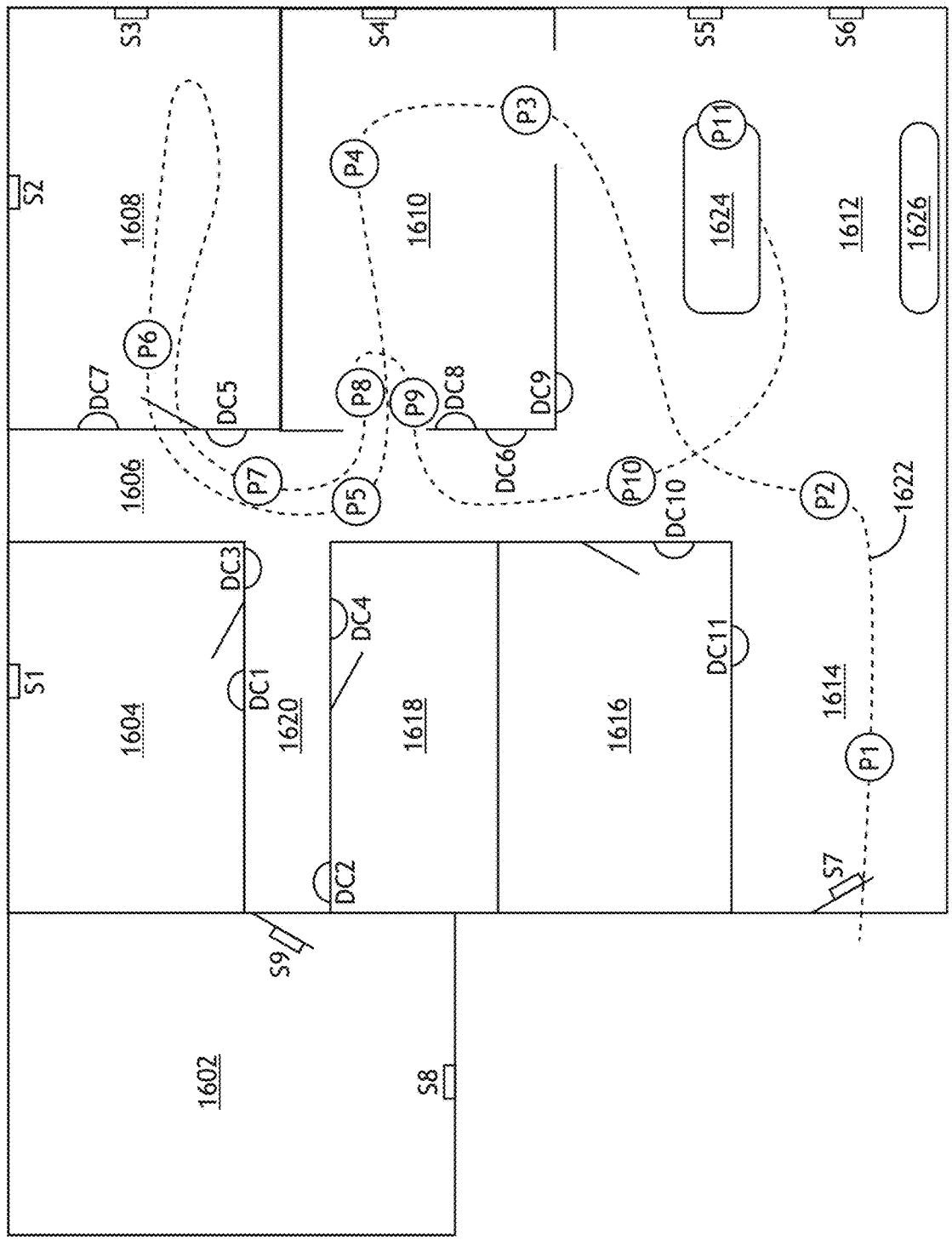
FIG. 16A is a conceptual view of a residence including a network of device control assemblies illustrating a path of a person through the residence, in accordance with one or more embodiments of the present disclosure.

FIG. 16A is a conceptual view of a residence including a network of device control assemblies illustrating a path of a person through the residence, in accordance with one or more embodiments of the present disclosure. In some embodiments, a residence includes garage 1602, Bedroom 2 (BR2) 1604, Hallway 1 (HW1) 1606, Bedroom 1 (BR1) 1608, Kitchen 1610, Living Room (LR) 1612, Entryway 1614, Bathroom 1616, Laundry Room 1618, and Hallway 2 (HW2) 1620. In some embodiments, the residence includes a network of device control assemblies 110 marked as DC1-DC11. For example, in some embodiments, the residence includes sensors marked S1-S9 (e.g. door sensors, window sensors, or the like) integrated into the network of device control assemblies 110. For example, the person may follow the path 1622 (e.g. indicated by the dotted line in FIG. 16A). FIG. 16B is a table including an exemplary description of occupancy data at positions P1-P11 illustrated in FIG. 16A, in accordance with one or more embodiments of the present disclosure. It is noted that occupancy data provided in FIG. 16B may include only a portion of system occupancy data measured by all device control assemblies 110 in the network. In this example, the person returns home from work at the end of a day and follows a typical pathway through the residence. The person may enter through a door including a door sensor S7 indicating that the person has entered the residence. Further, the person may walk through Entryway 1614 and further through the Living Room 1612 to the Kitchen 1610, where the person sets down his/her keys and wallet. The example continues with the person walking from the Kitchen 1610 through Hallway 1 1606 to Bedroom 1 1608 where the person sets down his/her bag. The example continues with the person walking from Bedroom 1 1608 through Hallway 1 1606 to the refrigerator in the Kitchen 1610. The example concludes with the person exiting the Kitchen 1610 and walking through Hallway 1 1606 to a couch 1624 in Living room 1612 and turning on the television 1626.

In some embodiments, occupancy data include a predicted next occupancy state in addition to a current occupancy state. For example, device control assemblies 110 in the network may predict behavioral patterns (e.g. routines, or the like) of one or more occupants based on current and historical occupancy data. For example, occupancy data may indicate that a person in Bedroom 1 1608 wakes up in the morning and exits Bedroom 1 1608, which may be detected by DC7 as occupancy state X-FR. The person may then walk down Hallway 1 1606, which may be detected by DC5 as a series of occupancy states N-FR, M-FM, and X-FL. Predicted occupancy data may include the person entering the Kitchen 1610, which may include a predicted occupancy state of N-FL by DC8. By way of another example, predictive occupancy data may include the person entering the Bathroom 1616, which may include a predicted occupancy state of N-FR by DC10.

In some embodiments, each device control assembly 110 provides a predicted occupancy state based on current and historical occupancy data from all device control assemblies 110 on the network. In some embodiments, at least a portion of the prediction of occupancy states is performed by an additional device on the network (e.g. a controller on the network, a remote server, a cloud-based service, or the like). Predicted occupancy data may be generated using any method known in the art suitable for determining one or more future occupancy states based on current and/or historical occupancy data. For example, predicated occupancy data may be generated using Recursive Bayesian Estimation (RBE). By way of another example, predicated occupancy data may be generated using a Kalman filter with a dynamically-weighted state-transition model (STM) predicted learning algorithm.

In some embodiments, predicted occupancy data may be based on one or more look-up tables. For example, a look-up table may include a series of starting occupancy states and predicted probabilities of potential occupancy states for each starting occupancy state (e.g. based on historical occupancy data). In this regard, predicted occupancy data may be generated by matching a current occupancy state with a starting occupancy state in a look-up table and determining which potential occupancy state has the highest predicted probability.

Figure 17A:
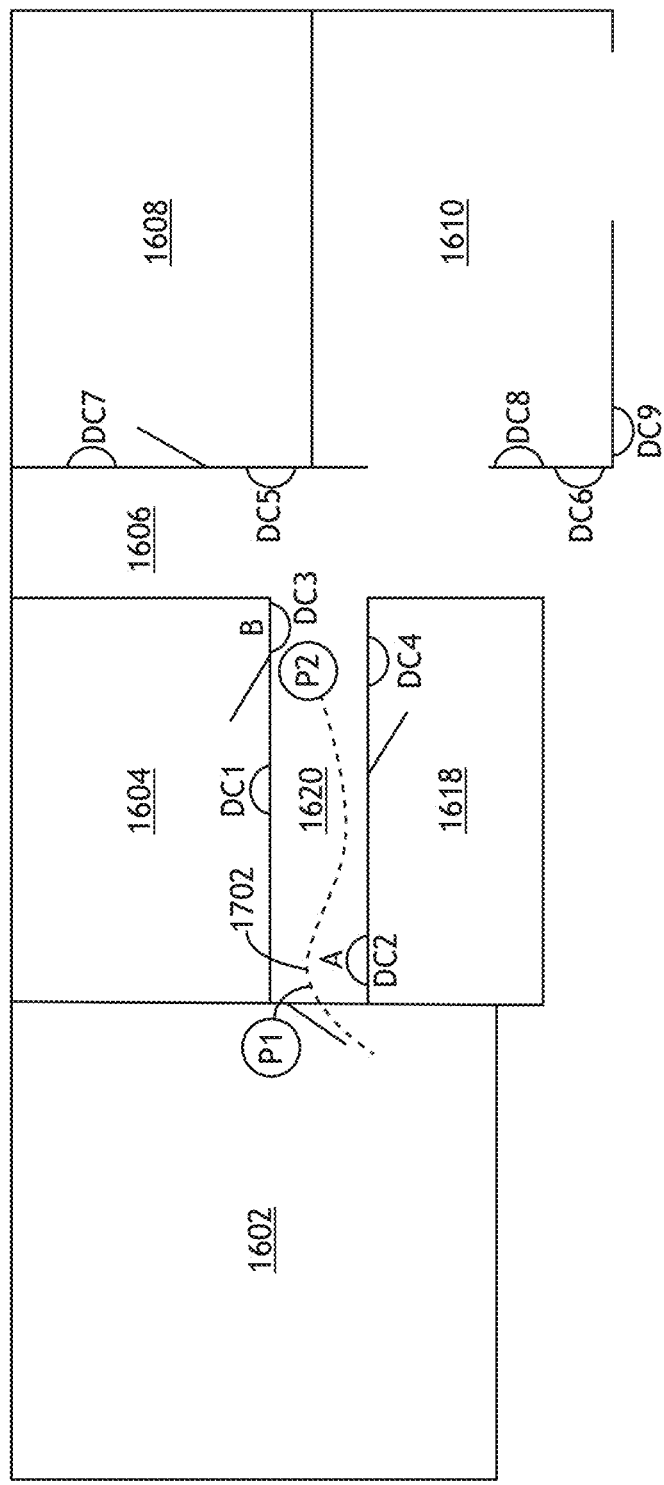
FIG. 17A is a conceptual view of a portion of the residence of FIG. 16 illustrating a path of a person, in accordance with one or more embodiments of the present disclosure.

FIG. 17A is a conceptual view of a portion of the residence of FIG. 16A illustrating a path 1702 of a person, in accordance with one or more embodiments of the present disclosure. For example, a person may enter Hallway 1 1620 from the Garage 1602, at 95 mpm (meters per minute), which may be detected by device control assemblies 110 DC2 and DC3. Further, DC2 and DC3 may generate a velocity vector for the person including the speed and direction of motion. FIG. 17B is a table including an exemplary look-up table for predicting a subsequent occupancy state based on the path 1702 and the associated velocity vector, in accordance with one or more embodiments of the present disclosure.

For example, the first row of FIG. 17B may most closely match the velocity vector for the person. Accordingly, it may be predicted that the person will enter Bedroom 2 1604 with a 10% probability, the Laundry Room 1618 with a 15% probability, Hallway 1 1606 with a 75% probability, and the Garage with a 0% probability. In one instance, a predicted occupancy state may include the person entering Hallway 1 1606, which may be associated with DC5 having a predicted occupancy state of N-FM and DC6 having a predicted occupancy state of N-FR. FIG. 17C is a table including exemplary occupancy states for position P1, P2, and the predicted next state, in accordance with one or more embodiments of the present disclosure.

In some embodiments, predicted probabilities of a look-up table are updated based on the actual next occupancy state as determined by the device control assemblies 110. In this regard, the look-up table may be continually updated. Further, the prediction of occupancy patterns may adapt to changing routines of occupants. FIG. 17D is a table including an updated version of FIG. 17B based on a case in which the user enters Bedroom 2 1604, in accordance with one or more embodiments of the present disclosure. For example, the number of total occurrences of the corresponding row (e.g. row 1 of the data) is increased from 60 to 61 and the number of occurrences of BR2 is increased from 6 to 7. Correspondingly, the probabilities are updated such that the probability of the person entering BR2 under the same conditions in the future may be raised to 11% and the probability of the person entering HW1 under the same conditions in the future is lowered to 74%.

It is to be understood that the exemplary description of the determination of occupancy prediction based on look-up tables (e.g. FIGS. 17B-17D) is provided solely for illustrative purposes and should not be interpreted as limiting. For example, a look-up table may include additional data such as, but not limited to, a time of day. In this regard, predicted probabilities in the look-up table may be based at least in part on the time of day. Accordingly, varied behavioral patterns associated with different times of day (e.g. morning, evening, bedtime, or the like) may be accommodated in the prediction of occupancy. By way of another example, a look-up table may include additional data such as, but not limited to, a day of the week. In this regard, predicted probabilities in the look-up table may be based at least in part on the day of the week. Accordingly, varied behavioral patterns associated with the day of the week (e.g. specific days, weekends, weekdays, holidays, or the like) may be accommodated in the prediction of occupancy. By way of another example, a look-up table may include additional data such as, but not limited to, usernames associated with one or more identified users. In this regard, predicted probabilities in the look-up table may be based at least in part on the identity of the person. Accordingly, the prediction of occupancy states may accommodate different routines by different identified users. Further, the prediction of occupancy states may be based on the number of occupants. For example, a person may tend to follow certain routines when in the residence alone, but may follow different routines when one or more additional people are present.

In some embodiments, occupancy prediction may be based on a sequence of past occupancy states. For example, FIGS. 17B-17D illustrate occupancy prediction based on the current occupancy state (e.g. current system occupancy data associated with one or more device control assemblies 110). By way of another example, occupancy prediction (e.g. predicted probabilities of entering certain rooms found in a look-up table, or the like) may be based on the current occupancy state as well as one or more previous occupancy states. In this regard, occupancy prediction may accommodate routines in which a person travels through a particular sequence of rooms in a particular order (e.g. the routine illustrated in FIG. 16A, or the like).

In some embodiments, a network of device control assemblies 110 incorporating occupancy prediction further includes one or more load devices (e.g. as illustrated in FIG.

7A, or the like). For example, the network may include a luminary, security system or other appliance that performs a service for a person (e.g. plays music through a speaker, or the like). Further, device control assemblies 110 in the network may automatically actuate one or more load devices based on current and/or predicted values of system occupancy data. Accordingly, device control assemblies 110 may automatically actuate one or more load devices based on learned routines associated with one or more users. In one instance, upon entering a residence, one or more device control assemblies 110 may predict that the person will enter one or more specific rooms based on historical occupancy data and actuate load devices (e.g. luminaires, fans, blinds, or the like) in the one or more specific rooms prior to the person entering those rooms.

Figure 18A:
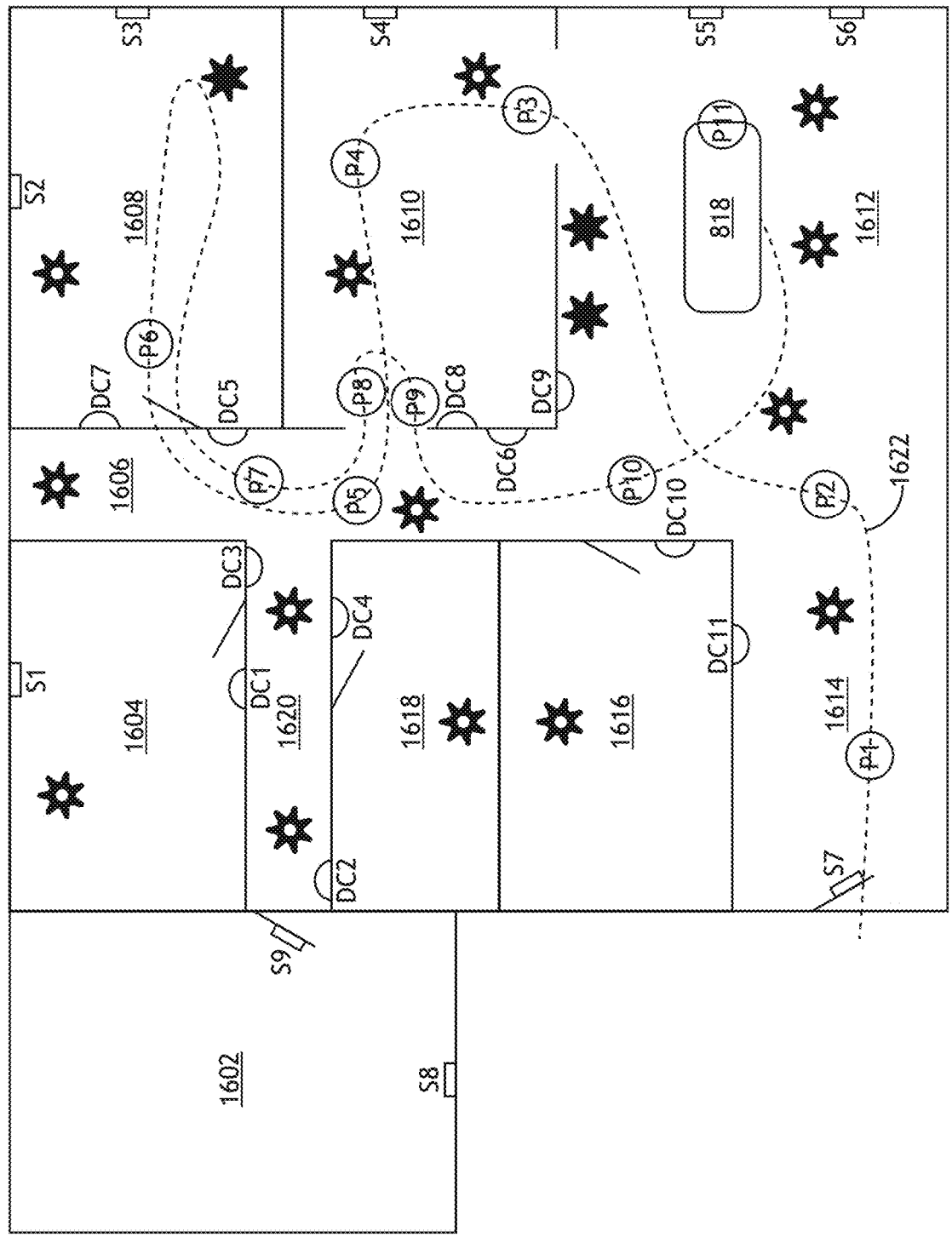
FIG. 18A is a conceptual view of a residence including a network of device control assemblies and luminaires illustrating a path of a person through the residence, in accordance with one or more embodiments of the present disclosure.

FIG. 18A is a conceptual view of a residence including a network of device control assemblies and luminaires illustrating a path of a person through the residence, in accordance with one or more embodiments of the present disclosure. For example, FIG. 18A corresponds to FIG. 16A with the addition of luminaires on the network to illustrate how occupancy data (e.g. generated by one or more device control assemblies 110 on the network, a separate controller on the network, an external server, a cloud-based service, or the like) may be applied to a lighting system. In some embodiments, luminaires electrically connected to the wiring system of the residence via a junction box (e.g. wired lighting) are illustrated with an open starburst icon in FIG. 18A. In some embodiments, luminaires electrically connected to an outlet (e.g. lamps, or the like) are illustrated with a closed (solid) starburst icon in FIG. 18A. In one instance, one or more device control assemblies 110 may turn on luminaires in the Entryway 1614, the Living Room 1612, and the Kitchen 1610 upon detecting a person entering the residence (e.g. via any combination of sensor S7, device control assembly DC11, or the like). Further, one or more device control assemblies 110 may turn off luminaires in the Entryway 1614 and the Living Room 1612 upon the person entering the Kitchen 1610. In another instance, one or more device control assemblies 110 may turn on luminaires in Bedroom 1 1608 upon the person exiting the Kitchen 1610. Further, the device control assemblies 110 may leave the luminaires in the Kitchen on in anticipation of the person returning to the Kitchen (e.g. in P8 of path 1622). In another instance, one or more device control assemblies 110 may turn off luminaires in Bedroom 1 1608 and the Kitchen 1610 and turn on luminaires in the Living Room 1612 upon the user exiting Kitchen 1610.

In some embodiments, one or more device control assemblies 110 may actuate loads based on a timer. For example, one or more device control assemblies 110 may turn on luminaires when occupancy is detected and may start a timer when occupancy is no longer detected (e.g. when a person exits a zone monitored by a device control assembly 110). Further, the device control assemblies 110 may turn off the luminaires when the timer expires if no further occupancy is detected within this time. In one instance, electrical loads in a room (e.g. luminaires, fans, appliances, or the like) may be turned off when a timer reaches 5 minutes of recorded inactivity or no occupants have been present in a room for 3 minutes. FIGS. 18B-1 and 18B-2 are two portions of a table including occupancy data illustrating the behavior of luminaires under control (LUC) in select rooms of FIG. 18A according to one exemplary embodiment, in accordance with one or more embodiments of the present disclosure. It is also noted herein that FIGS. 18B-1 and 18B-2 additionally indicate the state of luminaires based on a three-minute timer.

FIG. 18C is a table including occupancy data associated with a predictive lighting system incorporating predictive occupancy data, according to another exemplary embodiment, in accordance with one or more embodiments of the present disclosure. For example, states of luminaires under control (LUC) generated based on predicted occupancy data are shaded in gray in the table of FIG. 18C.

In some embodiments, one or more device control assemblies 110 actuate one or more load devices on the network based on environmental conditions. For example, a brightness of luminaires under control may be adjusted based on an ambient light level ambient temperature, time of day, latitude, longitude, or day of the year. Environmental conditions may be monitored by device control assemblies 110, additional sensors on the network, or the like. For instance, in the example illustrated in FIG. 18C, consider that it is 6:00 pm PDT on January $10^{th}$ at 48° north latitude 122° west longitude. Now continuing this instance, consider that before a person enters Bedroom1 1608 is measured, the ambient light level in Hallway1 1606 and Bedroom 1 1608, the temperature in Bedroom1 1608 is measured, and the position of the sun is determined (e.g. via a database, determined from an external server, or the like). In some embodiments, one or more device control assemblies 110 calculate a lighting level based on the environmental conditions as well as the past behavior of one or more occupants. For example, a lighting level at 1 PM on a bright summer day may be 0% such that the lights do not turn on.

Figure 19:
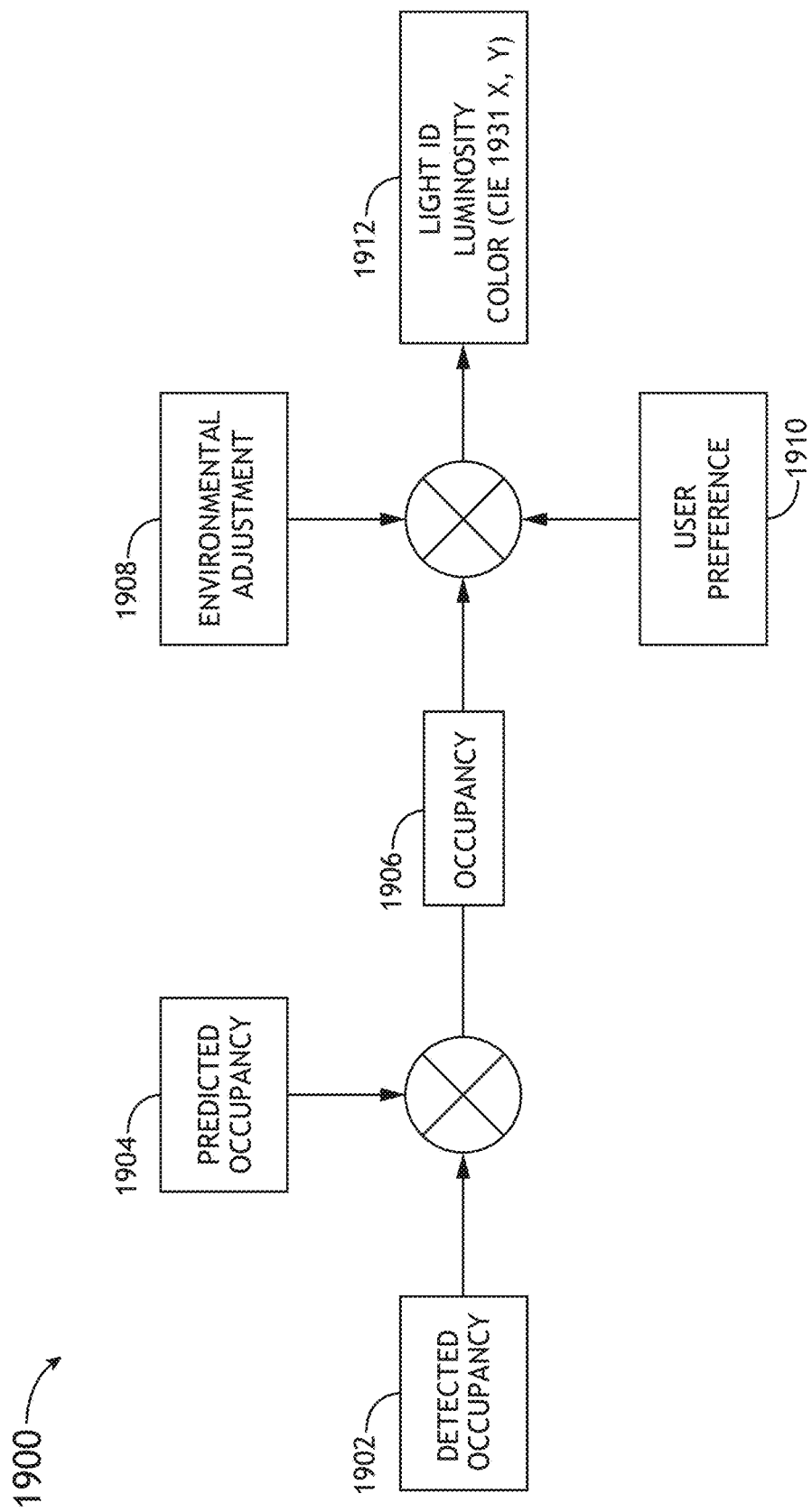
FIG. 19 is a flow diagram illustrating a method for the automatic adjustment of a lighting level based on occupancy and environmental conditions, in accordance with one or more embodiments of the present disclosure.

FIG. 19 is a flow diagram illustrating a method 1900 for the automatic adjustment of a lighting level based on occupancy and environmental conditions, in accordance with one or more embodiments of the present disclosure. Applicant notes that the embodiments and enabling technologies described previously herein in the context of modular control unit 100 should be interpreted to extend to method 1900. It is further noted, however, that the method 1900 is not limited to the architecture of the modular control unit 100.

In some embodiments, a step 1902 includes detecting occupancy of one or more zones (e.g. via one or more device control assemblies 110, or the like). In some embodiments, a step 1904 includes predicting the occupancy of one or more zones. For example, occupancy may be predicted via a look-up table utilizing historical occupancy data. In some embodiments, a step 1906 includes defining the occupancy of one or more zones based on the detected and predicted occupancy of steps 1902 and 1904. In some embodiments, a step 1908 includes determining an environmental adjustment to one or more luminaires in zones associated with the occupancy of step 1906. For example, environmental conditions such as, but not limited to, ambient light level, weather conditions, indoor ambient temperature, position of the sun, or time of day may be utilized to determine an adjusted lighting level. In some embodiments, a step 1910 includes determining a user preference for a lighting level. For example, user preference may include, but is not limited to, manual override of a light level, default preferences, or preselected preferences associated with an identified user. In some embodiments, a step 1912 includes setting the light level of the one or more luminaires associated with the occupancy of step 1906. For example, a lighting level may include, but is not limited to, a brightness level or a luminosity color (e.g. CIE 1931 coordinates, or the like).

In some embodiments, one or more device control assemblies 110 are capable of controlling blinds and façade to actively manage lighting and temperature based on occupancy. For example, a window exposure to the sun most of the day during the summer may increase the temperature inside a house. In some embodiments, one or more device control assemblies 110 may close the blinds and/or façade when no occupants are detected and open the blinds and/or façade when occupants are detected. In some embodiments, the one or more device control assemblies 110 may control the blinds and/or façade based on user behavior. For example, if an occupant opens a window, one or more device control assemblies 110 may close select blinds to block out the sun.

In some embodiments, the device control assembly 110 may be controlled via voice commands. For example, a user may provide one or more voice commands to initiate one or more functions of a device control assembly 110 such as, but not limited to, actuating a load.

In some embodiments, the device control assembly 110 performs voice recognition and command interpretation operations. For example, the device control assembly 110 may utilize speaker-independent speech recognition software to translate spoken words into text strings that may be interpreted as commands. By way of another example, the device control assembly 110 utilizes automatic speech recognition software (e.g. CMU Sphinx, or the like) to recognize speech. In some embodiments, the device control assembly 110 utilizes deep neural network (ANN) approaches to recognize speech.

In some embodiments, a device control assembly 110 records voice commands and sends them to a predetermined voice service for processing. The voice service may be any voice service known in the art suitable for performing speech recognition and/or command interpretation based on the recognized speech. For example, a voice service may include a controller on the network of device control assemblies 110. By way of another example, the voice service may include a controller (e.g. a server, or the like) located on an external network. By way of a further example, a voice service may include a third-party service such as, but not limited to, Siri, Cortana, or Alexa.

In some embodiments, a device control assembly 110 may listen for a keyword such as, but not limited to, "Deako," and then initiate voice recognition and command interpretation (e.g. locally or via a voice service) for audio signals following the keyword. It is noted herein that longer keywords may be easier for speech recognition systems to identify which results in fewer missed commands. In some embodiments, a keyword verbally spoken is the sole action of the command. For example, a multiword, specific command, such as "Deako Toggle Lights" may be defined to achieve a simplified interface and accurate speech recognition. For instance, each time "Deako Toggle Lights" is identified by the device control assembly 110, the state of the lights may be toggled. In this regard, if the keyword "Deako Toggle Lights" is identified by the device control assembly 110 and the lights were on, the device control assembly 110 may turn the lights off. Similarly, if the keyword "Deako Toggle Lights" is identified by the device control assembly 110 and the lights were off, the device control assembly 110 would turn the lights on. In some embodiments, if connected load devices are dimmed, the dimming level may be maintained when the devices are turned back on.

In some embodiments, a voice command may be paired with a gesture to specify a specific function. For example, the keyword "Deako Toggle Lights" together with a pose or gesture detected by the device control assembly 110 may identify a select group of luminaires to actuate.

Figure 20:
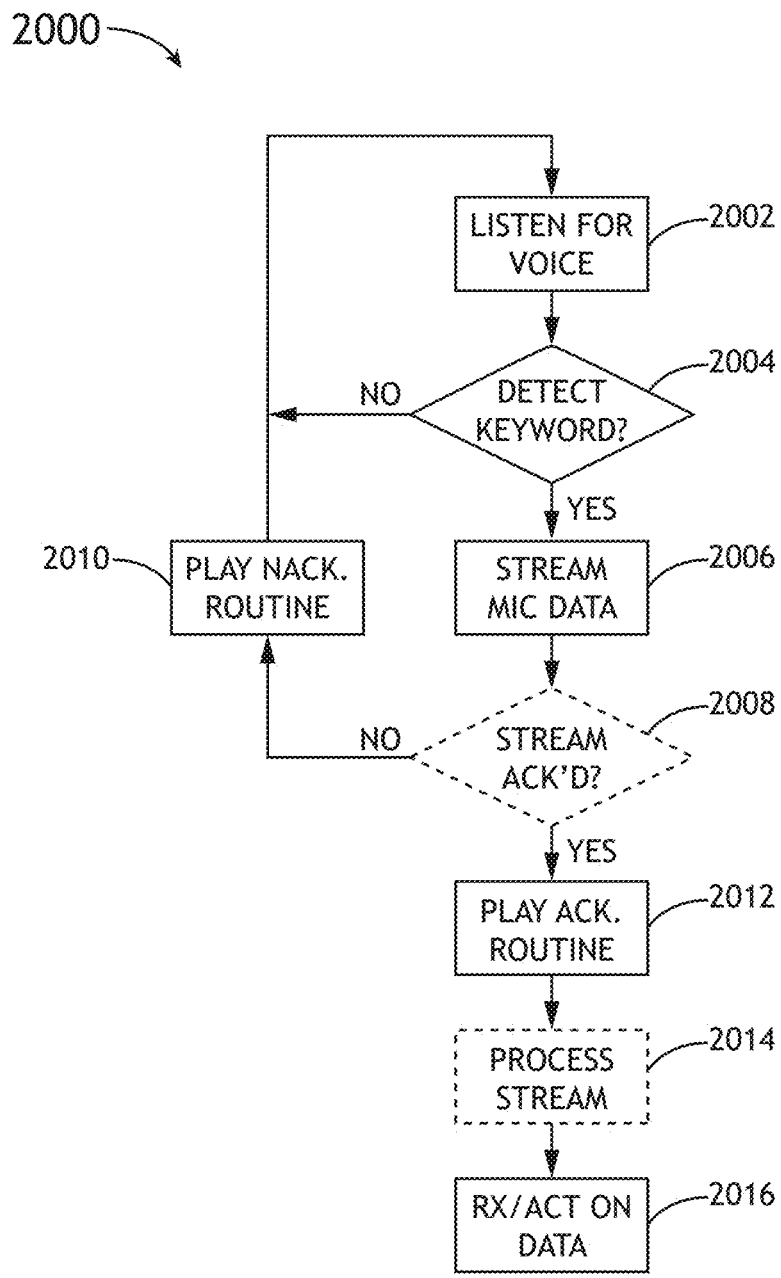
FIG. 20 is a flow diagram illustrating a method for notifying a user whether a voice stream process request was received and accepted, in accordance with one or more embodiments of the present disclosure.

In some embodiments, a voice service receives the voice stream, processes the request, and acknowledges receipt of the stream. FIG. 20 is a flow chart illustrating a method 2000 for notifying a user whether a voice stream process request was received and accepted, in accordance with one or more embodiments of the present disclosure. Applicant notes that the embodiments and enabling technologies described previously herein in the context of modular control unit 100 should be interpreted to extend to method 2000. It is further noted, however, that the method 2000 is not limited to the architecture of the modular control unit 100.

In some embodiments, a step 2002 includes listening for voice. For example, a device control assembly 110 may include a microphone for monitoring audio signals. In some embodiments, a step 2004 includes detecting a keyword. For example, a device control assembly 110 may continuously monitor audio signals received by the microphone and scan for a keyword (e.g. "Deako," or the like). In some embodiments, if a keyword is detected, a step 2006 includes streaming audio data captured by the microphone to the voice service. In this regard, audio data following the keyword may be captured by the microphone and may be sent to the voice service. In some embodiments, a step 2008 includes detecting whether the audio stream was acknowledged by the voice service. In some embodiments, if the audio stream is not acknowledged by the voice service (e.g. in response to a transmission error, or the like), a step 2010 includes initiating a no-acknowledged (Nack) routine. For example, the device control assembly 110 may, but it not required to, play an audio tone, or flash a light (e.g. a red LED). In some embodiments, if the audio stream is acknowledged by the voice serve, step 2012 includes initiating an acknowledgement (Ack) routine. For example, the device control assembly 110 may, but it not required to, play an audio tone, or flash a light (e.g. a green LED). In some embodiments, the voice service streams back a voice response played by the device control assembly 110. In some embodiments, a step 2014 includes processing a response from the voice service. For example, the device control assembly 110 may decode a command packet to generate a response to the user command. In some embodiments, a step 2016 includes initiating a response to the user command. For example, the device control assembly 110 may actuate a load in response to a voice command from a user.

In some embodiments, a network of device control assemblies 110 may provide one-way or multi-directional communication of audio and/or video signals. In this regard, a network of device control assemblies 110 may function as a multi-directional intercom (e.g. an audio intercom, a video intercom, or the like).

In some embodiments, the command interface of the intercom includes at least one of voice commands, a control panel, a mobile phone, or a universal remote. In some embodiments, an intercom "call" from one device control assembly 110 to another can be initiated by pressing a pre-defined part of the touch-sensitive input device 510. In some embodiments, an intercom "call" from one device control assembly 110 to another can be initiated by stating a voice command. For example, stating the voice command "Deako call rooms" may initiate an intercom accessible to any device control assembly 110 on the network. In some embodiments, an intercom could be established through a device application connected either wirelessly or by wireline to a device control assembly 110. Similarly, in some embodiments, a "call" may be terminated by pressing a pre-defined part of the touch-sensitive input device 510, through a voice command, or the like. Further, a mobile device may initiate and/or send requests for the network of device control assemblies 110 to control a load (e.g. a luminaire, an appliance that performs a service such as playing music, or the like).

In some embodiments, once a "call" is initiated at an initiating device control assembly 110, the device control assembly 110 digitizes input signals (e.g. audio input signals captured by a microphone, images and/or videos captured by sensor hardware 534, or the like) and sends a communication stream including the digitized input signals to one or more additional device control assemblies 110 on the network.

In some embodiments, the communication stream is available to all device control assemblies 110 in the network. Further, each device control assembly 110 on the network may decode the communication stream and broadcast the audio and/or video signals on a microphone and/or display device. In this regard, a device control assembly 110 that broadcasts data from a communication stream may be participating in a multi-device "call". Additionally, each device control assembly 110 on the "call" may provide audio and/or video as part of the communication stream to provide multi-directional communication between all device control assemblies 110.

In some embodiments, the network of device control assemblies 110 utilizes occupancy data (e.g. detected using the network of device control assemblies 110) to determine which device control assemblies 110 should broadcast the data from the communication stream. For example, data from the communication stream may be broadcast only in occupied rooms. By way of another example, data from the communication stream may be broadcast in rooms in which one or more luminaires are turned on.

Figure 21:
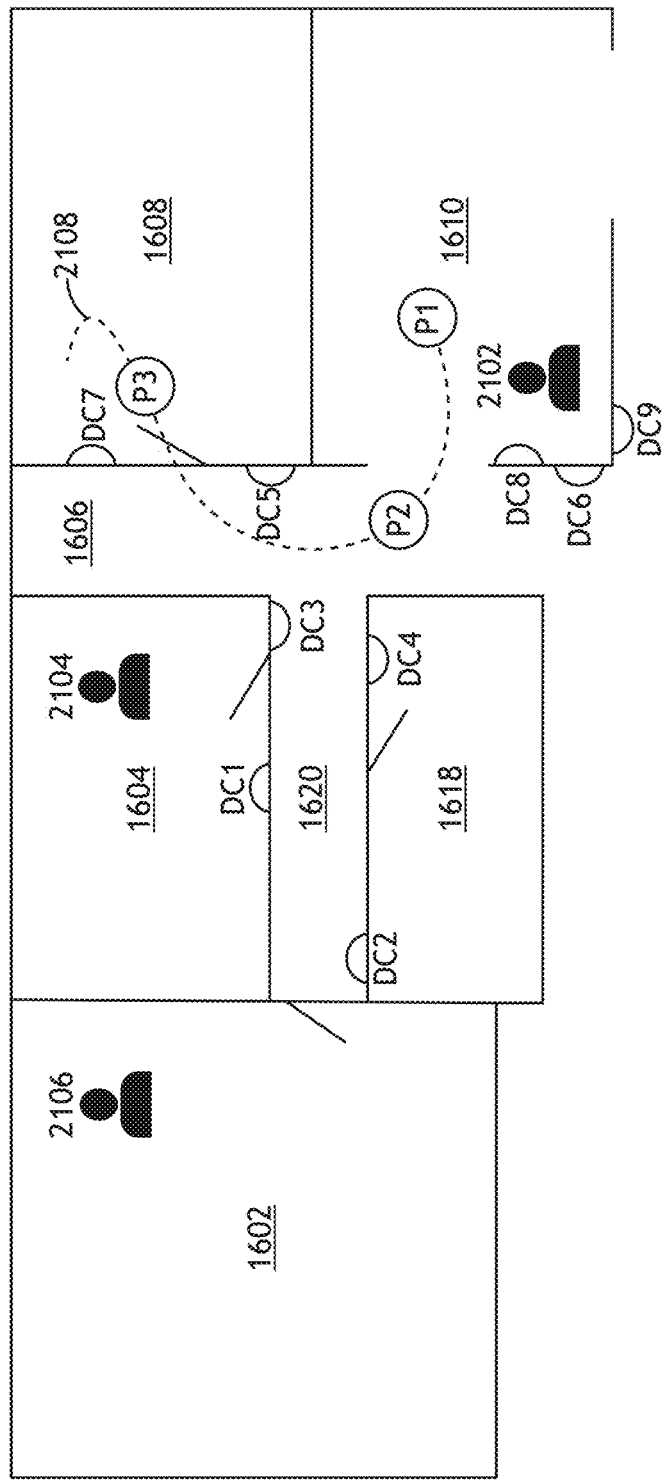
FIG. 21 is a conceptual view of a residence including a network of device control assemblies illustrating an occupancy-based communication system, in accordance with one or more embodiments of the present disclosure.

FIG. 21 is a conceptual view of a residence including a network of device control assemblies illustrating an occupancy-based communication system, in accordance with one or more embodiments of the present disclosure. For example, FIG. 21 may include a portion of the network illustrated in FIG. 16A. In one instance, a person 2102 is in the Kitchen 1610 and initiates occupancy-based communication on DC8 to alert person 2104 and person 2106. In this regard, device control assembly 110 DC1 detects the presence of person 2104 in Bedroom 2 1604 and DC4 detects the presence of person 2106 in the Laundry Room 1618. Further, all device control assemblies 110 may be alerted to the message, but only DC1 in Bedroom 2 1604 and DC4 in the laundry room participate in the "call." In some embodiments, DC1 notifies person 2104 and person 2106 of an intercom message by actuating the lights in Bedroom 2 1604 and the Laundry Room 1618 a pre-defined pattern. For example, DC1 may pulse or temporarily modify the color of the lights in Bedroom 2 1604 and the Laundry Room 1618. By way of another example, DC1 or DC4 may produce an audible noise (e.g. a ringtone, or the like) to notify person 2104 and person 2106. In some embodiments, receiving device control assemblies 110 may automatically accept the "call" and broadcast data from the communication stream. Further, receiving device control assemblies 110 may automatically provide audio and/or video data to the communication stream. In some embodiments, receiving device control assemblies 110 may require manual acceptance of the "call" and/or manual approval to provide audio and/or video to the communication stream.

Further, a device control assembly 110 in an unoccupied room may display a notification (e.g. a blinking LED, a message on a display device 530, or the like). In this regard, the device control assembly 110 in the unoccupied room may join the "call" (e.g. if an occupant walks into the room).

In some embodiments, a user (e.g. any of people 2102-2106) may freely walk between rooms having device control assemblies 110 and maintain an active connection to the "call." In this regard, a network of device control assemblies 110 including occupancy-detection may track a user on a multi-directional communication "call" and dynamically determine which device control assembly 110 to associated with the user (e.g. to receive audio and/or video from the user as well as to broadcast data from the communication stream). For example, person 2102 may follow path 2108 and maintain an active intercom connection based on the room he/she is in at any given moment. In one instance, the DC8 may initially detect person 2102 at point P1 and later detect at point P2 that person 2102 has left the Kitchen 1610. Further, DC5 and DC6 may detect that person 2102 is in Hallway 1 1606. Accordingly, DC5 may become the active device control assembly 110, streaming the voice of person 2102 to DC 1 and DC4. When person 2102 enters Bedroom 1 1608, DC7 may become the active device control assembly 110 at point P3.

In some embodiments, a device control assembly 110 may initiate a "call" with one or more identified users based on occupancy data. For example, a user may use a voice command "Deako Call Dave" to initiate a "call" with Dave. In this regard, if Dave is in a space monitored by a device control assembly 110, a device control assembly 110 near Dave will notify Dave of an incoming "call".

In some embodiments, one or more device control assemblies 110 may connect to a mobile device to extend a "call" to a user outside of the house. In this regard, if Dave is in a space not monitored by a device control assembly 110, a device control assembly 110 in the network may initiate a call to Dave's mobile phone (e.g. using a pre-determined number associated with Dave in the system, or the like). Additionally, a device control assembly 110 may connect to a mobile device such that the mobile device may be within the network. Accordingly, a device control assembly 110 may operate as a "hand-free" speakerphone.

In some embodiments, one or more device control assemblies 110 may operate as wireless repeaters for a device connected to the network. For example, device control assemblies 110 may operate as Bluetooth repeaters. In this regard, the range of a mobile phone, a Bluetooth headset, or the like, may be extended through the network of device control assemblies 110.

In some embodiments, a network of device control assemblies 110 may provide surveillance and/or security features. For example, an audio/video stream generated by a device control assembly 110 may be broadcast to any other device control assembly 110, to a mobile phone, to an external controller (e.g. as a live stream on the Internet), or recorded. In one instance, a device control assembly 110 may function as an audio and/or video baby monitor and transmit an audio and/or video feed to a mobile phone. In some embodiments, a network of device control assemblies 110 is used with a security system controller as a security system.

In some embodiments, a network terminal may access an audio/video stream from any device control assembly 110 on the network. For example, a network terminal may include one or more computers, mobile phones, video watches, tablets, televisions or headsets.

In some embodiments, occupancy data may be coupled to the video stream allowing pre-defined periods of time to be recorded. For example, if a person routinely leaves and returns to a house at certain times a video stream could be recorded by one or more device control assemblies 110 during this period of non-occupancy as surveillance footage. In some embodiments, a device control assembly 110 uses facial recognition to classify all occupants as authorized or unknown users. Further, a network of device control assemblies 110 may provide occupancy detection to track the locations of each occupant. In some embodiments, a terminal coupled to a network of device control assemblies 110 may be alerted to a new entrant and provide an image of the new entrant. Further, the terminal may be provided a choice about how to respond to a new entrant. For example, if a new entrant is known, an intercom connection to the entrant may be initiated or the entrant may be granted access to the premises. By way of another example, if a new entrant is unknown, an alert may be sent to a designated user, group of users, or the police. Further, an option may be provided to set off an alarm or greet the new entrant. Additionally, an option may be provided to welcome the new entrant by actuating one or more luminaires, shades, or appliances that perform a service.

In some embodiments, a network of occupancy sensor assembly systems includes entry sensors that monitor entry through windows and doors. For example, an entry sensor (e.g. a door sensor, a window sensor, or the like) may include a battery, sensing hardware, and a BLE radio. In some embodiments, the entry sensor includes an accelerometer and a magnetic sensor. In some embodiments, the accelerometer detects motion. In some embodiments, the magnetic sensor detects the state of the window and/or door. In some embodiments, the magnetic sensor detects whether a window is locked. For example, the magnetic sensor may be placed sufficiently proximate to a locking mechanism having a piece of magnetic tape on a portion of the locking mechanism such that the sensor may detect whether the lock is engaged. In some embodiments, the magnetic sensor detects whether a door is open or closed. Further, entry sensors may be coupled with the network of device control assemblies 110 using any method known in the art. For example, entry sensors may be coupled to a device control assembly 110 via a wireless connection (e.g. WiFi, Bluetooth, ZigBee, ZWave, or the like). In some embodiments, entry sensors are connected to a hub, which is further connected to a device control assembly 110.

Figure 22:
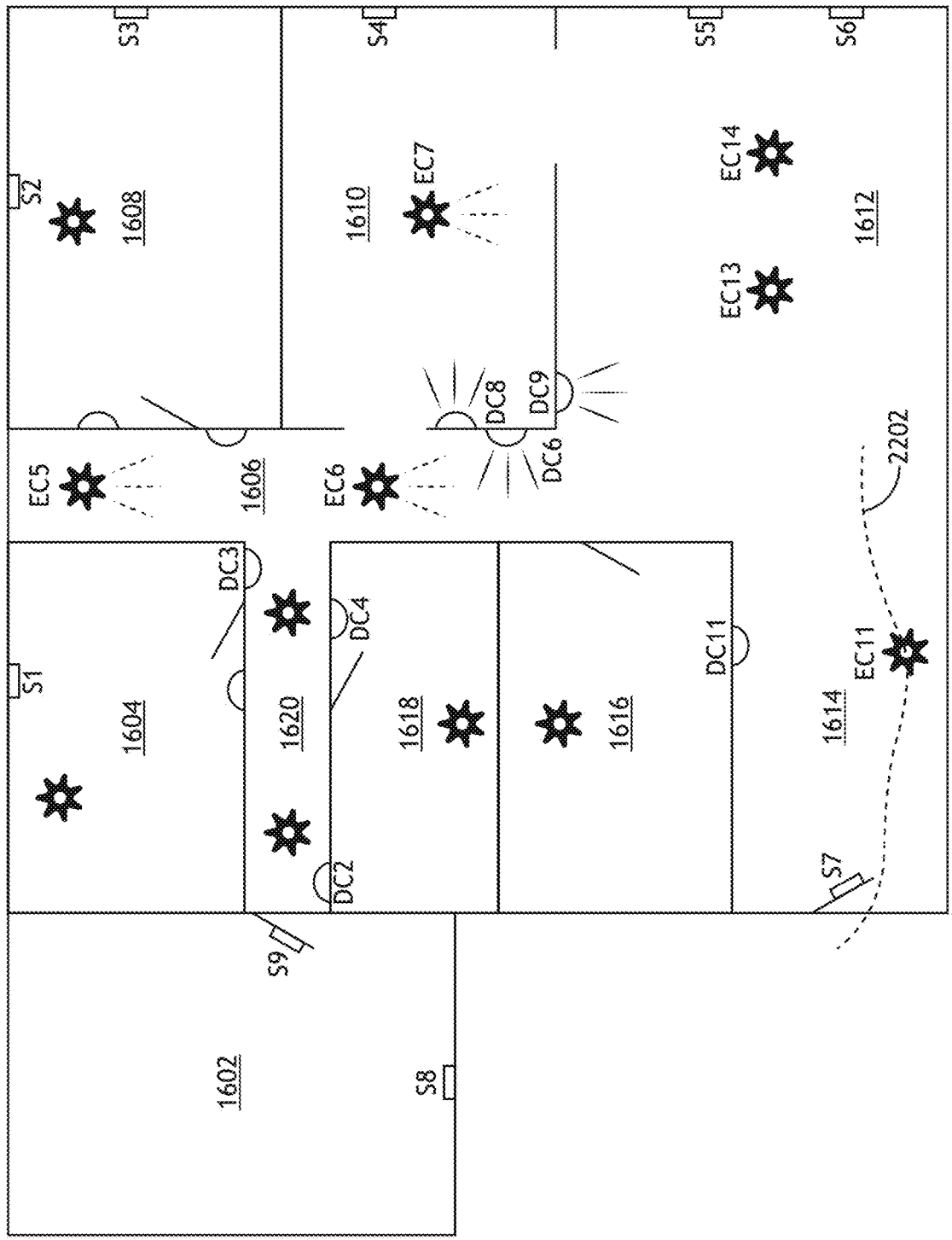
FIG. 22 is a conceptual view of a residence including a network of device control assemblies illustrating an occupancy-based security system, in accordance with one or more embodiments of the present disclosure.

FIG. 22 is a conceptual view of a residence including a network of device control assemblies illustrating an occupancy-based security system, in accordance with one or more embodiments of the present disclosure. In some embodiments, the occupancy-based security system may automatically initiate a security mode (e.g. the occupancy-based security system may be "armed") when no occupants are detected.

In some embodiments, if the occupancy-based security system is armed and an entry sensor is activated, one or more device control assemblies 110 provide an alert. For example, the one or more device control assemblies 110 may alert one or more authorized users, a system administrator, or the like. Further, the alert may include any type of alert such as, but not limited to, a message to a mobile device including a description of the activated entry sensor, or the like.

In some embodiments, if an entry sensor is activated, one or more device control assemblies 110 will start surveillance by the occupancy sensor assembly system closest to the activated entry sensor. In some embodiments, surveillance footage (e.g. images and/or videos) is captured and stored for later use. The surveillance footage may be stored on a local device within the network, a device on an external network, or a cloud-based server.

In some embodiments, a device control assembly 110 may identify a new entrant (e.g. using biometric recognition, or the like) and generate a response based on the result of the identification. For example, a device control assembly 110 may identify a user as being on a list of trusted users and may automatically disarm the security system. By way of another example, a new entrant may provide a security code to a device control assembly 110 or a dedicated device on the network.

In some embodiments, if the security system is not disarmed within a predefined amount of time after being armed the security system controller will initiate one or more deterrent measures. In some embodiments, deterrent measures of the security system include turning lights on in other parts of the house. For example, deterrent measures of the security system may include playing sounds from device control assemblies 110 or one or more speakers in the network. For example, in FIG. 22, a person entering through the front door along path 2202 may activate the door sensor S7, which alerts one or more device control assemblies 110 to initiate a disarming timer. Continuing with this example, DC11 may detect the person and may simulate, based on the detected occupant position in Entryway 1614, activity in the one or more rooms as a deterrent measure if the security system is not disarmed. In one instance, simulated activity may include, but is not limited to, turning on one or more luminaires in Hallway 1 1606, or playing a recording of footsteps on DC5 or DC6 in Hallway 1 1606. In some embodiments, deterrent measures may include simulated activity in the Kitchen (e.g. played by DC8). For example, simulated kitchen activity may include, but is not limited to, recorded sounds of running, water, clanging dishes, a refrigerator door opening, a microwave in operation, a stove timer sounding, or a garbage disposal running. In some embodiments, if the security system is armed after a predefined amount of time after deterrent measures are initiated the security system will start "alarm measures" that alert all authorized users of a break-in event. In some embodiments, an alarm measure is to contact a security company. In some embodiments, an alarm measure includes playing loud alarm bell sounds out of the one or more device control assemblies 110. In some embodiments, an alarm measure includes continually strobing one or more luminaires.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically interactable and/or physically interacting components and/or wirelessly interactable and/or wirelessly interacting components and/or logically interactable and/or logically interacting components.

All of the methods described herein may include storing results of one or more steps of the method embodiments in the memory. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A method for installing a user-upgradeable load control network comprising:
    mounting one or more backplates to electrical junction boxes distributed throughout a building, wherein each of the one or more backplates includes a cavity to interchangeably accept any of a plurality of device control assemblies, wherein each of the one or more backplates further includes electrical contacts and a translatable cover configured to shield the electrical contacts from the cavity when translated to a closed position and to expose the electrical contacts to a device control assembly of the plurality of device control assemblies upon insertion into the cavity, wherein each of the one or more backplates further includes a lock to allow the cover to be translated to an open position only after insertion of the device control assembly into the cavity;
    connecting the electrical contacts of the one or more backplates to one or more electrical loads distributed throughout the building through wiring extending into the electrical junction boxes; and
    installing one or more device control assemblies of the plurality of device control assemblies into at least one of the one or more backplates, wherein a particular device control assembly of the plurality of device control assemblies is installed into a particular backplate of the one or more backplates by inserting the particular device control assembly into the cavity of the particular baseplate to engage the lock of the particular baseplate and translating the cover of the particular baseplate to the open position, wherein the particular device control assembly installed into the particular baseplate is upgradeable by a user by translating the cover of the particular baseplate to the closed position, removing the particular device control assembly, inserting any other of the plurality of device control assemblies, and translating the cover of the particular baseplate to the open position.

2. The method of claim 1, wherein the one or more backplates includes a first backplate mounted to a first electrical junction box, wherein the first electrical junction box is connected to a first electrical load of the one or more electrical loads via wiring extending into the first electrical junction box, wherein a first device control assembly of the plurality of device control assemblies is installed into the first backplate, wherein the method further comprises:
    upgrading, by a user, the first device control assembly to a second device control assembly of the plurality of device control assemblies.

3. The method of claim 1, wherein the one or more electrical loads distributed throughout the building comprise:
    two or more electrical loads, wherein at least one of the plurality of device control assemblies comprises:
        two or more user interfaces for separately controlling the two or more electrical loads.

4. The method of claim 3, wherein the two or more user interfaces comprise:
    at least one of a duplex switch or a triplex switch.

5. The method of claim 2, wherein upgrading the first device control assembly comprises:
    translating, by the user, the cover of the first backplate to the closed position;
    removing, by the user, the first device control assembly from the cavity of the first backplate;
    inserting, by the user, the second device control assembly into the cavity of the first backplate; and
    translating, by the user, the cover of the first backplate to the open position to expose the electrical contacts of the first backplate to the second device control assembly.

6. The method of claim 2, wherein upgrading the first device control assembly comprises:
    upgrading the first device control assembly when the first backplate is connected to live power via the wiring extending into the first electrical junction box.

7. The method of claim 2, wherein the first device control assembly comprises:
    a switch to regulate the first electrical load by toggling power to the first electrical load between a powered state and an unpowered state via the wiring extending into the first electrical junction box.

8. The method of claim 2, wherein the second device control assembly comprises:
    at least one of a dimmer, a motor speed controller, or a control panel configured to regulate the first electrical load by supplying a user-selected power to the first electrical load via the wiring extending into the first electrical junction box.

9. A networked load control system comprising:
    two or more backplates configured to mount to electrical junction boxes distributed throughout a building, wherein each of the two or more backplates includes electrical contacts to connect to at least one of one or more electrical loads distributed throughout the building through wires extending into at least one of the electrical junction boxes, wherein each of the two or more backplates includes a cavity to interchangeably accept any of a plurality of device control assemblies, wherein each of the two or more backplates further includes a translatable cover configured to shield the electrical contacts from the cavity when translated to a closed position and to expose the electrical contacts to a device control assembly of the plurality of device control assemblies upon insertion into the cavity; and two or more device control assemblies of the plurality of device control assemblies inserted into the two or more backplates, wherein any of the two or more device control assemblies are configurable to provide user control of any selected electrical load of the one or more electrical loads connected to any selected backplate of the two or more backplates by directing, via a communication network, a device control assembly of the two or more device control assemblies inserted into the selected backplate to regulate the selected electrical load.

10. The networked load control system of claim 9, wherein a first device control assembly of the two or more device control assemblies is installed in a first baseplate of the two or more baseplates, wherein the first device control assembly is upgradeable by a user to a second device control assembly of any of the plurality of device control assemblies by translating the cover to the closed position, removing the inserted device control assembly, inserting any other of the plurality of device control assemblies into the cavity of the first baseplate, and translating the cover to an open position.

11. The networked load control system of claim 9, wherein a particular device control assembly of the plurality of device control assemblies is configurable to provide user control of the selected electrical load based on a pairing between the particular device control assembly and the selected electrical load.

12. The networked load control system of claim 11, wherein the pairing is configurable by a controller, wherein the controller comprises:
   at least one of a hub, a server, or a desktop computer.

13. The networked load control system of claim 11, wherein the pairing is configurable by a controller, wherein the controller comprises:
   at least one of the two or more device control assemblies.

14. The networked load control system of claim 11, wherein the pairing is configurable by a mobile device.

15. The networked load control system of claim 14, wherein the mobile device is connected to any of the two or more device control assemblies.

16. The networked load control system of claim 9, wherein the plurality of device control assemblies includes at least one of a switch, a dimmer, a fan speed controller, an outlet, a sensor, or a control panel.

17. A mounting assembly comprising:
   a backplate configured to mount to an electrical junction box and further connect to an electrical load through wiring extending into the electrical junction box, wherein the backplate includes a cavity to interchangeably accept any of a plurality of device control assemblies, the backplate further including a translatable cover configured to shield the electrical contacts from the cavity when translated to a closed position and to expose the electrical contacts to a device control assembly of the plurality of device control assemblies upon insertion into the cavity, wherein a first device control assembly of the plurality of device control assemblies having a first set of load-regulation functions inserted into the cavity of the backplate is upgradeable by a user to a second device control assembly of the plurality of device control assemblies having a different set of load-regulation functions by translating the cover of the backplate to the closed position, removing the first device control assembly, inserting the second device control assembly, and translating the cover to an open position.

18. The mounting assembly of claim 17, wherein the first device control assembly comprises:
   a switch to regulate the electrical load by toggling power to the first electrical load between a powered state and an unpowered state via the wiring extending into the first electrical junction box.

19. The mounting assembly of claim 17, wherein the second device control assembly comprises:
   a dimmer configured to regulate the electrical load by supplying a user-selected power to the electrical load via the wiring extending into the electrical junction box.

20. The mounting assembly of claim 17, wherein the second device control assembly comprises:
   a control panel configured to regulate the electrical load to any of two or more preset values via the wiring extending into the electrical junction box.

\* \* \* \* \*